United States Patent
Xu et al.

(10) Patent No.: US 12,232,203 B2
(45) Date of Patent: Feb. 18, 2025

(54) CONFIGURATION METHOD AND APPARATUS

(71) Applicant: Huawei Technologies Co., Ltd., Shenzhen (CN)

(72) Inventors: Xiaoying Xu, Shenzhen (CN); Qinghai Zeng, Shanghai (CN); Mingzeng Dai, Shenzhen (CN); Qufang Huang, Shenzhen (CN); Chong Lou, Shanghai (CN); Yan Chen, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 401 days.

(21) Appl. No.: 17/707,614

(22) Filed: Mar. 29, 2022

(65) Prior Publication Data

US 2022/0225465 A1 Jul. 14, 2022

Related U.S. Application Data

(63) Continuation of application No. PCT/CN2020/075402, filed on Feb. 14, 2020.

(30) Foreign Application Priority Data

Sep. 30, 2019 (WO) ................ PCT/CN2019/109722

(51) Int. Cl.
*H04W 76/27* (2018.01)
*H04W 24/02* (2009.01)
*H04W 76/34* (2018.01)

(52) U.S. Cl.
CPC ........... *H04W 76/27* (2018.02); *H04W 24/02* (2013.01); *H04W 76/34* (2018.02)

(58) Field of Classification Search
CPC ..... H04W 76/27; H04W 24/02; H04W 76/34; H04W 8/24; H04W 8/26; H04W 48/08; H04W 74/006; H04W 76/19

(Continued)

(56) References Cited

U.S. PATENT DOCUMENTS

2018/0139778 A1 5/2018 Chou et al.
2018/0324869 A1 11/2018 Phuyal et al.

FOREIGN PATENT DOCUMENTS

CN 104105214 A 10/2014
CN 104247553 A 12/2014

(Continued)

OTHER PUBLICATIONS

Samsung, "Correction on RRC states terminology usage", 3GPP TSG-SA WG3 Meeting #94, S3-190358, Jan. 28-Feb. 1, 2019, 5 pages, Kochi (India).

(Continued)

*Primary Examiner* — Tanmay K Shah
(74) *Attorney, Agent, or Firm* — Slater Matsil, LLP

(57) ABSTRACT

Embodiments of this application provide a configuration method and apparatus. When indicating, by using an RRC connection release message, a terminal to enter an inactive state from a connected state, a network device may include, in the RRC connection release message, a configuration parameter allocated to the terminal in the inactive state. That is, the terminal receives the radio resource control RRC connection release message sent by the network device, where the RRC connection release message includes first information used to indicate a target configuration parameter. In this way, the terminal may enter the inactive state based on the RRC connection release message, and determine a context parameter of the inactive state based on the first information, so that the configuration parameter is properly allocated to the terminal in the inactive state.

20 Claims, 19 Drawing Sheets

(58) Field of Classification Search
USPC .......................................................... 455/419
See application file for complete search history.

(56) References Cited

FOREIGN PATENT DOCUMENTS

| CN | 109391963 A | * | 2/2016 | ............ H04W 24/02 |
|----|-------------|---|--------|------------------------|
| CN | 108616943 A |   | 10/2018 | |
| CN | 109923915 A |   | 6/2019 | |
| WO | 2018145585 A1 |  | 8/2018 | |
| WO | 2018174577 A1 |  | 9/2018 | |

OTHER PUBLICATIONS

Ericsson (Rapporteur), "Introduction of SA", 3GPP TSG-WG2 Meeting #102, R2-1809239, May 21-25, 2018, 448 pages, Busan, South Korea.
3GPP TS 38.321 V15.7.0 (Sep. 2019), 3rd Generation Partnership Project; Technical Specification Group Radio Access Network; NR; Medium Access Control (MAC) protocol specification(Release 15), 78 pages.
Email Discussion Rapporteur (ZTE), "Procedures and mgsB content [105bis#30][NR/2-step RACH]", 3GPP TSG-WG2 Meeting #106, R2-1906308, May 3-17, 2019, 91 pages, Reno, USA.
OPPO, "2-steps RACH procedure for NR-U", 3GPP TSG-RAN WG2 Meeting #104, Nov. 12-16, 2018, R2-1816263, 4 pages, Spokane, USA.
3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.
OPPO, "Introduction of the Non-Contention based RACH for Inactive UE", 3GPP TSG-RAN2#99bis, Oct. 9-13, 2017, R2-1710231, 2 pages, Prague, Czech Republic.
OPPO, "MsgB contents and formats in 2-step RACH", 3GPP TSG-RAN WG2 Meeting #106, May 13-May 17, 2019, R2-1905600, 5 pages, Reno, USA.
3GPP TS 36.331 V15.7.0 (Sep. 2019), 3rd Generation Partnership Project; Technical Specification Group Radio Access Network; Evolved Universal Terrestrial Radio Access (E-UTRA); Radio Resource Control (RRC); Protocol specification (Release 15), 962 pages.
3GPP TS 36.321 V15.7.0 (Sep. 2019), 3rd Generation Partnership Project; Technical Specification Group Radio Access Network; Evolved Universal Terrestrial Radio Access (E-UTRA); Medium Access Control (MAC) protocol specification (Release 15), 134 pages.

* cited by examiner

CONFIGURATION METHOD AND APPARATUS

CROSS-REFERENCE TO RELATED APPLICATIONS

This application is a continuation of International Application No. PCT/CN2020/075402, filed on Feb. 14, 2020, which claims priority to International Application No. PCT/CN2019/109722, filed on Sep. 30, 2019. The disclosures of the aforementioned applications are hereby incorporated by reference in their entireties.

TECHNICAL FIELD

This application relates to the field of communication technologies, and in particular, to a configuration method and apparatus.

BACKGROUND

In an LTE network, from a perspective of an access network, a terminal may have three types of states: a connected state, an inactive state (also referred to as a deactivated state), and an idle state. The connected state is a state in which the terminal establishes a connection to an access network device and a core network device by performing processes such as radio resource control (RRC) connection setup, RRC connection reestablishment, and RRC connection resume. The inactive state is a state in which the terminal is disconnected from the access network device, but the access network device maintains a connection to the core network device, and the access network device stores a context of the terminal (for example, an identifier of the terminal). The idle state is a state in which the terminal is disconnected from the access network device and the core network device, and the access network device releases the context of the terminal.

For the terminal in the connected state, a network device sends configuration information to the terminal in the connected state, so that the terminal performs configuration based on the configuration information, and the terminal performs data transmission based on the configuration. If detecting that the terminal does not perform data transmission for a long period of time, the network device sends an RRC connection release message to the terminal, to indicate, by using the RRC connection release message, the terminal to enter the inactive state from the connected state. After the terminal enters the inactive state, the configuration information received when the terminal is in the connected state is no longer applicable to the terminal that is currently in the inactive state.

Therefore, how to properly indicate a configuration parameter to the terminal in the inactive state is a problem to be urgently resolved by a person skilled in the art.

SUMMARY

Embodiments of this application provide a configuration method and apparatus, so that after a terminal enters an inactive state from a connected state, a configuration parameter is properly indicated to the terminal in the inactive state.

According to a first aspect, an embodiment of this application provides a configuration method. The configuration method may include: receiving a radio resource control RRC connection release message, where the RRC connection release message includes first information, and the first information is used to indicate a target configuration parameter; and entering an inactive state based on the RRC connection release message, and determining a context parameter of the inactive state based on the first information, where the context parameter of the inactive state includes the target configuration parameter, or the context parameter of the inactive state includes a parameter other than the target configuration parameter in a context parameter of a terminal.

In addition, a configuration apparatus is further provided, and includes units or means configured to perform steps in the first aspect.

In addition, a configuration apparatus is provided, and includes a processor and an interface circuit. The processor is configured to communicate with another communication apparatus by using the interface circuit, and perform the method provided in the first aspect. There are one or more processors.

In addition, a configuration apparatus is provided, and includes a processor, configured to be connected to a memory, and configured to invoke a program stored in the memory, to perform the method in the first aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the first aspect.

In addition, a computer program is provided. When the computer program is executed by a processor, the method in the first aspect is performed.

In addition, a computer-readable storage medium is provided. The computer-readable storage medium stores a program. When the program is invoked by a processor, the method in the first aspect is performed.

In addition, a program product, for example, a computer-readable storage medium, is provided, and includes the foregoing program.

It can be learned that in the first aspect, when indicating, by using the RRC connection release message, the terminal to enter the inactive state from a connected state, a network device may include, in the RRC connection release message, the configuration parameter allocated to the terminal in the inactive state. That is, the terminal receives the radio resource control RRC connection release message sent by the network device, where the RRC connection release message includes the first information used to indicate the target configuration parameter. In this way, the terminal may enter the inactive state based on the RRC connection release message, and determine the access stratum context parameter of the inactive state based on the first information, where the access stratum context parameter of the inactive state includes the target configuration parameter, or the context parameter of the inactive state includes the parameter other than the target configuration parameter in the context parameter of the terminal, so that the configuration parameter is properly indicated to the terminal in the inactive state.

It may be understood that, in this embodiment of this application, there may be two different scenarios in which the network device properly indicates the configuration parameter to the terminal in the inactive state by using the first information. In one scenario, the network device may indicate, by using the first information, the configuration parameter configured for the terminal in the inactive state, so that the terminal retains the configuration parameter configured for the terminal. In the other scenario, the network device may indicate, by using the first information, a configuration parameter that needs to be released by the terminal in the inactive state, so that the terminal in the inactive state releases the configuration parameter that needs to be released. In the two different scenarios, target configuration parameters indicated by the first information are different.

In the first aspect, in a possible implementation, the target configuration parameter includes a radio bearer configuration parameter and/or a cell group configuration parameter. The network device solidifies radio bearer configuration parameters and/or cell group configuration parameters of a plurality of terminals, so that at least two terminals are corresponding to a same set of configuration parameters. In this way, when the plurality of terminals enter the inactive state from the connected state, the network device needs to store only one set of configuration information when storing configuration information of the at least two terminals, to reduce storage overheads of the network device.

In the first aspect, in a possible implementation, the first information is an identifier corresponding to the target configuration parameter.

In the first aspect, in a possible implementation, the terminal stores a mapping relationship between the configuration parameter and the identifier corresponding to the configuration parameter, so that the terminal may determine, based on the identifier corresponding to the target configuration parameter and the mapping relationship, that the context parameter of the inactive state includes the target configuration parameter corresponding to the identifier, to retain or release the target configuration parameter.

In the first aspect, in a possible implementation, the first information includes the target configuration parameter. Because the RRC connection release message directly carries the target configuration parameter, the terminal can directly determine the target configuration parameter, and retain or release the target configuration parameter directly carried in the RRC connection release message. Although overheads of configuration signaling are relatively large because the target configuration parameter is carried in the RRC connection release message and sent to the terminal, the terminal does not need to predefine context configuration information in a protocol, so that complexity of the protocol is reduced. The terminal does not need to store pre-configuration in advance, so that configuration overheads of storage overheads of the terminal are reduced.

In the first aspect, in a possible implementation, the configuration method further includes: reporting capability information of the terminal in the inactive state, so that the network device determines, based on the capability information reported by the terminal, whether the terminal supports data transmission in the inactive state.

For example, when reporting the capability information of the terminal, the terminal may report the capability information of the terminal to the network device in at least four possible manners. For example, the terminal supports data transmission in the inactive state. The four possible manners are: The terminal can support data transmission in the inactive state, the terminal supports configuration of the context parameter of the terminal by using a pre-configuration identifier, the terminal supports a common parameter configuration in the inactive state (in other words, the terminal supports a lightweight access stratum configuration parameter), and the terminal supports a session of data transmission in a direct inactive state. Although the expression manners are different, the four different manners may all be used to indicate that the terminal supports data transmission in the inactive state.

In the first aspect, in a possible implementation, the method further includes: receiving a first indication, where the first indication is used to indicate the terminal to monitor a physical downlink control channel when the terminal is in the inactive state.

In the first aspect, in a possible implementation, the first indication is included in the RRC connection release. Certainly, the first indication information may alternatively be carried in another message. This may be specifically set based on an actual requirement.

In the first aspect, in a possible implementation, the terminal may further receive a second indication, where the second indication is used to indicate that the terminal is allowed to perform uplink transmission when the terminal is in the inactive state.

In the first aspect, in a possible implementation, the terminal may send a random access request, and receive a response message of the random access request, where the response message includes an uplink grant and the second indication, and the second indication is used to indicate that uplink transmission is allowed to be performed on the uplink grant in the inactive state. In this way, when needing to perform data transmission, the terminal may directly perform uplink transmission on an uplink resource indicated by the uplink grant, so that the terminal completes uplink transmission when the terminal is in the inactive state, and does not need to perform uplink transmission after the RRC connection is resumed, thereby preventing the terminal from entering the connected state to send data. This not only improves sending efficiency of the data, but also reduces overheads required for resuming the RRC connection.

According to a second aspect, an embodiment of this application further provides a configuration method. The configuration method may include: determining a target configuration parameter; and sending a radio resource control RRC connection release message, where the RRC connection release message includes first information, the first information is used to indicate the target configuration parameter, the RRC connection release message is used to indicate a terminal to enter an inactive state based on the RRC connection release message, and the first information is used to indicate the terminal to determine a context parameter of the inactive state, where the context parameter of the inactive state includes the target configuration parameter, or the context parameter of the inactive state includes a parameter other than the target configuration parameter in a context parameter of the terminal.

In addition, a configuration apparatus is further provided, and includes units or means configured to perform steps in the second aspect.

In addition, a configuration apparatus is provided, and includes a processor and an interface circuit. The processor is configured to communicate with another communication apparatus by using the interface circuit, and perform the method provided in the second aspect. There are one or more processors.

In addition, a configuration apparatus is provided, and includes a processor, configured to be connected to a memory, and configured to invoke a program stored in the memory, to perform the method in the second aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the second aspect.

In addition, a computer program is provided. When the computer program is executed by a processor, the method in the second aspect is performed.

In addition, a computer-readable storage medium is provided. The computer-readable storage medium stores a program. When the program is invoked by a processor, the method in the second aspect is performed.

In addition, a program product, for example, a computer-readable storage medium, is provided, and includes the foregoing program.

It can be learned that in the second aspect, when indicating, by using the RRC connection release message, the terminal to enter the inactive state from a connected state, a network device may include, in the RRC connection release message, the configuration parameter allocated to the terminal in the inactive state. That is, the terminal receives the radio resource control RRC connection release message sent by the network device, where the RRC connection release message includes the first information used to indicate the target configuration parameter. In this way, the terminal may enter the inactive state based on the RRC connection release message, and determine the context parameter of the inactive state based on the first information, where the context parameter of the inactive state includes the target configuration parameter, or the context parameter of the inactive state includes the parameter other than the target configuration parameter in the context parameter of the terminal, so that the configuration parameter is properly indicated to the terminal in the inactive state.

In the second aspect, in a possible implementation, the target configuration parameter includes a radio bearer configuration parameter and/or a cell group configuration parameter. The network device solidifies radio bearer configuration parameters and/or cell group configuration parameters of a plurality of terminals, so that at least two terminals are corresponding to a same set of configuration parameters. In this way, when the plurality of terminals enter the inactive state from the connected state, the network device needs to store only one set of configuration information when storing configuration information of the at least two terminals, to reduce storage overheads of the network device.

In the second aspect, in a possible implementation, the first information is an identifier corresponding to the target configuration parameter.

In the second aspect, in a possible implementation, the method further includes: sending a mapping relationship between the configuration parameter and the identifier corresponding to the configuration parameter, so that the terminal may determine, based on the identifier corresponding to the target configuration parameter and the mapping relationship, that the context parameter of the inactive state includes the target configuration parameter corresponding to the identifier, to retain or release the target configuration parameter.

In the second aspect, in a possible implementation, the first information includes the target configuration parameter. Because the RRC connection release message directly carries the target configuration parameter, the terminal can directly determine the target configuration parameter, and retain or release the target configuration parameter. Although overheads of configuration signaling are relatively large because the target configuration parameter is carried in the RRC connection release message and sent to the terminal, the terminal does not need to predefine context configuration information in a protocol, so that complexity of the protocol is reduced. The terminal does not need to store pre-configuration in advance, so that configuration overheads of storage overheads of the terminal are reduced.

In the second aspect, in a possible implementation, the method further includes: receiving a session establishment request from a core network device, where the session establishment request includes a session type, and the session type is used to indicate that the terminal is allowed to perform uplink transmission when the terminal is in the inactive state; and determining the target configuration parameter based on the session type, to send the determined target configuration parameter to the terminal.

In the second aspect, in a possible implementation, the network device further sends a session establishment response to the core network device.

In the second aspect, in a possible implementation, the method further includes: sending a first indication, where the first indication is used to indicate the terminal to monitor a physical downlink control channel when the terminal is in the inactive state.

In the second aspect, in a possible implementation, the first indication is included in the RRC connection release. Certainly, the first indication information may alternatively be carried in another message. This may be specifically set based on an actual requirement.

In the second aspect, in a possible implementation, the method further includes: sending a second indication, where the second indication is used to indicate that the terminal is allowed to perform uplink transmission when the terminal is in the inactive state.

In the second aspect, in a possible implementation, the network device may receive a random access request, and send a response message of the random access request, where the response message includes an uplink grant and the second indication, and the second indication is used to indicate that uplink transmission is allowed to be performed on the uplink grant in the inactive state. In this way, when needing to perform data transmission, the terminal may directly perform uplink transmission on an uplink resource indicated by the uplink grant, so that the terminal completes uplink transmission when the terminal is in the inactive state, and does not need to perform uplink transmission after the RRC connection is resumed, thereby preventing the terminal from entering the connected state to send data. This not only improves sending efficiency of the data, but also reduces overheads required for resuming the RRC connection.

According to a third aspect, an embodiment of this application further provides a configuration method. The configuration method may include: sending a first message to a network device, where the first message includes a random access request and/or physical uplink shared channel data, and the physical uplink shared channel data includes information used to request to resume an RRC connection; receiving a response message of the first message from the network device, where the response message includes contention resolution information; receiving an uplink grant from the network device; and performing uplink transmission on an uplink resource indicated by the uplink grant.

In addition, a configuration apparatus is further provided, and includes units or means configured to perform steps in the third aspect.

In addition, a configuration apparatus is provided, and includes a processor and an interface circuit. The processor is configured to communicate with another communication apparatus by using the interface circuit, and perform the method provided in the third aspect. There are one or more processors.

In addition, a configuration apparatus is provided, and includes a processor, configured to be connected to a memory, and configured to invoke a program stored in the memory, to perform the method in the third aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the third aspect.

In addition, a computer program is provided. When the computer program is executed by a processor, the method in the third aspect is performed.

In addition, a computer-readable storage medium is provided. The computer-readable storage medium stores a program. When the program is invoked by a processor, the method in the third aspect is performed.

In addition, a program product, for example, a computer-readable storage medium, is provided, and includes the foregoing program.

It can be learned that in the third aspect, after receiving the contention resolution information, if the terminal has not received an RRC connection release message at this moment, it indicates that there is still data needing to be transmitted. In this case, the terminal receives the uplink grant from the network device, and performs uplink transmission on the uplink resource indicated by the uplink grant. The terminal neither needs to perform uplink transmission after the RRC connection is resumed, nor needs to enter a connected state to send data. This not only improves sending efficiency of the data, but also reduces overheads required for resuming the RRC connection.

In the third aspect, in a possible implementation, the method further includes: starting or restarting a timer when the response message of the first message is received, to prolong duration for monitoring a grant by the terminal.

In the third aspect, in a possible implementation, the method further includes: receiving the uplink grant from the network device during running of the timer; and restarting the timer when the uplink grant is received, to prolong duration for monitoring the uplink grant by the terminal.

In the third aspect, in a possible implementation, the method further includes: receiving a downlink grant from the network device during running of the timer; and restarting the timer when the downlink grant is received, to prolong duration for monitoring the downlink grant by the terminal.

In the third aspect, in a possible implementation, after the timer is started or restarted, the timer is not always in a running state, but is stopped when a specific condition, for example, the foregoing scenario of stopping the timer, is met. For example, when receiving the RRC connection release message from the network device, the terminal controls the timer to stop running, that is, stops the timer. It may be understood that when the terminal receives an RRC connection resume message, a connection setup message, or the like from the network device, the terminal may also stop the timer.

According to a fourth aspect, an embodiment of this application further provides a configuration method. The configuration method may include: receiving a first message from a terminal, where the first message includes a random access request and/or physical uplink shared channel data, and the physical uplink shared channel data includes information used to request to resume an RRC connection; sending a response message of the first message to the terminal, where the response message includes contention resolution information; sending an uplink grant to the terminal; and performing data transmission on an uplink resource indicated by the uplink grant.

In addition, a configuration apparatus is further provided, and includes units or means configured to perform steps in the fourth aspect.

In addition, a configuration apparatus is provided, and includes a processor and an interface circuit. The processor is configured to communicate with another communication apparatus by using the interface circuit, and perform the method provided in the fourth aspect. There are one or more processors.

In addition, a configuration apparatus is provided, and includes a processor, configured to be connected to a memory, and configured to invoke a program stored in the memory, to perform the method in the fourth aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the fourth aspect.

In addition, a computer program is provided. When the computer program is executed by a processor, the method in the fourth aspect is performed.

In addition, a computer-readable storage medium is provided. The computer-readable storage medium stores a program. When the program is invoked by a processor, the method in the fourth aspect is performed.

In addition, a program product, for example, a computer-readable storage medium, is provided, and includes the foregoing program.

It can be learned that in the fourth aspect, after receiving the first message sent by the terminal, the network device sends the response message including the contention resolution information to the terminal. If the network device has not sent an RRC connection release message to the terminal at this moment, it indicates that there is still data needing to be transmitted. In this case, the network device sends the uplink grant to the terminal, so that the terminal performs uplink transmission on the uplink resource indicated by the uplink grant, and neither needs to perform uplink transmission after the RRC connection is resumed nor needs to enter a connected state to send data. This not only improves sending efficiency of the data, but also reduces overheads required for resuming the RRC connection.

In the fourth aspect, in a possible implementation, the network device further sends the radio resource control RRC connection release message to the terminal, so that when receiving the radio resource control RRC connection release message from the network device, the terminal controls the timer to stop running, that is, stops the timer. It may be understood that when the terminal receives a radio resource control RRC connection resume message, a connection setup message, or the like from the network device, the terminal may also stop the timer.

According to a fifth aspect, an embodiment of this application further provides a configuration method. The configuration method may include: sending a first message to a network device, where the first message includes a random access request and/or physical uplink shared channel data, and the physical uplink shared channel data includes information used to request to resume a radio resource control RRC connection; receiving a response message of the first message from the network device, where the response message includes an uplink grant and first indication information, and the first indication information is used to indicate whether uplink transmission is allowed to be performed on an uplink resource indicated by the uplink grant; and performing uplink transmission on the uplink resource based on first indication information.

In addition, a configuration apparatus is further provided, and includes units or means configured to perform steps in the fifth aspect.

In addition, a configuration apparatus is provided, and includes a processor and an interface circuit. The processor is configured to communicate with another communication apparatus by using the interface circuit, and perform the method provided in the fifth aspect. There are one or more processors.

In addition, a configuration apparatus is provided, and includes a processor, configured to be connected to a memory, and configured to invoke a program stored in the memory, to perform the method in the fifth aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the fifth aspect.

In addition, a computer program is provided. When the computer program is executed by a processor, the method in the fifth aspect is performed.

In addition, a computer-readable storage medium is provided. The computer-readable storage medium stores a program. When the program is invoked by a processor, the method in the fifth aspect is performed.

In addition, a program product, for example, a computer-readable storage medium, is provided, and includes the foregoing program.

It can be learned that in the fifth aspect, a terminal sends an RRC connection resume request to the network device, so that when the terminal is in an inactive state, the network device may allocate the uplink grant to the terminal, and indicate, by using the indication information, whether uplink transmission is allowed to be performed on the uplink resource indicated by the uplink grant. In this way, the terminal completes uplink transmission when the terminal is in the inactive state, and neither needs to perform uplink transmission after the RRC connection is resumed nor needs to enter a connected state to send data. This not only improves sending efficiency of the data, but also reduces overheads required for resuming the RRC connection.

In the fifth aspect, in a possible implementation, the method further includes: if the first indication information indicates that uplink transmission is allowed to be performed on the uplink resource, sending a second message including uplink data to the network device on the uplink resource, so that the terminal completes uplink transmission when the terminal is in the inactive state, and neither needs to perform uplink transmission after the RRC connection is resumed nor needs to enter the connected state to send data. This not only improves the sending efficiency of the data, but also reduces the overheads required for resuming the RRC connection.

In the fifth aspect, in a possible implementation, the method further includes: if the first indication information indicates that uplink transmission is not allowed to be performed on the uplink resource, sending a third message to the network device on the uplink resource, where the third message is used to request to resume the RRC connection.

It should be noted that, when the first indication information indicates that the terminal is not allowed to perform uplink transmission on the uplink resource indicated by the uplink grant, the third message sent by the terminal on the uplink resource indicated by the uplink grant is used to only request to resume the RRC connection, and does not include the uplink data. For example, the third message may be the RRC connection resume request.

In the fifth aspect, in a possible implementation, the terminal starts or restarts a timer when receiving the response message of the first message, to prolong duration for monitoring a grant by the terminal.

In the fifth aspect, in a possible implementation, the method further includes: receiving a grant from the network device during running of the timer; and restarting the timer when the grant is received, to prolong duration for monitoring the grant by the terminal.

In the fifth aspect, in a possible implementation, after the timer is started or restarted, the timer is not always in a running state, but is stopped when a specific condition, for example, the foregoing scenario of stopping the timer, is met. For example, when receiving an RRC connection release message from the network device, the terminal controls the timer to stop running, that is, stops the timer. It may be understood that when the terminal receives a radio resource control RRC connection resume message, a connection setup message, or the like from the network device, the terminal may also stop the timer.

In the fifth aspect, in a possible implementation, the response message includes contention resolution information. For example, the contention resolution information may be an identifier of the terminal, a part of information of the second message, or a part of information of the third message.

After receiving the contention resolution information, if the terminal has not received the RRC connection release message at this moment, the terminal starts or restarts the timer, and receives the grant from the network device during running of the timer. The grant may be the uplink grant or a downlink grant. When receiving the grant, the terminal restarts the timer, to prolong the duration for monitoring the grant by the terminal. For example, if the uplink grant is received from the network device, the terminal starts or restarts the timer, and performs uplink transmission on the uplink resource indicated by the uplink grant; if the downlink grant is received from the network device and the RRC connection release message is not received, it indicates that there is still data needing to be transmitted, and the terminal starts or restarts the timer to wait for the RRC connection release message, so that the terminal completes uplink transmission when the terminal is in the inactive state, and neither needs to perform uplink transmission after the RRC connection is resumed nor needs to enter the connected state to send data. This not only improves the sending efficiency of the data, but also reduces the overheads required for resuming the RRC connection.

In the fifth aspect, in a possible implementation, the first message further includes second indication information, and the second indication information is used to indicate a comparison result of a volume of to-be-sent data of the terminal and a data volume threshold.

According to a sixth aspect, an embodiment of this application further provides a configuration method. The configuration method may include: receiving a first message from a terminal, where the first message includes a random access request and/or physical uplink shared channel data, and the physical uplink shared channel data includes information used to request to resume a radio resource control RRC connection; sending a response message of the first message to the terminal, where the response message includes an uplink grant and first indication information, and the first indication information is used to indicate whether uplink transmission is allowed to be performed on an uplink resource indicated by the uplink grant; and performing uplink transmission on the uplink resource based on first indication information.

In addition, a configuration apparatus is further provided, and includes units or means configured to perform steps in the sixth aspect.

In addition, a configuration apparatus is provided, and includes a processor and an interface circuit. The processor is configured to communicate with another communication apparatus by using the interface circuit, and perform the method provided in the sixth aspect. There are one or more processors.

In addition, a configuration apparatus is provided, and includes a processor, configured to be connected to a memory, and configured to invoke a program stored in the memory, to perform the method in the sixth aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the sixth aspect.

In addition, a computer program is provided. When the computer program is executed by a processor, the method in the sixth aspect is performed.

In addition, a computer-readable storage medium is provided. The computer-readable storage medium stores a program. When the program is invoked by a processor, the method in the sixth aspect is performed.

In addition, a program product, for example, a computer-readable storage medium, is provided, and includes the foregoing program.

It can be learned that in the sixth aspect, a network device receives an RRC connection resume request sent by the terminal, allocates the uplink grant to the terminal when the terminal is in an inactive state, and indicate, by using the indication information, whether uplink transmission is allowed to be performed on the uplink resource indicated by the uplink grant. In this way, the terminal completes uplink transmission when the terminal is in the inactive state, and neither needs to perform uplink transmission after the RRC connection is resumed nor needs to enter a connected state to send data. This not only improves sending efficiency of the data, but also reduces overheads required for resuming the RRC connection.

In the sixth aspect, in a possible implementation, the method further includes: if the first indication information indicates that uplink transmission is allowed to be performed on the uplink resource, receiving a second message including uplink data from the terminal on the uplink resource, so that the terminal completes uplink transmission when the terminal is in the inactive state, and neither needs to perform uplink transmission after the RRC connection is resumed nor needs to enter the connected state to send data. This not only improves the sending efficiency of the data, but also reduces the overheads required for resuming the RRC connection.

In the sixth aspect, in a possible implementation, the method further includes: if the first indication information indicates that uplink transmission is not allowed to be performed on the uplink resource, receiving a third message from the terminal on the uplink resource, where the third message is used to request to resume the RRC connection.

It should be noted that, when the first indication information indicates that the terminal is not allowed to perform uplink transmission on the uplink resource indicated by the uplink grant, the third message received by the network device on the uplink resource indicated by the uplink grant is used to only request to resume the RRC connection, and does not include the uplink data. For example, the third message may be the RRC connection resume request.

In the sixth aspect, in a possible implementation, the method further includes: sending a radio resource control RRC connection release message to the terminal, so that when receiving the RRC connection release message from the network device, the terminal controls the timer to stop running, that is, stops the timer. It may be understood that when the terminal receives a radio resource control RRC connection resume message, a connection setup message, or the like from the network device, the terminal may also stop the timer.

In the sixth aspect, in a possible implementation, the response message includes contention resolution information. For example, the contention resolution information may be an identifier of the terminal, a part of information of the second message, or a part of information of the third message.

In the sixth aspect, in a possible implementation, the first message further includes second indication information, and the second indication information is used to indicate a comparison result of a volume of to-be-sent data of the terminal and a data volume threshold.

According to a seventh aspect, an embodiment of this application further provides a configuration method. The configuration method may include: receiving indication information, where the indication information is used to indicate a terminal to monitor, when the terminal is in an inactive state, a physical downlink control channel PDCCH scrambled by a cell radio network temporary identifier C-RNTI; and monitoring, based on the indication information, the PDCCH scrambled by the C-RNTI.

In addition, a configuration apparatus is further provided, and includes units or means configured to perform steps in the seventh aspect.

In addition, a configuration apparatus is provided, and includes a processor and an interface circuit. The processor is configured to communicate with another communication apparatus by using the interface circuit, and perform the method provided in the seventh aspect. There are one or more processors.

In addition, a configuration apparatus is provided, and includes a processor, configured to be connected to a memory, and configured to invoke a program stored in the memory, to perform the method in the seventh aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the seventh aspect.

In addition, a computer program is provided. When the computer program is executed by a processor, the method in the seventh aspect is performed.

In addition, a computer-readable storage medium is provided. The computer-readable storage medium stores a program. When the program is invoked by a processor, the method in the seventh aspect is performed.

In addition, a program product, for example, a computer-readable storage medium, is provided, and includes the foregoing program.

It can be learned that in the seventh aspect, the terminal receives the indication information sent by a network device, where the indication information indicates the terminal to monitor, when the terminal is in the inactive state, the PDCCH scrambled by the C-RNTI, and receive downlink data in a process of monitoring the PDCCH scrambled by the C-RNTI. In an entire receiving process, the terminal directly receives the downlink data in the inactive state without needing to receive paging or initiate an RRC connection resume request. This not only improves transmission efficiency, but also reduces overheads of the terminal.

In the seventh aspect, in a possible implementation, the terminal may receive a radio resource control RRC connection release message, where the RRC connection release message includes the indication information, to obtain the indication information. It may be understood that the indication information may alternatively be carried in a broadcast message.

For example, the indication information may be implemented by using 1 bit. For example, if a value of the bit is 1, it indicates that a function of monitoring, in the inactive state, the physical downlink control channel (PDCCH) scrambled by the C-RNTI is enabled; and if the value of the bit is 0, it indicates that the function of monitoring, in the inactive state, the physical downlink control channel (PDCCH) scrambled by the C-RNTI is disabled. Alternatively, the indication information may be implemented by using an enumeration type, for example, {TRUE} or {downlink reception}. The PDCCH is scrambled by the cell radio network temporary identifier (C-RNTI). Therefore, in another implementation, the indication information may be the C-RNTI. For example, when the RRC connection release message carries the C-RNTI, the terminal is indicated to monitor, in the inactive state, the PDCCH scrambled by the C-RNTI; and if the RRC connection release message does not carry the C-RNTI, the terminal is indicated not to monitor the PDCCH in the inactive state.

In the seventh aspect, in a possible implementation, the monitoring, by the terminal, the PDCCH scrambled by the C-RNTI may include: determining a paging occasion, and monitoring, in a portion of slots or paging frames of the paging occasion, the PDCCH scrambled by the C-RNTI. In this way, the terminal directly receives the downlink data in the inactive state without needing to receive paging or initiate the RRC connection resume request. This not only improves the transmission efficiency, but also reduces the overheads of the terminal.

In the seventh aspect, in a possible implementation, the monitoring, by the terminal, the PDCCH scrambled by the C-RNTI may include: receiving a first parameter, and determining a paging occasion based on the first parameter; and receiving a second parameter, and determining, based on the second parameter, an occasion for monitoring the PDCCH scrambled by the C-RNTI, where the paging occasion is different from the occasion for monitoring the PDCCH scrambled by the C-RNTI. In this way, the terminal directly receives the downlink data in the inactive state without needing to receive paging or initiate the RRC connection resume request. This not only improves the transmission efficiency, but also reduces the overheads of the terminal.

In the seventh aspect, in a possible implementation, when moving out of a valid area of the C-RNTI, the terminal stops monitoring the PDCCH scrambled by the C-RNTI, so that power consumption of the terminal is reduced.

According to an eighth aspect, an embodiment of this application further provides a configuration method. The configuration method may include: determining that a terminal is capable of monitoring, when the terminal is in an inactive state, a physical downlink control channel PDCCH scrambled by a cell radio network temporary identifier C-RNTI; and sending indication information to the terminal, where the indication information is used to indicate the terminal to monitor, when the terminal is in the inactive state, the physical downlink control channel PDCCH scrambled by the cell radio network temporary identifier C-RNTI.

In addition, a configuration apparatus is further provided, and includes units or means configured to perform steps in the eighth aspect.

In addition, a configuration apparatus is provided, and includes a processor and an interface circuit. The processor is configured to communicate with another communication apparatus by using the interface circuit, and perform the method provided in the eighth aspect. There are one or more processors.

In addition, a configuration apparatus is provided, and includes a processor, configured to be connected to a memory, and configured to invoke a program stored in the memory, to perform the method in the eighth aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the eighth aspect.

In addition, a computer program is provided. When the computer program is executed by a processor, the method in the eighth aspect is performed.

In addition, a computer-readable storage medium is provided. The computer-readable storage medium stores a program. When the program is invoked by a processor, the method in the eighth aspect is performed.

In addition, a program product, for example, a computer-readable storage medium, is provided, and includes the foregoing program.

It can be learned that, in this embodiment of this application, a network device sends the indication information to the terminal, to indicate, by using the indication information, the terminal to monitor, when the terminal is in the inactive state, the PDCCH scrambled by the C-RNTI. In this way, the terminal may receive the downlink data in a process of monitoring the PDCCH scrambled by the C-RNTI. In an entire receiving process, the terminal directly receives the downlink data in the inactive state without needing to receive paging or initiate an RRC connection resume request. This not only improves transmission efficiency, but also reduces overheads of the terminal.

In the eighth aspect, in a possible implementation, the network device may send a radio resource control RRC connection release message to the terminal, where the RRC connection release message includes the indication information, so that the terminal obtains the indication information. It may be understood that the indication information may alternatively be carried in a broadcast message.

In the eighth aspect, in a possible implementation, the network device may send a first parameter to the terminal, where the first parameter is used by the terminal to determine a paging occasion based on the first parameter; and send a second parameter to the terminal, where the second parameter is used by the terminal to determine, based on the second parameter, an occasion for monitoring the PDCCH scrambled by the C-RNTI, where the paging occasion is different from the occasion for monitoring the PDCCH scrambled by the C-RNTI. In this way, the terminal directly receives the downlink data in the inactive state without needing to receive paging or initiate the RRC connection resume request. This not only improves the transmission efficiency, but also reduces the overheads of the terminal.

According to a ninth aspect, an embodiment of this application further provides a configuration method. The configuration method may include: A terminal starts a first timer in response to a radio resource control RRC connection resume requirement, and sends an RRC connection resume request message to a network device. During running of the first timer, the terminal restarts the first timer or starts a second timer based on downlink information received from the network device or based on data transmission with the network device.

In addition, a configuration apparatus is further provided, and includes units or means configured to perform steps in the ninth aspect.

In addition, a configuration apparatus is provided, and includes a processor and an interface circuit. The processor is configured to communicate with another communication apparatus by using the interface circuit, and perform the method provided in the ninth aspect. There are one or more processors.

In addition, a configuration apparatus is provided, and includes a processor, configured to be connected to a memory, and configured to invoke a program stored in the memory, to perform the method in the ninth aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the ninth aspect.

In addition, a computer program is provided. When the computer program is executed by a processor, the method in the ninth aspect is performed.

In addition, a computer-readable storage medium is provided. The computer-readable storage medium stores a program. When the program is invoked by a processor, the method in the ninth aspect is performed.

In addition, a program product, for example, a computer-readable storage medium, is provided, and includes the foregoing program.

It can be learned that in the ninth aspect, the terminal restarts the first timer or starts the second timer based on the downlink information received from the network device or based on the data transmission with the terminal. In this way, the terminal may perform data transmission during running of the first timer or the second timer. This can effectively prolong time for the terminal to wait for an RRC response message of the RRC connection resume request, to flexibly support sending of data for a plurality of times.

The configuration method provided in this embodiment of this application may include at least two possible scenarios. In one possible scenario, the terminal starts the first timer when responding to the RRC connection resume requirement, and restarts the first timer when a restart condition is met during running of the first timer, to prolong the time for the terminal to wait for the RRC response message of the RRC connection resume request. It can be learned that, in this possible scenario, the timer restarted when the restart condition is met and the timer started in response to the RRC connection resume requirement are a same timer, and both are the first timer. In the other possible scenario, the terminal starts the first timer when responding to the RRC connection resume requirement, and starts the second timer when a start condition is met during running of the first timer, to prolong the time for the terminal to wait for the RRC response message of the RRC connection resume request. It can be learned that, in this possible scenario, the timer restarted when the restart condition is met is different from the timer started in response to the RRC connection resume requirement, and is a new timer that is additionally set. It may be understood that, in this possible scenario, after the second timer is started, the first timer may be further stopped. Certainly, the first timer may be stopped first and the second timer may be started subsequently, or the first timer may be stopped when the second timer is started. In this way, the second timer is used to replace the first timer, to prolong the time for the terminal to wait for the RRC response message of the RRC connection resume request.

In the ninth aspect, in a possible implementation, the terminal sends uplink data to the network device, where the uplink data and the RRC connection resume request message are sent jointly or independently, the downlink information includes feedback information of the uplink data, and the feedback information of the uplink data is used to indicate whether the uplink data is successfully transmitted.

Joint sending or independent sending in this application means whether the uplink data and the RRC connection resume request message are sent by using a same message, for example, a MAC PDU message. If the uplink data and the RRC connection resume request message are sent by using a same message, it may be understood that the uplink data and the RRC connection resume request message are sent jointly. On the contrary, if the uplink data and the RRC connection resume request message are not sent by using a same message, it may be understood that the uplink data and the RRC connection resume request message are sent independently. In addition, if the uplink data and the RRC connection resume request message are sent independently, the uplink data may be sent during running of the first timer after the RRC connection resume request message is sent.

In the ninth aspect, in a possible implementation, the downlink information includes contention resolution information. If the contention resolution information is contention resolution success, it indicates that the RRC connection resume request message is successfully sent, and the terminal may continue to send new uplink data on a pre-configured grant. On the contrary, if the contention resolution information is a contention resolution failure, it indicates that the RRC connection resume request message fails to be sent, and the terminal may continue to retransmit the RRC connection resume request message on the pre-configured grant.

In the ninth aspect, in a possible implementation, the downlink information includes uplink grant information, and an uplink resource indicated by the uplink grant information may be used for retransmission of original uplink data, or may be used for initial transmission of new uplink data, to implement data transmission for a plurality of times. Generally, if the original uplink data needs to be retransmitted and the new uplink data needs to be initially transmitted, first, the new uplink data may be initially transmitted by using the uplink resource indicated by the uplink grant information, that is, a transmission priority of the initial data transmission is higher than a transmission priority of the data retransmission.

In the ninth aspect, in a possible implementation, the terminal sends the uplink data by using the uplink resource indicated by the uplink grant information.

In the ninth aspect, in a possible implementation, the downlink information includes downlink resource allocation information, and a downlink resource indicated by the downlink resource allocation information may be used for retransmission of original downlink data, or may be used for initial transmission of new downlink data, to implement early transmission of downlink data.

In this embodiment of this application, the uplink grant information and the downlink resource allocation information may exist independently, that is, the downlink information received by the terminal may include the uplink grant information or the downlink resource allocation information. The uplink grant information and the downlink resource allocation information may coexist and be combined with each other, that is, the downlink information received by the terminal may include both the uplink grant information and the downlink resource allocation information.

In the ninth aspect, in a possible implementation, the terminal receives the downlink data on the downlink resource indicated by the downlink resource allocation information.

In the ninth aspect, in a possible implementation, the downlink information includes indication information, and the indication information is used to indicate the terminal to restart the first timer. In this way, after receiving the information including the indication information, the terminal may restart the first timer, so that data transmission is performed during running of the first timer. This can effectively prolong the time for the terminal to wait for the RRC response message of the RRC connection resume request, to flexibly support sending of data for a plurality of times.

In the ninth aspect, in a possible implementation, the terminal receives a broadcast message or an RRC message from the network device, where the broadcast message or the RRC message includes information about the first timer, and the information about the first timer is used to indicate duration of the first timer. In this way, the terminal may set the duration of the first timer based on the information about the first timer.

In the ninth aspect, in a possible implementation, the first timer is a T319 timer.

In the ninth aspect, in a possible implementation, the first timer is an RRC layer timer or a MAC layer timer other than a T319 timer, and during running of the first timer, the terminal restarts the first timer based on the downlink information received from the network device or based on the data transmission with the network device; or the first timer is a T319 timer, the second timer is an RRC layer timer or a MAC layer timer other than the T319 timer, and during running of the first timer, the terminal starts or restarts the second timer based on the downlink information received from the network device or based on the data transmission with the network device.

In the ninth aspect, in a possible implementation, the terminal sends indication information to the network device, where the indication information is used to indicate the first timer or second timer started by the network device, to synchronize information about a currently started timer to the network device.

In the ninth aspect, in a possible implementation, when starting the second timer, the terminal stops the first timer. In this way, power consumption generated because the first timer is in a running state can be reduced.

In the ninth aspect, in a possible implementation, the terminal stops the first timer or the second timer when receiving an RRC connection resume message, an RRC connection setup message, or an RRC connection release message from the network device.

According to a tenth aspect, an embodiment of this application further provides a configuration method. The configuration method may include: receiving a radio resource control RRC connection resume request message from a terminal, where the RRC connection resume request message is sent by the terminal after the terminal starts a first timer in response to a radio resource control RRC connection resume requirement; and during running of the first timer, sending downlink information to the terminal or performing data transmission with the terminal, to indicate to restart the first timer or start a second timer based on the downlink information received from a network device or based on the data transmission with the network device.

In addition, a configuration apparatus is further provided, and includes units or means configured to perform steps in the tenth aspect.

In addition, a configuration apparatus is provided, and includes a processor and an interface circuit. The processor is configured to communicate with another communication apparatus by using the interface circuit, and perform the method provided in the tenth aspect. There are one or more processors.

In addition, a configuration apparatus is provided, and includes a processor, configured to be connected to a memory, and configured to invoke a program stored in the memory, to perform the method in the tenth aspect. The memory may be located inside the apparatus, or may be located outside the apparatus. In addition, there are one or more processors.

In addition, a configuration apparatus is provided, and includes at least one processor and at least one memory. The at least one processor is configured to perform the method provided in the tenth aspect.

In addition, a computer program is provided. When the computer program is executed by a processor, the method in the tenth aspect is performed.

In addition, a computer-readable storage medium is provided. The computer-readable storage medium stores a program. When the program is invoked by a processor, the method in the tenth aspect is performed.

In addition, a program product, for example, a computer-readable storage medium, is provided, and includes the foregoing program.

It can be learned that in the tenth aspect, the network device sends the downlink information to the terminal or performs data transmission with the terminal, so that the terminal may restart the first timer or start the second timer based on the downlink information received from the network device or based on the data transmission with the terminal. In this way, the terminal may perform data transmission during running of the first timer or the second timer. This can effectively prolong time for the terminal to wait for an RRC response message of the RRC connection resume request, to flexibly support sending of data for a plurality of times.

In the tenth aspect, in a possible implementation, the method further includes: receiving uplink data from the terminal, where the uplink data and the RRC connection resume request message are sent jointly or independently, the downlink information includes feedback information of the uplink data, and the feedback information of the uplink data is used to indicate whether the uplink data is successfully transmitted.

Joint sending or independent sending in this application means whether the uplink data and the RRC connection resume request message are sent by using a same message, for example, a MAC PDU message. If the uplink data and the RRC connection resume request message are sent by using a same message, it may be understood that the uplink data and the RRC connection resume request message are sent jointly. On the contrary, if the uplink data and the RRC connection resume request message are not sent by using a same message, it may be understood that the uplink data and the RRC connection resume request message are sent independently. In addition, if the uplink data and the RRC connection resume request message are sent independently, the uplink data may be sent during running of the first timer after the RRC connection resume request message is sent.

In the tenth aspect, in a possible implementation, the downlink information includes contention resolution information. If the contention resolution information is contention resolution success, it indicates that the RRC connection resume request message is successfully sent, and the terminal may continue to send new uplink data on a pre-configured grant. On the contrary, if the contention resolution information is a contention resolution failure, it indicates that the RRC connection resume request message fails to be sent, and the terminal may continue to retransmit the RRC connection resume request message on the pre-configured grant.

In the tenth aspect, in a possible implementation, the downlink information includes uplink grant information, and an uplink resource indicated by the uplink grant information may be used for retransmission of original uplink data, or may be used for initial transmission of new uplink data, to implement data transmission for a plurality of times. Generally, if the original uplink data needs to be retransmitted and the new uplink data needs to be initially transmitted, first, the new uplink data may be initially transmitted by using the uplink resource indicated by the uplink grant information, that is, a transmission priority of the initial data transmission is higher than a transmission priority of the data retransmission.

In the tenth aspect, in a possible implementation, the method further includes: receiving, from the terminal, the uplink data that is sent by using the uplink resource indicated by the uplink grant information.

In the tenth aspect, in a possible implementation, the downlink information includes downlink resource allocation information, and a downlink resource indicated by the downlink resource allocation information may be used for retransmission of original downlink data, or may be used for initial transmission of new downlink data, to implement early transmission of downlink data.

In this embodiment of this application, the uplink grant information and the downlink resource allocation information may exist independently, that is, the downlink information received by the terminal may include the uplink grant information or the downlink resource allocation information. The uplink grant information and the downlink resource allocation information may coexist and be combined with each other, that is, the downlink information received by the terminal may include both the uplink grant information and the downlink resource allocation information.

In the tenth aspect, in a possible implementation, the method further includes: sending the downlink data to the terminal on the downlink resource indicated by the downlink resource allocation information.

In the tenth aspect, in a possible implementation, the downlink information includes indication information, and the indication information is used to indicate the terminal to restart the first timer. In this way, after receiving the information including the indication information, the terminal may restart the first timer, so that data transmission is performed during running of the first timer. This can effectively prolong the time for the terminal to wait for the RRC response message of the RRC connection resume request, to flexibly support sending of data for a plurality of times.

In the tenth aspect, in a possible implementation, the method further includes: sending a broadcast message or an RRC message to the terminal, where the broadcast message or the RRC message includes information about the first timer, and the information about the first timer is used to indicate duration of the first timer. In this way, the terminal may set the duration of the first timer based on the information about the first timer.

In the tenth aspect, in a possible implementation, the first timer is a T319 timer.

In the tenth aspect, in a possible implementation, the first timer is an RRC layer timer or a MAC layer timer other than a T319 timer, and during running of the first timer, the first timer is restarted by the terminal based on the downlink information received from the network device or based on the data transmission with the network device; or the first timer is a T319 timer, the second timer is an RRC layer timer or a MAC layer timer other than the T319 timer, and during running of the first timer, the second timer is started or restarted by the terminal based on the downlink information received from the network device or based on the data transmission with the network device.

In the tenth aspect, in a possible implementation, the method further includes: receiving indication information from the terminal, where the indication information is used to indicate the first timer or second timer started by the network device, to synchronize information about a currently started timer to the network device.

It should be understood that the apparatus shown in the foregoing aspects may be a chip. A processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in a memory. The memory may be integrated into the processor, may be located outside the processor, or may exist independently.

There are one or more processors, and there are one or more memories.

The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

For the foregoing information transmission or receiving process, for example, sending of the random access request may be a process of outputting the random access request by the processor, and receiving of the response message of the random access request may be a process of receiving the response message of the random access request from the processor. Specifically, the random access request output by the processor may be output to a transmitter, and the response message of the input random access request received by the processor may be from a receiver. The transmitter and the receiver may be collectively referred to as a transceiver.

DETAILED DESCRIPTION OF ILLUSTRATIVE EMBODIMENTS

Embodiments of this application are applied to a communication system, for example, a wideband code division multiple access (WCDMA) system, a time division-synchronous code division multiple access (TD-SCDMA) system, a long term evolution (LTE) system, a public land mobile network (PLMN) system, even a 5th generation (5G) communication system, or another system that may appear in the future. The following describes some terms in this application, to facilitate understanding by a person skilled in the art. It should be noted that, when solutions in embodiments of this application are applied to the 5G communication system or the another system that may appear in the future, names of a network device and a terminal may change, but this does not affect implementation of the solutions in embodiments of this application.

Figure 1:
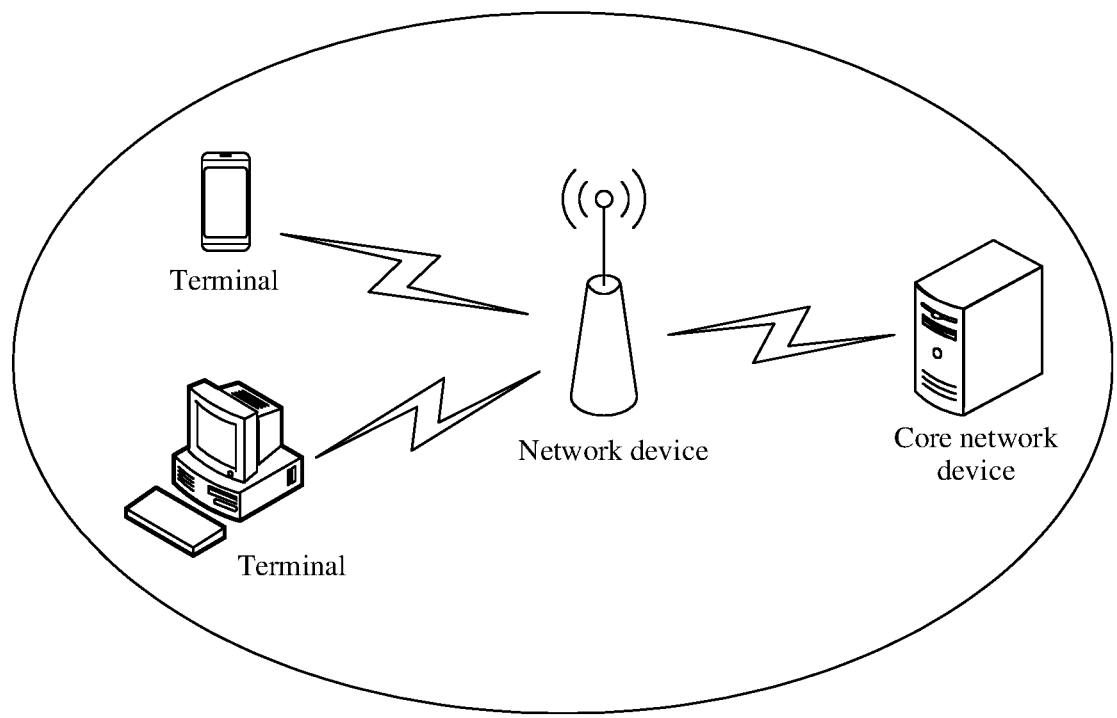
FIG. 1 is a schematic diagram of an application scenario according to an embodiment of this application.

To properly allocate a configuration parameter to a terminal in an inactive state, an embodiment of this application provides a configuration method. For example, refer to FIG. 1. FIG. 1 is a schematic diagram of an application scenario according to an embodiment of this application. A communication system shown in this application scenario may include at least one terminal and a network device, and certainly, may further include a core network device. When indicating, by using an RRC connection release message, the terminal to enter the inactive state from a connected state, the network device may include, in the RRC connection release message, a configuration parameter allocated to the terminal in the inactive state. That is, the terminal receives the radio resource control RRC connection release message sent by the network device, where the RRC connection release message includes first information used to indicate a target configuration parameter. In this way, the terminal may enter the inactive state based on the RRC connection release message, and determine a context parameter of the inactive state based on the first information, where the context parameter of the inactive state includes the target configuration parameter, or the context parameter of the inactive state includes a parameter other than the target configuration parameter in a context parameter of the terminal, so that the configuration parameter is properly indicated to the terminal in the inactive state.

It may be understood that, in this embodiment of this application, there may be two different scenarios in which the network device properly indicates the configuration parameter to the terminal in the inactive state by using the first information. In one scenario, the network device may indicate, by using the first information, the configuration parameter configured for the terminal in the inactive state, so that the terminal retains the configuration parameter configured for the terminal. In the other scenario, the network device may indicate, by using the first information, a configuration parameter that needs to be released by the terminal in the inactive state, so that the terminal in the inactive state releases the configuration parameter that needs to be released. In the two different scenarios, target configuration parameters indicated by the first information are different.

For a plurality of terminals in the inactive state, because the network device needs to store context information of each of the terminals in the inactive state, to reduce storage overheads of the network device, some configuration parameters of the plurality of the terminals may be solidified. Generally, the terminals may have three types of configuration parameters. The three types of configuration parameters are respectively a security-related configuration parameter, a radio bearer configuration parameter, and a cell group configuration parameter. Because security-related configuration parameters of the terminals are completely different, the security-related configuration parameters are not solidified. However, radio bearer configuration parameters and/or cell group configuration parameters of the terminals may be solidified. The radio bearer configuration parameters and/or cell group configuration parameters of the plurality of terminals are solidified, so that at least two terminals are corresponding to a same set of configuration parameters. In this way, the network device needs to store only one set of configuration information when storing configuration information of the at least two terminals, to reduce the storage overheads of the network device. Based on this, when the network device indicates the configuration parameter to the terminal in the inactive state by using the first information, the target configuration parameter indicated by the first information may also include a radio bearer configuration parameter and/or a cell group configuration parameter. A security-related configuration parameter configured by the network device for the terminal may be independently sent to the terminal, or certainly may be sent to the terminal together with the first information. This may be specifically set based on an actual requirement.

Because the security-related configuration parameter is irrelevant to implementation of this embodiment of this application, the following context parameter of the inactive state in this embodiment of this application does not include the security-related configuration parameter, and refers to a radio bearer configuration parameter and a cell group configuration parameter. For example, the radio bearer configuration parameter may include one or more of parameters, such as a packet data convergence protocol (PDCP) layer parameter, a service data adaptation protocol (SDAP) layer parameter, a data bearer (data radio bearer, DRB) identifier parameter, and an evolved packet system (EPS) bearer identifier. The cell group configuration parameter may include one or more of parameters, such as a cell group identifier, a radio link control (RLC) configuration parameter of a bearer, a cell group configuration parameter of a medium access control (MAC) layer, a physical cell group configuration parameter, a configuration parameter of a special cell (PSCell+PCell, Spcell), and a configuration parameter of a secondary cell (Scell). For example, the PDCP layer parameter may include a timeout timer (discardTimer), an uplink/downlink PDCP SN size, a header compression configuration, integrity protection enabling, a PDCP status report requirement carried in an acknowledged mode (AM), out-of-order delivery, a split or duplication configuration, and a reordering timer. The SDAP layer parameter may include one or more of a session identifier (Session ID), whether an uplink/downlink SDAP header exists, whether a bearer is a default data bearer (data radio bearer, DRB), a quality of service flow identifier (QoS flow identifier, QFI), and the like. The cell group identifier may include an identifier indicating a primary cell group or a secondary cell group. The RLC configuration parameter of the bearer may include three types of information. One type of information is identifier type information, including a radio bearer (radio bearer, RB) identifier and a logical channel (LCH) identifier. One type of information is RLC configuration information, including an SN length of an RLC PDU, a reassembly timer for segments, a maximum quantity of times of retransmission of acknowledged mode (AM) RLC, a request parameter for controlling the RLC in the AM mode to send a status report to a receive end, and a prohibition timer for sending an RLC status report by the AM RLC. The other type of information is logical channel configuration information, and may include one or more of a parameter used in a priority processing process (for example, an allowed subcarrier spacing, duration of a transport block (TB) of a physical uplink shared channel (PUSCH), a sending rate, or a logical channel priority), and a scheduling request (SR) configuration corresponding to an LCH. The cell group configuration parameter of the MAC layer may include a discontinuous reception (DRX) configuration, an SR, a buffer status report (BSR), a configuration parameter of a power headroom report (PHR), a timer for triggering RRC connection release, a timing adjustment group identifier, and a timing adjustment timer. The physical cell group configuration parameter may include one or more of an identifier (x-RNTI) of a terminal used for power control or resource scheduling, configuration information for controlling downlink feedback, and maximum transmit power of a low frequency band FR1. The configuration parameter of the SpCell may include one or more of CellIndex, a cell group identifier, a radio link failure detection configuration, a detection configuration for monitoring a radio link, measurement configuration information, a physical downlink control channel (PDCCH), a physical downlink shared channel (PDSCH), a configuration parameter of the PUSCH, an uplink (uplink, UL) bandwidth part configuration and a downlink bandwidth part (DL BWP) configuration, an initial DL BWP configuration, an initially activated BWP ID, and a timer for managing an activated BWP. For the configuration parameter of the SCell, the configuration parameter of the SCell exists only when carrier aggregation (CA) or dual connectivity (DC) is configured, and the configuration parameter of the SCell is a subset of configuration information of the SpCell.

(1) The terminal is also referred to as user equipment (UE), a mobile station (MS), a mobile terminal (MT), or the like, and is a device that provides voice/data connectivity for a user, for example, a handheld device or a vehicle-mounted device having a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

(2) The network device is a device in a wireless network, for example, a radio access network (RAN) node that enables the terminal to access the wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

(3) In embodiments of this application, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be in a singular or plural form. In textual description of this application, the character "/" usually indicates an "or" relationship between the associated objects. In addition, elements in a singular form: "a", "an", and "the", do not mean "one or only one" but "one or more" unless otherwise expressly specified in the context. For example, "a device" means one or more such devices. Further, "at least one (at least one of) . . . " means one or any combination of subsequent associated objects. For example, "at least one of A, B, and C" includes A, B, C, AB, AC, BC, or ABC. Determining Y based on X does not mean that Y is determined based on only X, and Y may also be determined based on X and/or other information.

Figure 2:
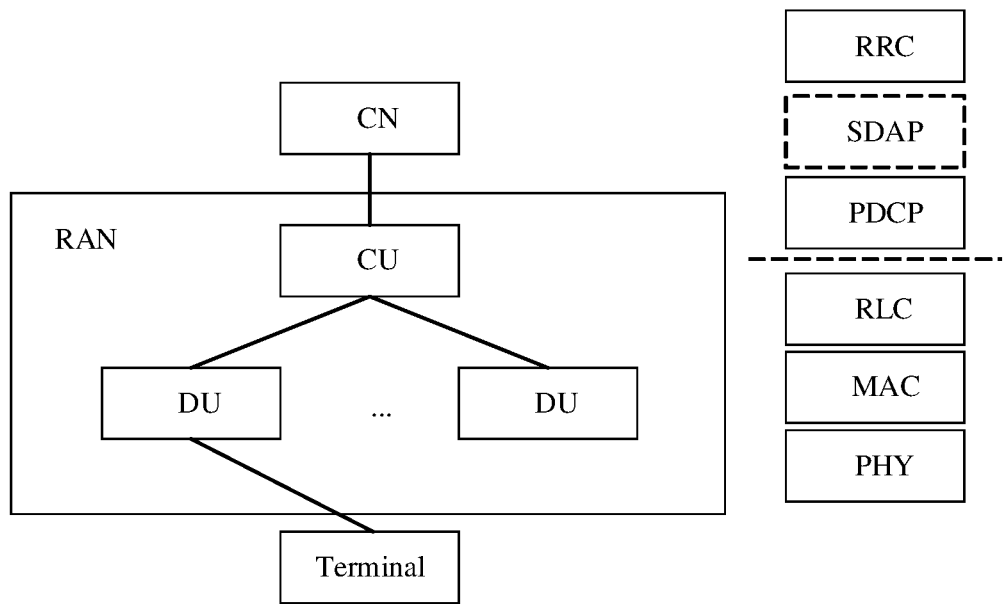
FIG. 2 is a schematic diagram of a network architecture according to an embodiment of this application.

For example, refer to FIG. 2. FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in a long term evolution (LTE) communication system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include the functions of the protocol layers such as the PDCP layer, the RLC layer, the MAC layer, and the physical layer. In an implementation, a service data adaptation protocol (SDAP) layer may be further included above the PDCP layer.

The functions of these protocol layers may be implemented by one node, or may be implemented by a plurality of nodes. For example, in an evolved structure, a RAN device may include a centralized unit (CU) and a distributed unit (DU). A plurality of DUs may be centrally controlled by one CU. As shown in FIG. 2, the CU and the DU may be divided based on a protocol layer of a wireless network. For example, functions of both the PDCP layer and a layer above the PDCP layer are deployed on the CU, and functions of protocol layers below the PDCP layer, such as the RLC layer and the MAC layer, are deployed on the DU.

Division based on the protocol layer is merely an example, and division may alternatively be performed based on another protocol layer, such as the RLC layer. Functions of both the RLC layer and a protocol layer above the RLC layer are deployed on the CU, and a function of a protocol layer below the RLC layer is deployed on the DU. Alternatively, division is performed based on a protocol layer. For example, some functions of the RLC layer and a function of a protocol layer above the RLC layer are deployed on the CU, and a remaining function of the RLC layer and a function of a protocol layer below the RLC layer are deployed on the DU. In addition, division may alternatively be performed in another manner. For example, the division is performed based on a delay. A function whose processing time needs to satisfy a delay requirement is deployed on the DU, and a function whose processing time does not need to satisfy the delay requirement is deployed on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
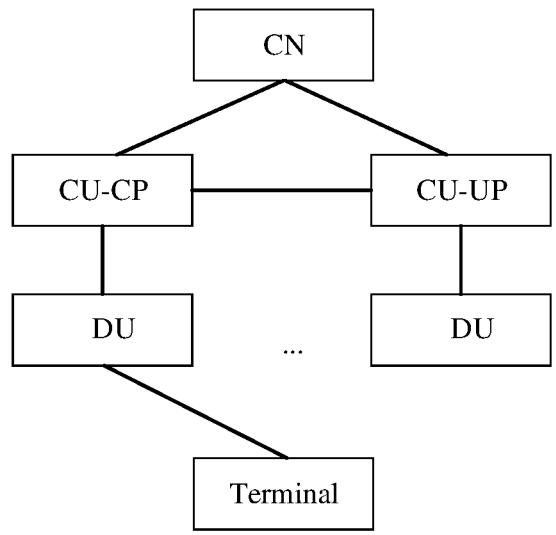
FIG. 3 is a schematic diagram of another network architecture according to an embodiment of this application.

Continue to refer to FIG. 3. FIG. 3 is a schematic diagram of another network architecture according to an embodiment of this application. Different from the architecture shown in FIG. 2, a control plane (CP) and a user plane (UP) of a CU may be further separated, and are implemented by a control plane CU entity (CU-CP entity) and a user plane CU entity (CU-UP entity) respectively.

In the foregoing network architecture, signaling generated by the CU may be sent to a terminal by using a DU, or signaling generated by the terminal may be sent to the CU by using the DU. The DU may transparently transmit the signaling to the terminal or the CU by directly encapsulating the signaling at a protocol layer without parsing the signaling. In the following embodiments, if transmission of such signaling between the DU and the terminal is included, sending or receiving of the signaling by the DU includes this scenario. For example, signaling at an RRC layer or a PDCP layer is finally processed as signaling at a PHY layer and sent to the terminal, or is converted from received signaling at a PHY layer. In this architecture, it may also be considered that the signaling at the RRC layer or the PDCP layer is sent by the DU, or sent by the DU and a radio frequency apparatus.

In the foregoing embodiment, the CU is classified as a network device on a RAN side. In addition, the CU may alternatively be classified as a network device on a CN side. This is not limited herein.

An apparatus in the following embodiments of this application may be located in a terminal or a network device based on functions implemented by the apparatus. When the foregoing CU-DU structure is used, a network device may be a CU node, a DU node, or a RAN device including a CU node and a DU node.

It can be learned from the foregoing descriptions that there may be two different scenarios in which the network device indicates the terminal to enter an inactive state from a connected state, and properly indicates a configuration parameter to the terminal in the inactive state by using first information. In one possible scenario, the network device may indicate, by using the first information, a configuration parameter configured for the terminal in the inactive state, so that the terminal in the inactive state retains the configuration parameter configured for the terminal. In the other possible scenario, the network device may indicate, by using the first information, a configuration parameter that needs to be released by the terminal in the inactive state, so that the terminal in the inactive state releases the configuration parameter that needs to be released. In the two different scenarios, target configuration parameters indicated by the first information are different. The following describes in detail technical solutions corresponding to the two different scenarios with reference to detailed embodiments.

In a possible scenario, when the network device indicates, by using the first information, the configuration parameter configured for the terminal, to enable the terminal to retain the configuration parameter configured for the terminal, the network device may indicate, to the terminal in two different manners, the configuration parameter that needs to be retained. In one manner, the network device may indicate, to the terminal in a direct indication manner, the target configuration parameter that needs to be retained, that is, the target configuration parameter indicated by the first information is the configuration parameter that needs to be retained by the terminal, so that after receiving the first information, the terminal directly determines, based on the target configuration parameter indicated by the first information, the configuration parameter that needs to be retained, and retains the target configuration parameter. In the other manner, the network device may indicate, to the terminal in an indirect indication manner, the configuration parameter that needs to be retained, that is, the target configuration parameter indicated by the first information is not the configuration parameter that needs to be retained by the terminal, so that after receiving the first information, the terminal determines a parameter other than the target configuration parameter based on the target configuration parameter indicated by the first information, where the parameter other than the target parameter is the configuration parameter that needs to be retained by the terminal. It can be learned that, in the two different manners, definitions of the target configuration parameters indicated by the first information are different. In the first manner, the target configuration parameter indicated by the first information is the configuration parameter that needs to be retained by the terminal. In the second manner, the target configuration parameter indicated by the first information is not the configuration parameter that needs to be retained by the terminal, and the parameter other than the target configuration parameter is the configuration parameter that needs to be retained by the terminal. Therefore, in the two different manners, the target configuration parameters indicated by the first information are different.

Figure 4:
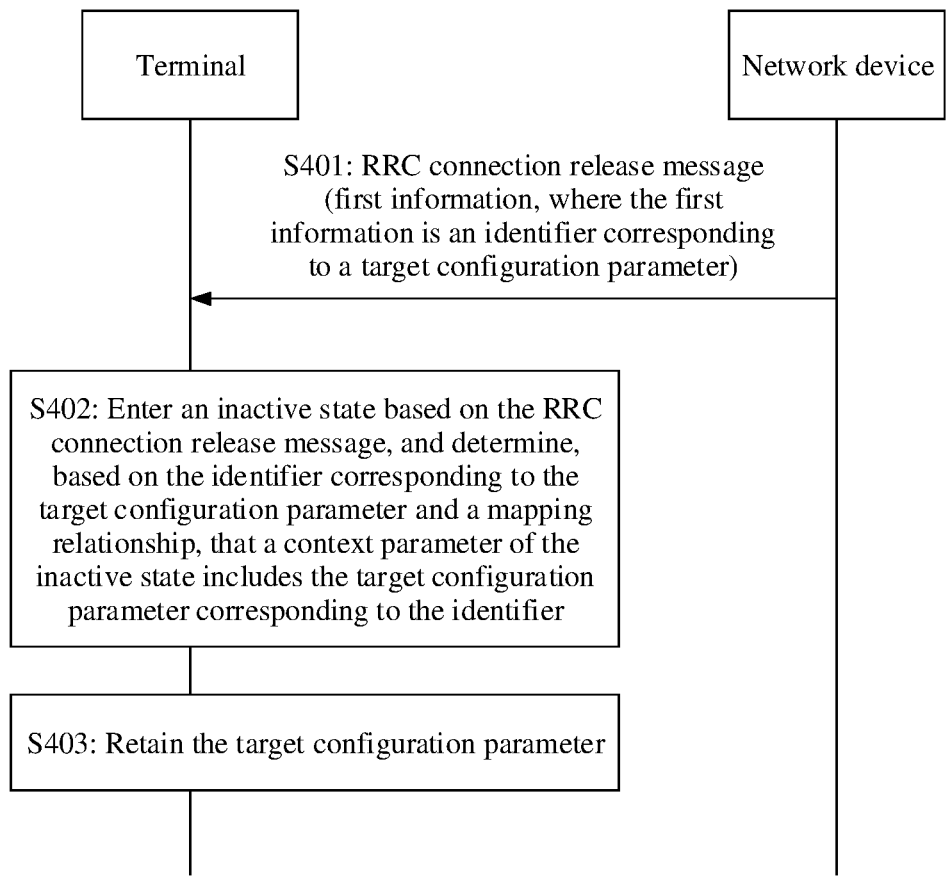
FIG. 4 is a schematic flowchart of a configuration method according to an embodiment of this application.

In this possible scenario, the first indication manner is mainly used as an example for description. To be specific, the target configuration parameter indicated by the first information is the configuration parameter that needs to be retained by the terminal. When indicating, by using the first information, the target configuration parameter that needs to be retained by the terminal, the network device may indicate, in two possible manners, the target configuration parameter that needs to be retained by the terminal. In one possible manner, the first information is an identifier of the target configuration parameter, that is, the network device indicates the identifier of the target configuration parameter to the terminal, so that the terminal determines, based on the identifier of the target configuration parameter, the target configuration parameter that needs to be retained. In the other possible manner, the first information is the target configuration parameter, that is, the network device directly indicates the target configuration parameter to the terminal, so that the terminal can directly obtain the target configuration parameter that needs to be retained. First, for example, the first information is the identifier of the target configuration parameter. For example, refer to FIG. 4. FIG. 4 is a schematic flowchart of a configuration method according to an embodiment of this application. The configuration method may include the following steps.

S401: A network device sends a radio resource control (RRC) connection release message to a terminal.

The RRC connection release message includes first information, and the first information is an identifier of a target configuration parameter. For example, the target configuration parameter may include a radio bearer configuration parameter and/or a cell group configuration parameter.

Refer to the foregoing related descriptions of the configuration parameter. To reduce storage overheads of the network device, the network device may solidify radio bearer configuration parameters and/or cell group configuration parameters of at least two terminals, so that the at least two terminals are corresponding to a same set of configuration parameters. This reduces the storage overheads of the network device. After the solidification, a plurality of configuration parameter sets may be obtained. Then, one or more proper configuration parameter sets in the plurality of configuration parameter sets are allocated to the terminal. The configuration parameter may be referred to as an access stratum configuration parameter, and the access stratum configuration parameter may include the radio bearer configuration parameter or the cell group configuration parameter, or include both the radio bearer configuration parameter and the cell group configuration parameter. The access stratum configuration parameter is used as an example. After the solidification, a plurality of predefined access stratum configuration parameter sets: a set 1, a set 2, a set 3, . . . , and a set N, may be obtained. Optionally, when a proper access stratum configuration parameter set is allocated to the terminal, a corresponding access stratum configuration parameter set may be allocated to the terminal based on a mode corresponding to a data radio bearer DRB of the terminal. When the mode corresponding to the DRB of the terminal is an acknowledged mode AM, a parameter in the set 1 may be indicated to the terminal as the target configuration parameter. The set 1 may include one or more of an SDAP parameter, a PDCP parameter, an RLC parameter, and a cell group configuration parameter of a MAC layer. The set 1 may also include a DRB ID. The SDAP parameter may include one or more of whether an uplink/downlink SDAP header exists, whether a bearer a default DRB, and a QFI. Optionally, the SDAP parameter may further include a session ID. The PDCP parameter may include one or more of discardTimer, an uplink/downlink PDSP SN size, a header compression configuration, integrity protection enabling, a PDCP status report requirement carried in the AM, out-of-order sending, and a reordering timer. The RLC parameters may include one or more of an RB identifier, an LCH identifier, RLC configuration information, an SN length of an RLC PDU, a reassembly timer for segments, a maximum quantity of times of retransmission of AM RLC, a request parameter for controlling sending of a poll to a receive end in the AM mode, and a prohibition timer for sending an RLC status report by the AM RLC. The cell group configuration parameter of the MAC layer may include one or more of a subcarrier spacing allowed by one LCH ID, duration of a TB of a PUSCH, a sending rate, and a logical channel priority. If the set 1 does not include the session ID, the network device may further indicate a session ID associated with the parameter in the set 1 to the terminal. Similarly, if the set 1 does not include an RB ID, the network device may further indicate an RB ID associated with the parameter in the set 1 to the terminal.

On the contrary, when the mode corresponding to the DRB of the terminal is an unacknowledged mode UM, a parameter in the set 2 may be indicated to the terminal as the target configuration parameter. The set 2 may include one or more of a PDCP parameter and an RLC parameter. Certainly, the set 2 may alternatively include one or more of an SDAP parameter and a cell group configuration parameter of a MAC layer. The PDCP parameter may include one or more of discardTimer, an uplink/downlink PDSP SN size, a header compression configuration, integrity protection enabling, out-of-order delivery, and a reordering timer. The RLC parameter may include one or more of an RB identifier, an LCH identifier, RLC configuration information, an SN length of an RLC PDU, and a segment reassembly timer. The SDAP parameter may include one or more of whether an uplink/downlink SDAP header exists, whether a bearer is a default DRB, and a QFI. Optionally, the SDAP parameter may further include a session ID. The cell group configuration parameter of the MAC layer may include one or more of a subcarrier spacing allowed by one LCH ID, duration of a TB of a PUSCH, a sending rate, and a logical channel priority. If the set 2 does not include the session ID, the network device may further indicate a session ID associated with the parameter in the set 2 to the terminal. Similarly, if the set 2 does not include an RB ID, the network device may further indicate an RB ID associated with the parameter in the set 2 to the terminal.

With reference to the foregoing descriptions about the set 1 and the set 2, the set 3, the set 4, the set 5, and the set 6 may be further defined based on the set 1 and the set 2. For example, the set 3 may be defined as a set including the set 1 and a configuration parameter of a SpCell. The set 4 may be defined as a set including the set 2 and the configuration parameter of the SpCell. The set 5 may be defined as a set including the set 3 and a configuration parameter of an SCell. The set 6 may be defined as a set including the set 4 and the configuration parameter of the SCell. Certainly, in this embodiment of this application, the set 1, the set 2, the set 3, the set 4, the set 5, and the set 6 are merely used as examples for description, but this does not mean that this embodiment of this application is limited thereto.

It may be understood that the network device indicates, to the terminal, a configuration parameter set suitable for the terminal, which essentially indicates a configuration parameter in the configuration parameter set to the terminal, that is, allocates the configuration parameter in the configuration parameter set to the terminal as the target configuration parameter. When indicating the target configuration parameter to the terminal, the network device may include the identifier of the target configuration parameter, as the first information, in the RRC connection release message and send the RRC connection release message to the terminal, so that the terminal performs S402 based on the RRC connection release.

S402: The terminal enters an inactive state based on the RRC connection release message, and determines, based on the identifier corresponding to the target configuration parameter and a mapping relationship, that a context parameter of the inactive state includes the target configuration parameter corresponding to the identifier.

For example, the identifier of the target configuration parameter may be a set identifier of a configuration parameter set, for example, an identifier of the set 1 or an identifier of the set 2.

After receiving the RRC connection release message sent by the network device, the terminal enters the inactive state based on the RRC connection release message. In addition, because the terminal stores the mapping relationship between the identifier corresponding to the configuration parameter and the configuration parameter in advance, after receiving the first information that is sent by the network device and that is the identifier corresponding to the target configuration parameter, the terminal may search, based on the identifier corresponding to the target configuration parameter, the mapping relationship for the identifier corresponding to the target configuration parameter, and determine that a configuration parameter corresponding to the identifier corresponding to the target configuration parameter is a target configuration parameter that needs to be retained, for example, a configuration parameter in the set 1 or a configuration parameter in the set 2, to obtain the target configuration parameter, so as to retain the configuration parameter in the set 1 or the configuration parameter in the set 2, and perform configuration based on the target configuration parameter.

S403: The terminal retains the target configuration parameter.

Further, the network device solidifies radio bearer configuration parameters and/or cell group configuration parameters of a plurality of terminals, so that at least two terminals are corresponding to a same set of configuration parameters. In this way, when the plurality of terminals enter the inactive state from the connected state, the network device needs to store only one set of configuration information when storing configuration information of the at least two terminals, to reduce the storage overheads of the network device.

In addition, after entering the inactive state from the connected state based on the RRC connection release message, the terminal may further release a part or all of MAC layer configuration information, RLC layer configuration information, PDCP layer configuration information, SDAP layer configuration information, physical cell group configuration information, a SpCell configuration, and SCell configuration information in the connected state.

It should be noted that, before sending the RRC connection release message to the terminal, the network device may first obtain capability information reported by the terminal, and determine, based on the capability information reported by the terminal, whether the terminal supports data transmission in the inactive state. For example, when reporting the capability information of the terminal, the terminal may report the capability information of the terminal to the network device in at least four possible manners. For example, the terminal supports data transmission in the inactive state. The four possible manners are: The terminal can support data transmission in the inactive state, the terminal supports configuration of the context parameter of the terminal by using a pre-configuration identifier, the terminal supports a common parameter configuration in the inactive state (in other words, the terminal supports a lightweight access stratum configuration parameter), and the terminal supports a session of data transmission in a direct inactive state. Although the expression manners are different, the four different manners may all be used to indicate that the terminal supports data transmission in the inactive state.

Figure 5:
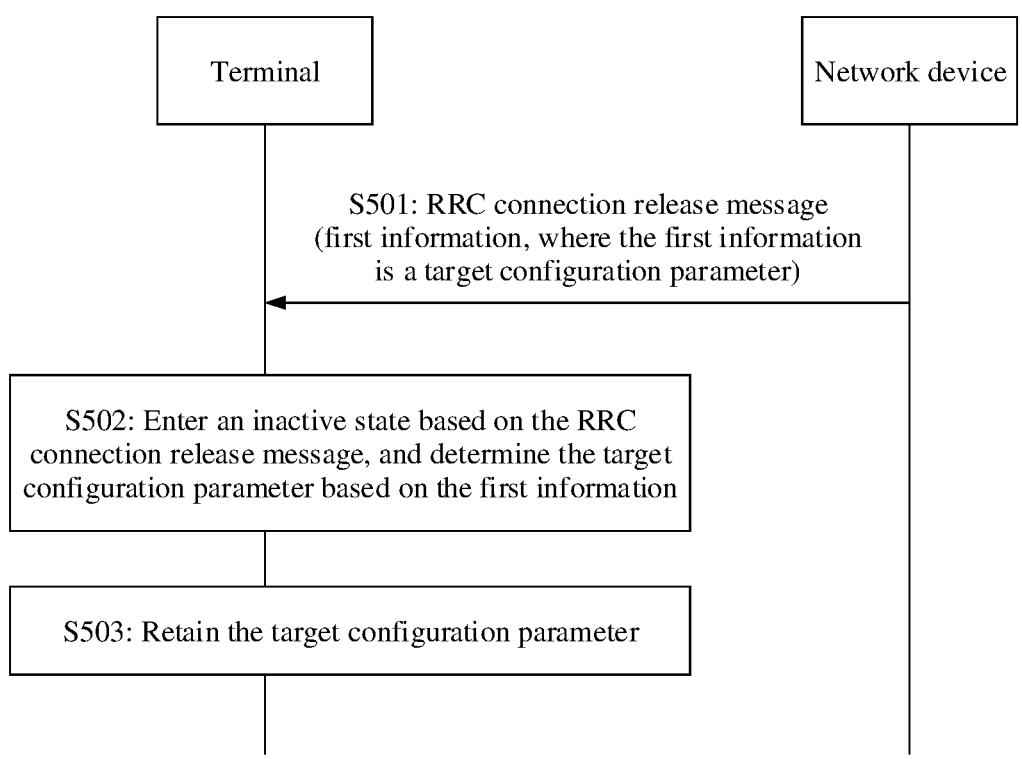
FIG. 5 is a schematic flowchart of another configuration method according to an embodiment of this application.

It can be learned that a technical solution in the possible scenario is described in detail in the embodiment shown in FIG. 4, where the solution is that when the first information is the identifier of the target configuration parameter, the network device indicates, by using the identifier of the target configuration parameter, the target configuration parameter that needs to be retained by the terminal. A technical solution in the other possible scenario is described in detail in the following descriptions, where the solution is that when the first information is the target configuration parameter, the network device indicates, by using the target configuration parameter, the target configuration parameter that needs to be retained by the terminal. For example, refer to FIG. 5. FIG. 5 is a schematic flowchart of another configuration method according to an embodiment of this application. The configuration method may include the following steps.

S501: A network device sends a radio resource control RRC connection release message to a terminal.

The RRC connection release message includes first information, and the first information is a target configuration parameter. For example, the target configuration parameter may include a radio bearer configuration parameter and/or a cell group configuration parameter.

Refer to the foregoing related descriptions of the configuration parameter. To reduce storage overheads of the network device, the network device may solidify radio bearer configuration parameters and/or cell group configuration parameters of at least two terminals, so that the at least two terminals are corresponding to a same set of configuration parameters. This reduces the storage overheads of the network device. After the solidification, a plurality of configuration parameter sets may be obtained. Then, one or more proper configuration parameter sets in the plurality of configuration parameter sets are allocated to the terminal. It may be understood that, in this possible scenario, the method used by the network device to obtain the plurality of configuration parameter sets in advance is similar to the method used by the network device to obtain the plurality of configuration parameter sets in advance in S401, and the method for indicating the one or more proper configuration parameter sets to the terminal is similar to the method for indicating the one or more proper configuration parameter sets to the terminal in S401. For details, refer to the related descriptions in S401. Herein, details are not described again in this embodiment of this application.

It can be learned that, in the embodiment shown in FIG. 5, different from the technical solution in the embodiment shown in FIG. 4, when indicating a target configuration parameter that needs to be retained by the terminal, the network device directly uses the target configuration parameter in the configuration parameter set as the first information, includes the first information in the RRC connection release message, and sends the RRC connection release message to the terminal, so that the terminal performs S502 based on the RRC connection release.

S502: Enter an inactive state based on the RRC connection release message, and determine the target configuration parameter based on the first information.

After the terminal receives the RRC connection release message sent by the network device, different from S403, in this possible implementation, the terminal neither needs to store a mapping relationship between the configuration parameter and an identifier corresponding to the configuration parameter, nor needs to determine the target configuration parameter based on the identifier corresponding to the target configuration parameter and the mapping relationship, but directly enters the inactive state based on the RRC connection release message. Because the RRC connection release message directly carries the target configuration parameter, the terminal can directly obtain and retain the target configuration parameter. Although overheads of configuration signaling are relatively large because the target configuration parameter is carried in the RRC connection release message and sent to the terminal, the terminal does not need to store pre-configuration in advance. This reduces configuration overheads of storage overheads of the terminal.

S503: The terminal retains the target configuration parameter.

Further, in this embodiment of this application, the network device solidifies radio bearer configuration parameters and/or cell group configuration parameters of a plurality of terminals, so that at least two terminals are corresponding to a same set of configuration parameters. In this way, when the plurality of terminals enter the inactive state from the connected state, the network device needs to store only one set of configuration information when storing configuration information of the at least two terminals, to reduce the storage overheads of the network device.

In addition, after entering the inactive state from the connected state based on the RRC connection release message, the terminal may further release a part or all of MAC layer configuration information, RLC layer configuration information, PDCP layer configuration information, SDAP layer configuration information, physical cell group configuration information, a SpCell configuration, and SCell configuration information in the connected state.

Before sending the RRC connection release message to the terminal, the network device may first obtain capability information reported by the terminal, and determine, based on the capability information reported by the terminal, whether the terminal supports data transmission in the inactive state. For example, when the terminal reports the capability information of the terminal, the reporting manner of the terminal is the same as the reporting manner of the terminal in the embodiment shown in FIG. 4. For details, refer to the foregoing related descriptions. Herein, details are not described again in this embodiment of this application.

It should be noted that, in the foregoing embodiments shown in FIG. 4 and FIG. 5, that the network device indicates, to the terminal by using the first information, the configuration parameter that needs to be retained is described by using only an example in which the target configuration parameter indicated by the first information is the configuration parameter that needs to be retained by the terminal. Certainly, the target configuration parameter indicated by the first information may alternatively not be the configuration parameter that needs to be retained by the terminal. Correspondingly, after receiving the first information, the terminal may determine a parameter other than the target configuration parameter based on the target configuration parameter indicated by the first information, where the parameter other than the target parameter is the configuration parameter that needs to be retained by the terminal, to retain the parameter other than the target parameter. It should be noted that in the two different indication manners, the target configuration parameters indicated by the first information are different. Herein, details are not described again in this embodiment of this application.

Embodiments shown in FIG. 4 and FIG. 5 describe a technical solution in the possible scenario in detail, where the solution is that the network device may indicate, by using the first information, the configuration parameter configured for the terminal in the inactive state, so that the terminal in the inactive state retains the configuration parameter configured for the terminal. The following describes a technical solution in the other possible scenario in detail, where the solution is that the network device may indicate, by using the first information, the configuration parameter that needs to be released by the terminal in the inactive state, so that the terminal in the inactive state releases the configuration parameter that needs to be released.

In the other possible scenario, the network device indicates, by using the first information, the configuration parameter that needs to be released by the terminal, so that the terminal releases the configuration parameter that needs to be released. The configuration parameter that needs to be released may also be indicated to the terminal in two different manners. In one manner, the network device may indicate, to the terminal in a direct indication manner, the configuration parameter that needs to be released, that is, the target configuration parameter indicated by the first information is the configuration parameter that needs to be released by the terminal, so that after receiving the first information, the terminal directly determines, based on the target configuration parameter indicated by the first information, the configuration parameter that needs to be released, and releases the target configuration parameter. In the other manner, the network device may indicate, to the terminal in an indirect indication manner, the configuration parameter that needs to be released, that is, the target configuration parameter indicated by the first information is not the configuration parameter that needs to be released by the terminal, so that after receiving the first information, the terminal determines a parameter other than the target configuration parameter based on the target configuration parameter indicated by the first information, where the parameter other than the target parameter is the configuration parameter that needs to be released by the terminal. It also can be learned that, in the two different manners, definitions of the target configuration parameters indicated by the first information are different. In the first manner, the target configuration parameter indicated by the first information is the configuration parameter that needs to be released by the terminal. In the second manner, the target configuration parameter indicated by the first information is not the configuration parameter that needs to be released by the terminal, and the parameter other than the target configuration parameter is the configuration parameter that needs to be released by the terminal. Therefore, in the two different manners, the target configuration parameters indicated by the first information are different.

Figure 6:
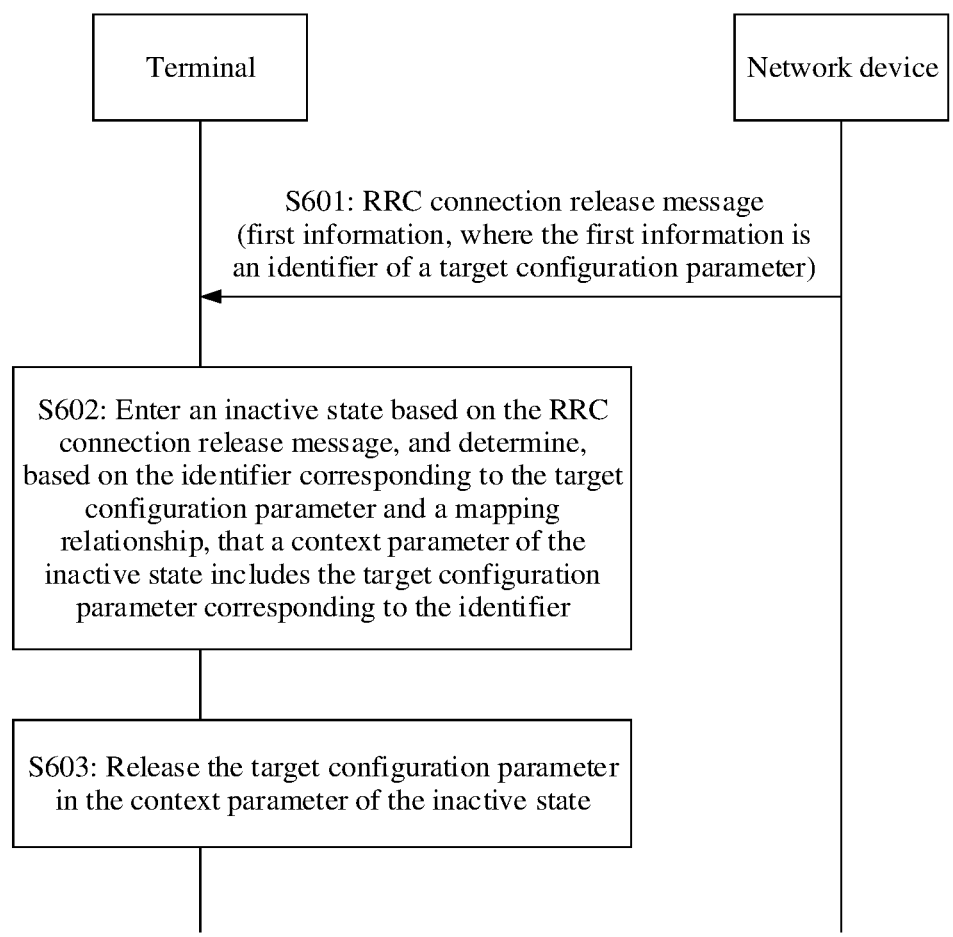
FIG. 6 is a schematic flowchart of determining each configuration parameter set through negotiation according to an embodiment of this application.

In this possible scenario, the first indication manner is mainly used as an example for description. To be specific, the target configuration parameter indicated by the first information is the configuration parameter that needs to be released by the terminal. When indicating, by using the first information, the target configuration parameter that needs to be released by the terminal, the network device may indicate, in two possible manners, the target configuration parameter that needs to be released by the terminal. In one possible manner, the first information is an identifier of the target configuration parameter, that is, the network device indicates the identifier of the target configuration parameter to the terminal, so that the terminal determines, based on the identifier of the target configuration parameter, the target configuration parameter that needs to be released. In the other possible manner, the first information is the target configuration parameter, that is, the network device directly indicates the target configuration parameter to the terminal, so that the terminal can directly obtain the target configuration parameter that needs to be released. First, for example, the first information is the identifier of the target configuration parameter. For example, refer to FIG. 6. FIG. 6 is a schematic flowchart of releasing a parameter other than a target configuration parameter in a context parameter of a terminal according to an embodiment of this application. The method may include the following steps.

S601: A network device sends a radio resource control (RRC) connection release message to the terminal.

The RRC connection release message includes first information, and the first information is an identifier of the target configuration parameter. For example, the target configuration parameter may include a radio bearer configuration parameter and/or a cell group configuration parameter.

In this possible scenario, it is assumed that the network device has pre-configured a plurality of sets of configuration parameters for the terminal. Before pre-configuring the plurality of sets of configuration parameters for the terminal, similarly, to reduce storage overheads of the network device, the network device may solidify radio bearer configuration parameters and/or cell group configuration parameters of at least two terminals, so that the at least two terminals are corresponding to a same set of configuration parameters. This reduces the storage overheads of the network device. After the solidification, a plurality of configuration parameter sets may be obtained. Then, a configuration parameter in the plurality of configuration parameter sets is configured for the terminal. It may be understood that, in this possible scenario, the method used by the network device to obtain the plurality of configuration parameter sets in advance is similar to the method used by the network device to obtain the plurality of configuration parameter sets in advance in S401, and the method for allocating the plurality of configuration parameter sets to the terminal is similar to the method for allocating the plurality of configuration parameter sets to the terminal in S401. For details, refer to the related descriptions in S401. Herein, details are not described again in this embodiment of this application.

When indicating, by using the first information, the target configuration parameter that needs to be released by the terminal, the network device may include the identifier of the target configuration parameter, as the first information, in the RRC connection release message and send the RRC connection release message to the terminal, so that the terminal performs S602 based on the RRC connection release.

S602: The terminal enters an inactive state based on the RRC connection release message, and determines, based on the identifier corresponding to the target configuration parameter and a mapping relationship, that the context parameter of the inactive state includes the target configuration parameter corresponding to the identifier.

For example, the identifier of the target configuration parameter may be a set identifier of a configuration parameter set, for example, an identifier of the set 1 or an identifier of the set 2.

After receiving the RRC connection release message sent by the network device, the terminal enters the inactive state based on the RRC connection release message. In addition, because the terminal stores a mapping relationship between the identifier corresponding to the configuration parameter and the configuration parameter in advance, after receiving the first information that is sent by the network device and that is the identifier corresponding to the target configuration parameter, the terminal may search, based on the identifier corresponding to the target configuration parameter, the mapping relationship for the identifier corresponding to the target configuration parameter, and determine that a configuration parameter corresponding to the identifier corresponding to the target configuration parameter is a target configuration parameter that needs to be released, for example, determine a configuration parameter in the set 1 or a configuration parameter in the set 2 as the target configuration parameter that needs to be released, to obtain the target configuration parameter, so as to release the configuration parameter in the set 1 or the configuration parameter in the set 2.

S603: The terminal releases the target configuration parameter in the context parameter of the inactive state.

After receiving the RRC connection release message sent by the network device, and determining, based on the first information carried in the RRC connection release message, the target configuration parameter that needs to be released and that is included in the context parameter of the terminal, the terminal may directly release the target configuration parameter. In this way, on the premise of reducing storage overheads of the network device and the terminal, the network device can control a configuration parameter that is still used and a configuration parameter that is no longer used.

In addition, after entering the inactive state from a connected state based on the RRC connection release message, the terminal may further release another access stratum parameter. The another access stratum parameter includes at least one of physical cell configuration information, SpCell configuration information, and SCell configuration information. For example, a manner in which the terminal releases the another access stratum parameter is as follows: After receiving the RRC connection release message, the terminal releases the another access stratum parameter by default. That is, in this manner, the RRC message does not need to carry release indication information. In another manner, after the terminal receives the RRC connection release message, the RRC connection release message may explicitly carry indication information for releasing another configuration, so that the terminal releases the another access stratum parameter based on the indication information for releasing another configuration.

The embodiment shown in FIG. 6 describes a technical solution in the possible scenario in detail, where the solution is that when the first information is the identifier of the target configuration parameter, the network device indicates, by using the identifier of the target configuration parameter, the target configuration parameter that needs to be released by the terminal. Certainly, the first information may alternatively be the target configuration parameter. That is, the network device may use the target configuration parameter that needs to be released as the first information, include the first information in the RRC connection release message, and send the RRC connection release message to the terminal, so that the terminal can directly determine, based on the first information, the target configuration parameter that needs to be released. Compared with a case in which the first information is the identifier of the target configuration parameter, the terminal neither needs to store a mapping relationship between the configuration parameter and an identifier corresponding to the configuration parameter in advance, nor needs to determine the target configuration parameter based on the identifier corresponding to the target configuration parameter and the mapping relationship, but directly enters the inactive state based on the RRC connection release message. In addition, because the RRC connection release message directly carries the target configuration parameter, the terminal can directly obtain and release the target configuration parameter. Although overheads of configuration signaling are relatively large because the target configuration parameter is carried in the RRC connection release message and sent to the terminal, the terminal does not need to store pre-configuration in advance. This reduces configuration overheads of storage overheads of the terminal.

Figure 7:
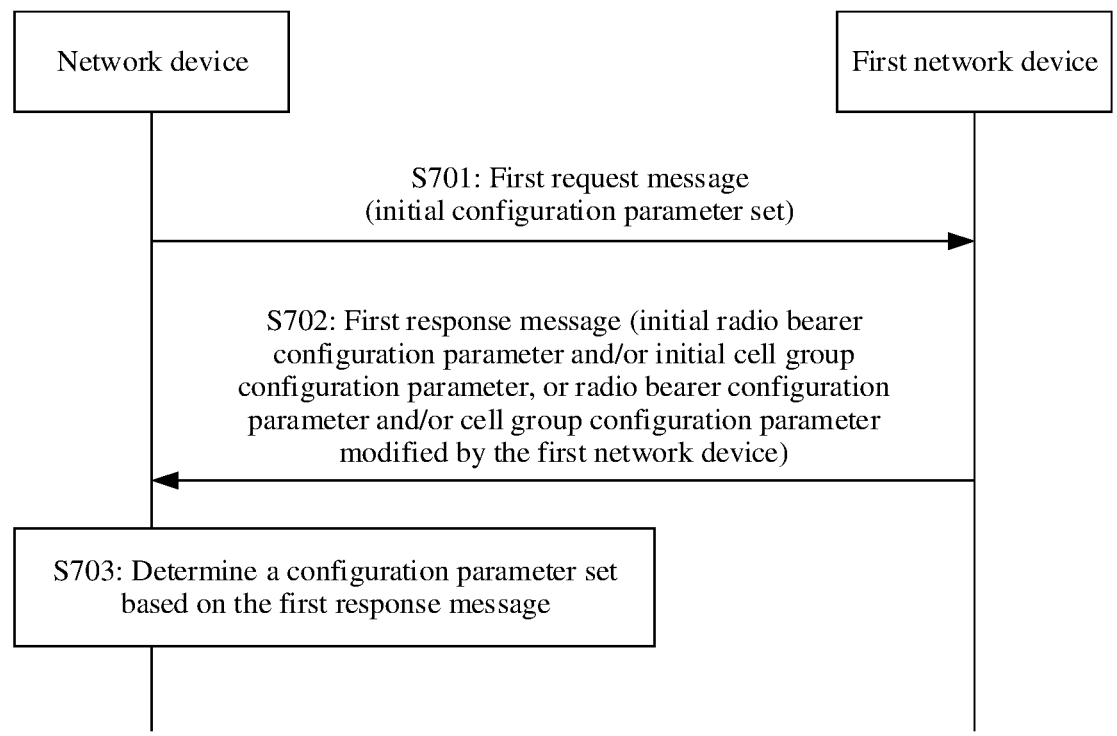
FIG. 7 is a schematic flowchart of releasing a parameter other than a target configuration parameter in a context parameter of a terminal according to an embodiment of this application.

It should be noted that, in the foregoing embodiment shown FIG. 7, that the network device indicates, to the terminal by using the first information, the configuration parameter that needs to be released is described by using only an example in which the target configuration parameter indicated by the first information is the configuration parameter that needs to be released by the terminal. Certainly, the target configuration parameter indicated by the first information may alternatively not be the configuration parameter that needs to be released by the terminal. Correspondingly, after receiving the first information, the terminal may determine a parameter other than the target configuration parameter based on the target configuration parameter indicated by the first information, where the parameter other than the target parameter is the configuration parameter that needs to be released by the terminal, to release the parameter other than the target parameter. It should be noted that in the two different indication manners, the target configuration parameters indicated by the first information are different. Herein, details are not described again in this embodiment of this application.

Based on the embodiment shown in any one of FIG. 4 to FIG. 6, regardless of whether the network device indicates, by using the target configuration parameter indicated by the first information, the configuration parameter that needs to be retained by the terminal or the configuration parameter that needs to be released by the terminal, before providing the indication by using the first information, the network device first solidify radio bearer configuration parameters and/or cell group configuration parameters of a plurality of terminals, to obtain one or more configuration parameter sets. Then, the first information can be used to indicate a configuration parameter that is in a configuration parameter set and that needs to be retained by the terminal, or indicate a configuration parameter that is in a configuration parameter set and that needs to be released by the terminal. To unify one or more configuration parameter sets configured by each network device for a terminal, before sending an RRC connection request message used to indicate a target configuration parameter to the terminal, the network device may first negotiate with another network device, for example, a first network device, to determine each configuration parameter set. For example, refer to FIG. 7, FIG. 7 is a schematic flowchart of determining each configuration parameter set through negotiation according to an embodiment of this application. The method for determining each configuration parameter set may include the following steps.

S701: A network device sends a first request message to a first network device.

The first request message includes an initial configuration parameter set, and the initial configuration parameter set includes an initial radio bearer configuration parameter and/or initial cell group configuration parameter determined by the network device. The first request message is used to request the first network device to acknowledge the initial radio bearer configuration parameter and/or initial cell group configuration parameter in the initial configuration parameter set.

For example, after the first network device receives the initial radio bearer configuration parameter and/or initial cell group configuration parameter sent by the network device, a possible case is as follows: If the first network device supports the initial radio bearer configuration parameter and/or initial cell group configuration parameter, the first network device determines and stores the initial radio bearer configuration parameter and/or initial cell group configuration parameter. In this case, a response message sent to the network device still includes the initial radio bearer configuration parameter and/or initial cell group configuration parameter. Another possible case is as follows: If the first network device does not support the initial radio bearer configuration parameter and/or initial cell group configuration parameter and needs to modify the initial radio bearer configuration parameter and/or initial cell group configuration parameter, the first network device directly modifies the initial radio bearer configuration parameter and/or initial cell group configuration parameter and stores the modified radio bearer configuration parameter and/or cell group configuration parameter. In this case, a response message sent by the first network device to the network device includes the modified radio bearer configuration parameter and/or cell group configuration parameter.

It should be noted that, when negotiating with the first network device to determine each configuration parameter set, the network device may send all the configuration parameter sets to the first network device by using the first request message, or certainly send all the configuration parameter sets to the first network device by using a plurality of first request messages. This may be specifically set based on an actual requirement. This is not further limited in this embodiment of this application.

S702: The first network device sends a first response message to the network device.

The first response message includes the initial radio bearer configuration parameter and/or initial cell group configuration parameter, or the radio bearer configuration parameter and cell group configuration parameter modified by the first network device.

After receiving the first response message, the network device may determine a configuration parameter set based on the first response message, that is, perform S703.

S703: The network device determines the configuration parameter set based on the first response message.

If the first response message includes the initial radio bearer configuration parameter and/or the initial cell group configuration parameter, it indicates that the first network device supports the initial radio bearer configuration parameter and/or initial cell group configuration parameter determined by the network device. In this case, the initial radio bearer configuration parameter and/or initial cell group configuration parameter are/is determined as a configuration parameter that can be used subsequently, and a set including the configuration parameter is a configuration parameter set that can be used subsequently. If the first response message includes the modified radio bearer configuration parameter and/or the modified cell group configuration parameter, it indicates that the first network device does not support the initial radio bearer configuration parameter and/or initial cell group configuration parameter determined by the network device. In this case, the modified radio bearer configuration parameter and/or the modified cell group configuration parameter are/is determined as a configuration parameter that can be used subsequently, and a set including the configuration parameter is a configuration parameter set that can be used subsequently. Then, the network device may indicate, by using first information, a configuration parameter that is in a configuration parameter set and that needs to be retained by the terminal, or indicate a configuration parameter that is in a configuration parameter set and that needs to be released by the terminal. In the indication process, a disadvantage caused by inconsistent configuration parameters is avoided.

Figure 8:
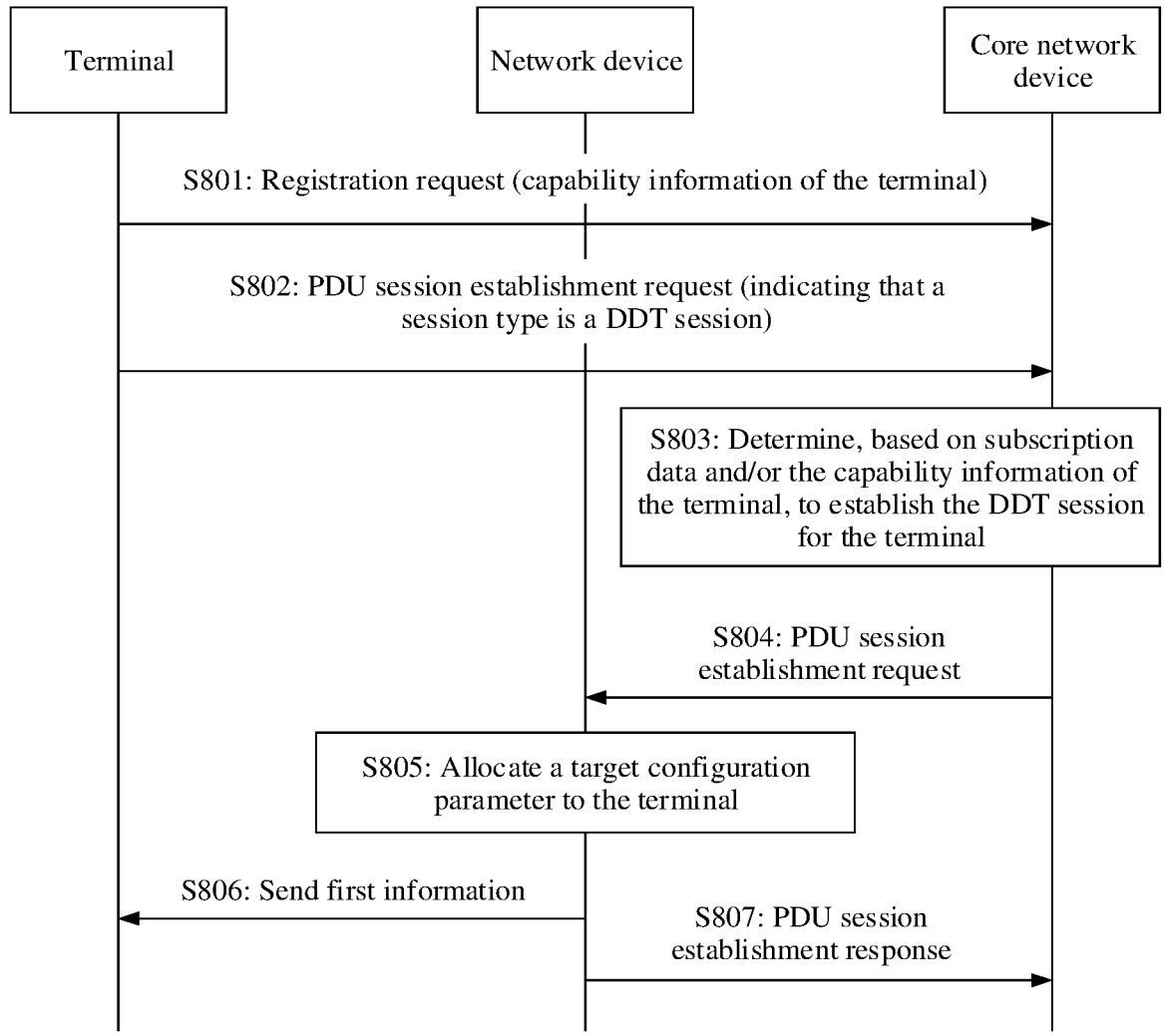
FIG. 8 is a schematic flowchart of allocating a proper configuration parameter set to a terminal according to an embodiment of this application.

Embodiments shown in FIG. 4 and FIG. 5 describe a technical solution in detail. In this solution, to reduce storage overheads of the network device, the network device may solidify radio bearer configuration parameters and/or cell group configuration parameters of at least two terminals, to obtain a plurality of configuration parameter sets, and indicate one or more proper configuration parameter sets in the plurality of configuration parameter sets to the terminal. For example, before indicating the one or more proper configuration parameter sets to the terminal, the network device may first receive indication information sent by a core network device. The indication information is used to indicate the network device to indicate the one or more proper configuration parameter sets to the terminal. For example, refer to FIG. 8, FIG. 8 is a schematic flowchart of allocating a proper configuration parameter set to a terminal according to an embodiment of this application. The method may include the following steps.

S801: The terminal sends a registration request to a core network device.

Optionally, the registration request includes capability information of the terminal. For example, the capability information of the terminal may be that the terminal supports a direct data transmission (DDT) session, that is, the terminal supports direct data transmission in an inactive state. It should be noted that the capability information of the terminal is the same as the capability information of the terminal in the embodiment shown in FIG. 4. For details, refer to the related descriptions in the embodiment shown in FIG. 4. Herein, details are not described again in this embodiment of this application.

S802: The terminal sends a protocol data unit (PDU) session establishment request to the core network device.

Optionally, the PDU session establishment request indicates that a session type is a DDT session, that is, the DDT session may be used by the terminal to directly perform data transmission in the inactive state. In this case, direct data transmission in the inactive state at a session granularity can be implemented.

S803: The core network device optionally determines, based on subscription data and/or the capability information of the terminal, to establish the DDT session for the terminal.

For example, when determining whether to establish the DDT session for the terminal, the core network device may search for the subscription data of the terminal by using a session management function (SMF) device, and determine, based on the subscription data of the terminal, whether to establish the DDT session for the terminal. For example, when an operator subscribes to provide a DDT function for a user of the terminal, the operator determines to establish a DDT session for the terminal. Certainly, the core network device may alternatively not need to search for the subscription data of the terminal by using the SMF device, but directly determine, based on the capability information of the terminal stored by the core network device, whether to establish the DDT session for the terminal.

After determining, if determining to establish the DDT session for the terminal, the core network device sends a PDU session establishment request to a network device, that is, performs S804.

S804: The core network device sends the PDU session establishment request to the network device.

The PDU session establishment request may include a session type, and the session type is used to indicate that the terminal is allowed to perform uplink transmission when the terminal is in the inactive state. For example, the session type may be a Boolean-type parameter. If a value is 1, it indicates that data transmission can be performed in the inactive state; and if the value is 0, data transmission cannot be performed in the inactive state, and vice versa. Alternatively, the session type is an enumeration-type parameter. If a value is True, it indicates that data transmission can be performed in the inactive state; and if the value is False, data transmission cannot be performed in the inactive state. Alternatively, if a value is a DDT session, it indicates that data transmission can be performed in the inactive state; and if the value is another session, data transmission cannot be performed in the inactive state. The session type may also be referred to as indication information.

It can be learned that the session type used to indicate that the terminal is allowed to perform uplink transmission when the terminal is in the inactive state is carried in the PDU session establishment request and sent to the network device. Certainly, in addition to being carried in the PDU session establishment request and sent to the network device, the session type may alternatively be carried a PDU session modification request and sent to the network device in a PDU session modification process. Herein, this embodiment of this application is described by using only an example in which the session type is carried in the PDU session establishment request and sent to the network device. However, this does not mean that this embodiment of this application is limited thereto.

Further, the PDU session establishment request may further include a session identifier, to identify a session. Because one session may include a plurality of flows, the core network device indicates whether uplink transmission of a session can be allowed in the inactive state, or may provide an indication for one flow, that is, indicates whether uplink transmission of a flow identifier can be allowed in the inactive state. In this way, when sending the PDU session establishment request to the network device, the core network device needs to add only a flow identifier in the session to the PDU session establishment request, to indicate, by using the flow identifier, whether uplink transmission can be allowed in the inactive state. In this case, the foregoing session type may also be referred to as a flow type, or collectively referred to as indication information.

S805: The network device allocates a target configuration parameter to the terminal.

For a method for allocating the target configuration parameter by the network device to the terminal, refer to the related descriptions in the embodiment shown in FIG. 4. Herein, details are not described again in this embodiment of this application.

S806: The network device sends first information to the terminal.

The first information is used to indicate the target configuration parameter. For example, the first information may be an identifier corresponding to the target configuration parameter, or may be the target configuration parameter.

S807: The network device sends a PDU session establishment response to the core network device.

According to the embodiment shown in FIG. 8, the core network device may determine, based on the subscription data and/or the capability information of the terminal, whether to establish the DDT session for the terminal, and when determining to establish the DDT session for the terminal, indicate, by using the session identifier or the flow identifier, the network device to establish a session or a flow in a session ID for the terminal, where the indication information (the session type or the flow type) is used to indicate that the terminal can perform data transmission in the inactive state. Correspondingly, the network device may allocate the target configuration parameter to the terminal based on the indication information. When allocating the target configuration parameter to the terminal, the network device may also solidify radio bearer configuration parameters and/or cell group configuration parameters of a plurality of terminals, so that at least two terminals are corresponding to a same set of configuration parameters. In this way, when the plurality of terminals enter the inactive state from a connected state, the network device needs to store only one set of configuration information when storing configuration information of the at least two terminals, to reduce storage overheads of the network device.

The embodiment shown in FIG. 8 may be implemented in combination with the embodiment shown in FIG. 4 or FIG. 5. Certainly, the embodiment shown in FIG. 8 may also be implemented independently, that is, the embodiment shown in FIG. 8 is decoupled from the embodiment shown in FIG. 4 or FIG. 5, and does not have a binding relationship.

Based on any one of the foregoing embodiments, after receiving the RRC connection release message sent by the network device, the terminal enters the inactive state based on the RRC connection release message. When the terminal is in the inactive state, if the terminal receives a first indication that is sent by the network device and that is used to indicate the terminal to monitor a physical downlink control channel when the terminal is in the inactive state, the terminal monitors the physical downlink control channel when the terminal is in the inactive state. Optionally, the first indication may be included in the RRC connection release. Certainly, the first indication may alternatively be carried in another message. Specifically, this may be set based on an actual requirement.

In addition, when the terminal is in the inactive state, the terminal may further receive a second indication used to indicate that the terminal is allowed to perform uplink transmission when the terminal is in the inactive state. For example, the terminal may send a random access request to the network device, and receive a response message of the random access request. The response message includes an uplink grant and a second indication. In this way, when needing to perform DRB data transmission, the terminal may perform uplink DRB data transmission on an uplink resource indicated by the uplink grant, so that the terminal completes uplink DRB data transmission in the inactive state, and neither needs to perform uplink transmission after an RRC connection is resumed nor needs to enter a connected state to send data. This not only improves sending efficiency of the data, but also reduces overheads required for resuming the RRC connection.

Figure 9:
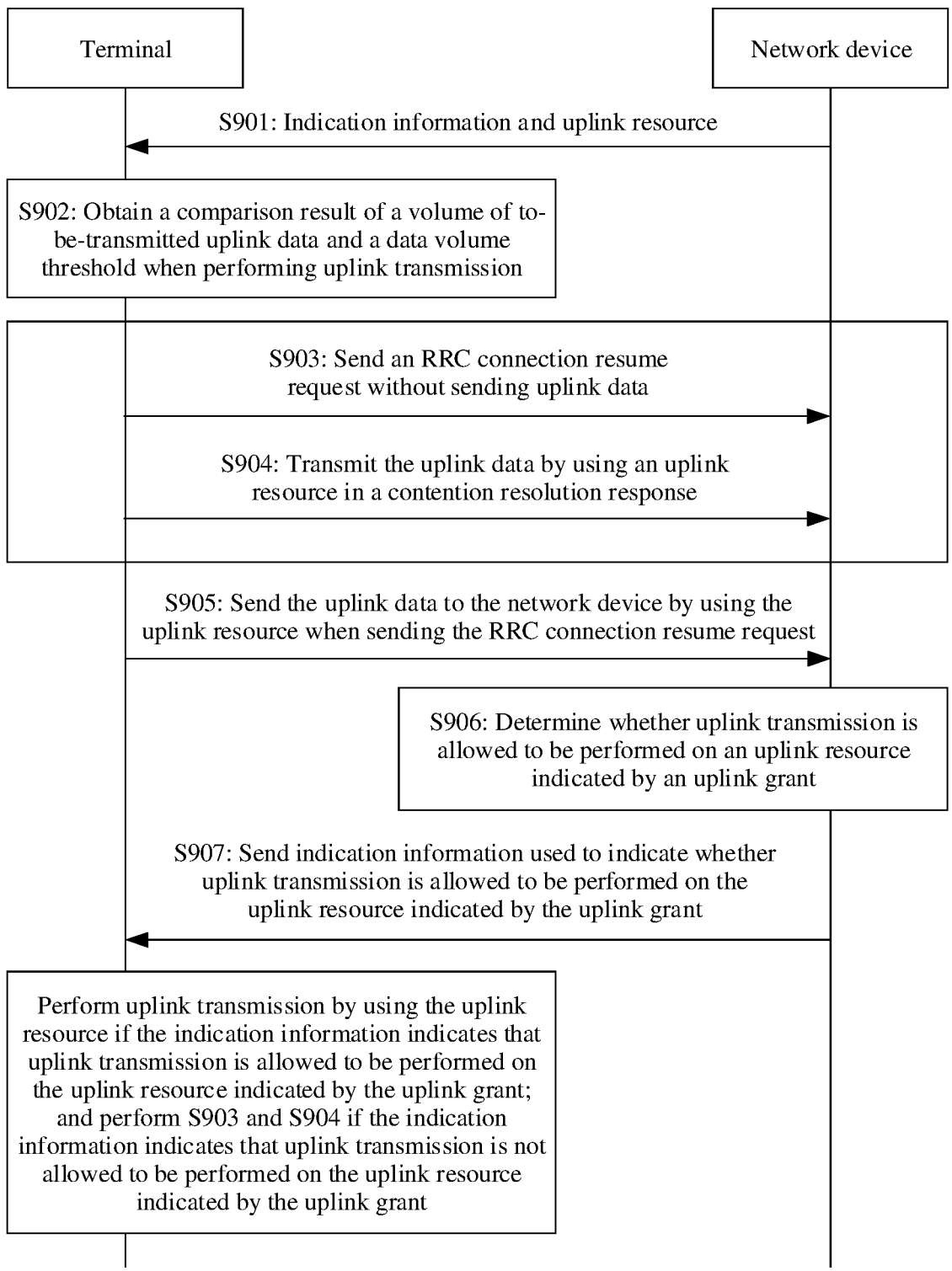
FIG. 9 is a schematic flowchart of a configuration method according to an embodiment of this application.

Based on any one of the foregoing embodiments, after receiving the RRC connection release message sent by the network device, the terminal may enter the inactive state based on the RRC connection release message. After entering the inactive state, if needing to perform uplink transmission, the terminal may send, in a random access process, a preamble and uplink data on an uplink resource indicated by the network device. If the network device fails to parse the uplink data, if needing to send the uplink data to the network device again, the terminal needs to first resume the RRC connection, and resends the uplink data to the network device when the terminal is in the connected state, so that the network device can accurately receive the uplink data sent by the terminal, where the uplink data is PUSCH data. The uplink data packet includes RRC signaling and/or uplink DRB data. To implement uplink transmission by a terminal in an inactive state, for example, refer to FIG. 9. FIG. 9 is a schematic flowchart of a configuration method according to an embodiment of this application. The configuration method may include the following steps.

S901: A terminal obtains indication information and an uplink resource that are sent by a network device.

The indication information is used to indicate that the terminal is enabled to perform uplink transmission when the terminal is in an inactive state. The indication information is optional.

For example, when obtaining the indication information, the terminal may obtain the indication information by using an RRC connection release message, or may obtain the indication information by using a broadcast message. Specifically, this may be set based on an actual requirement. Herein, a manner of obtaining the indication information is not further limited in this embodiment of this application.

For example, when obtaining the uplink resource, the terminal may obtain the uplink resource in three possible manners. In a possible manner, the terminal may send a preamble to the network device, and receive a random access response message sent by the network device, where the random access response may include the uplink resource, to obtain the uplink resource. In another possible manner, the terminal may use an uplink resource in a message A (MsgA) of a two-step random access channel (RACH), and use the uplink resource as a to-be-used uplink resource, to obtain the uplink resource. It may be understood that the uplink resource in the two-step RACH may be obtained by using the RRC connection release message or the broadcast message. In the other possible implementation, the terminal may directly use an uplink resource in a pre-configured PUSCH resource without sending a preamble, and use the uplink resource as a to-be-used uplink resource, to obtain the uplink resource. It may be understood that the pre-configured PUSCH resource may be obtained by using the RRC connection release message or the broadcast message.

After the indication information and the uplink resource are separately obtained, uplink transmission cannot be directly performed on the obtained uplink resource. Instead, a volume of to-be-transmitted uplink data needs to be first compared with a data volume threshold, and uplink transmission is performed based on a comparison result. That is, S902 is performed.

S902: When performing uplink transmission, the terminal obtains the comparison result of the volume of to-be-transmitted uplink data and the data volume threshold.

If the comparison result indicates that the volume of to-be-transmitted uplink data is greater than the data volume threshold, S903 and S904 are performed; if the comparison result indicates that the volume of to-be-transmitted uplink data is less than the data volume threshold, S905 is performed; and if the comparison result indicates that the volume of to-be-transmitted uplink data is equal to the data volume threshold, S903 and S904 are performed or S905 is performed.

S902 is optional. The terminal may select to perform S903 and S904 or perform S905.

S903: The terminal sends an RRC connection resume request to the network device, but does not send the uplink data.

S904: When receiving a contention resolution response sent by the network device, the terminal transmits the uplink data by using an uplink resource in the contention resolution response.

S905: When sending the RRC connection resume request to the network device, the terminal sends the uplink data to the network device by using the uplink resource.

For example, when the terminal sends the RRC connection resume request to the network device, the RRC connection resume request may carry an indication, and the indication is used to indicate a value relationship between the volume of to-be-transmitted uplink data and the data volume threshold. For example, the indication may be represented by using a Boolean-type parameter (or a Boolean value). For example, when the Boolean value is 1, it indicates that the volume of to-be-transmitted data is greater than the data volume threshold; and when the Boolean value is 1, it indicates that the volume of to-be-transmitted data is less than the data volume threshold, and vice versa. When the volume of to-be-transmitted data is equal to the data volume threshold, the Boolean value may be 0 or 1. Alternatively, the indication may be represented by using existence of a field in the RRC connection resume request. When the field exists in the RRC connection resume request, it indicates that the volume of to-be-transmitted data is less than the data volume threshold; and when the field does not exist in the RRC connection resume request, it indicates that the volume of to-be-transmitted data is greater than the data volume threshold, or vice versa. When the volume of to-be-sent data is equal to the data volume threshold, the field may or may not exist in the RRC connection resume request. Alternatively, the indication may be represented by using an enumeration-type field in the RRC connection resume request. When the field in the RRC connection resume request is TRUE, it indicates that the volume of to-be-sent data is less than the data volume threshold; and when the field in the RRC connection resume request is FALSE, it indicates that the volume of to-be-sent data is greater than the data volume threshold, and vice versa. When the volume of to-be-sent data is equal to the data volume threshold, the field in the RRC connection resume request may be TRUE or FALSE. For example, the value being TRUE indicates that the volume of to-be-transmitted uplink data is greater than the data volume threshold, and the value being FALSE indicates that the volume of to-be-transmitted uplink data is less than or equal to the data volume threshold. In this case, in S903, the indication carried in the RRC connection resume request is TRUE; and in S905, the indication carried in the RRC connection resume request is FALSE. Herein, this embodiment of this application is described by using the several manners are as examples. This may be specifically set based on an actual requirement. The data volume threshold may be obtained from a broadcast message or a dedicated message sent by a network, or may be a preset value.

Correspondingly, after receiving the uplink data sent by the terminal by performing S904 or S905, the network device may further perform S906 and S907.

S906: The network device determines whether uplink transmission is allowed to be performed on an uplink resource indicated by an uplink grant.

S907: The network device sends, to the terminal, indication information used to indicate whether uplink transmission is allowed to be performed on the uplink resource indicated by the uplink grant.

If the indication information indicates that uplink transmission is allowed to be performed on the uplink resource indicated by the uplink grant, when needing to perform uplink transmission, the terminal performs uplink transmission by using the uplink resource; and if the indication information indicates that uplink transmission is not allowed to be performed on the uplink resource indicated by the uplink grant, when needing to perform uplink transmission, the terminal may perform S903 and S904.

It can be learned that, according to the embodiment shown in FIG. 9, the terminal sends the RRC connection resume request to the network device, so that when the terminal is in the inactive state, the network device may allocate the uplink grant to the terminal, and indicate, by using the indication information, whether uplink transmission is allowed to be performed on the uplink resource indicated by the uplink grant. In this way, the terminal completes uplink transmission when the terminal is in the inactive state, and neither needs to perform uplink transmission after an RRC connection is resumed nor needs to enter a connected state to send data. This not only improves sending efficiency of the data, but also reduces overheads required for resuming the RRC connection.

Based on the embodiment shown in FIG. 9, for example, data is sent in the two-step RACH. Before sending the uplink data to the network device, the terminal compares the volume of to-be-transmitted uplink data with the data volume threshold, and determines, based on the indication information sent by the network device, whether uplink transmission is allowed to be performed on the uplink resource indicated by the uplink grant. After the comparison, if the volume of to-be-transmitted uplink data is less than or equal to the data volume threshold, and the terminal determines that uplink transmission can be performed on the uplink resource indicated by the uplink grant, the terminal resumes PDCP statues of a DRB and an SRB, reestablishes a PCDP entity, resumes statuses of the SRB and the DRB, and sends a first message to the network device, where the first message may include a preamble sent on a PRACH resource, and an RRC connection resume request and uplink data that are sent on a PUSCH resource. Correspondingly, after receiving the preamble and PUSCH data that are sent by the terminal by using the first message, the network device parses the received preamble and PUSCH data. When the preamble and the PUSCH data are parsed, there may be two different scenarios. In one scenario, the network device successfully parses the preamble, but fails to parse the PUSCH data. In the other scenario, the network device successfully parses the preamble and successfully parses the PUSCH data. The following separately describes the two different scenarios in detail by using detailed embodiments.

Figure 10:
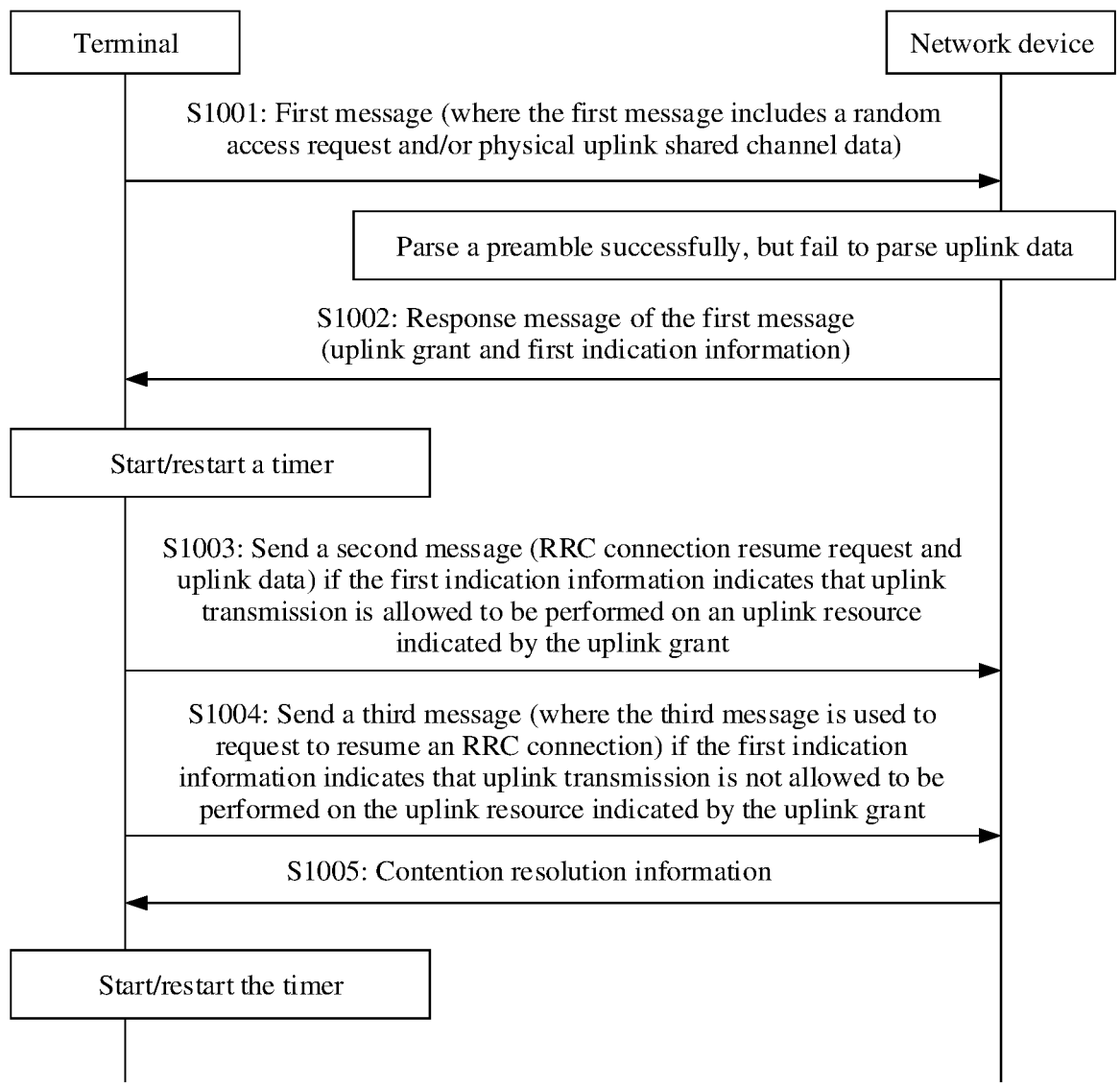
FIG. 10 is a schematic flowchart of another configuration method according to an embodiment of this application.

In a scenario, when the network device successfully parses the preamble, but fails to parse the uplink data, for example, refer to FIG. 10. FIG. 10 is a schematic flowchart of another configuration method according to an embodiment of this application. The configuration method may include the following steps.

S1001: A terminal sends a first message to a network device.

The first message includes a random access request and/or physical uplink shared channel data, and the physical uplink shared channel data includes information used to request to resume a radio resource control (RRC) connection, for example, an RRC connection resume request. For example, the random access request may be a preamble, and the physical uplink shared channel data may further include uplink data. The uplink data is optional.

After the terminal sends the first message to the network device, the network device may parse the preamble and the uplink data included in the first message. When the network device successfully parses the preamble but fails to parse the uplink data, the network device sends a response message of the first message to the terminal based on a parsing result, that is, performs S1002.

S1002: The network device sends the response message of the first message to the terminal.

The response message includes an uplink grant and first indication information, and the first indication information is used to indicate whether uplink transmission is allowed to be performed on an uplink resource indicated by the uplink grant.

Optionally, the response message of the first message may further include a random access preamble identifier (RAP ID), a timing advance (time advance, TA), and a temporary cell radio network temporary identifier (TC-RNTI). The RAP ID is an identifier corresponding to the preamble in Swot If the RAP ID is the same as an identifier corresponding to a preamble sent by the terminal, the terminal acknowledges that the response message of the first message is a response message sent by the network device for the terminal. The TA indicates an advance of uplink sending timing, and is used by the terminal to adjust the uplink sending timing. The TC-RNTI is an identifier allocated by the network device to the terminal. When contention is resolved, the TC-RNTI may be used as a C-RNTI, the network device indicates a PUSCH resource by using a PDCCH scrambled by the C-RNTI, and the terminal sends uplink signaling or data by using the PUSCH resource. Optionally, the response message of the first message may further include a dedicated RRC signaling message, for example, an RRC reconfiguration message.

For example, if the terminal determines that a timer is not started when uplink transmission can be performed on the uplink resource indicated by the uplink grant, the terminal starts the timer after receiving the response message of the first message sent by the network device. On the contrary, if the terminal determines that the timer has been started when uplink transmission can be performed on the uplink resource indicated by the uplink grant, the terminal restarts the timer after receiving the response message of the first message sent by the network device. For example, the timer may be a T319 timer, or may be another new timer.

Duration of the timer is limited to maximum waiting time or maximum tolerable duration of an RRC connection resume process. For example, when the timer may be the T319 timer, the terminal starts T319 when sending a connection resume request, and stops T319 when receiving a connection resume message, a connection setup message, or a connection release message sent by the network device. Alternatively, the terminal stops T319 when the terminal reselects a cell or receives a higher layer indication of the terminal and exits from RRC connection setup. Otherwise, when T319 expires, the terminal releases a connection and enters an idle state due to an RRC connection restoration failure.

It can be learned that, different from a conventional technology, in this embodiment of this application, the response message of the first message sent by the network device to the terminal includes not only uplink grant information, but further includes the first indication information. The first indication information indicates different content. Correspondingly, manners of performing uplink transmission by the terminal on the uplink resource indicated by the uplink grant are also different. When the first indication information indicates that the terminal is allowed to perform uplink transmission on the uplink resource indicated by the uplink grant, S1003 may be performed. On the contrary, when the first indication information indicates that the terminal is not allowed to perform uplink transmission on the uplink resource indicated by the uplink grant, S1004 may be performed. Uplink transmission indicated by the first indication information is uplink DRB data transmission.

The first indication information may be explicit indication information, for example, may be 1-bit indication information. When a value of the first indication information is "1", it indicates that the terminal is allowed to perform uplink transmission on the uplink resource indicated by the uplink grant; and when the value of the first indication information is "0", it indicates that the terminal is not allowed to perform uplink transmission on the uplink resource indicated by the uplink grant. Certainly, a meaning of the value may alternatively be reversed, and details are not described herein again.

Optionally, the response message may alternatively not carry the first indication information. That is, the terminal is indicated in an implicit indication manner. For example, when the uplink grant can accommodate all to-be-sent data, the terminal performs uplink DRB data transmission on the uplink resource indicated by the uplink grant. Otherwise, the terminal does not perform uplink DRB data transmission on the uplink resource indicated by the uplink grant.

Optionally, whether the terminal can use the uplink grant is indicated by using the first indication: When the terminal is allowed to perform uplink transmission on the uplink resource indicated by the uplink grant, the first indication information is carried in the response message; and when the terminal is not allowed to perform uplink transmission on the uplink resource indicated by the uplink grant, the first indication information is not carried in the response message.

S1003: The terminal sends a second message to the network device on the uplink resource.

The second message includes the uplink data and the RRC connection resume request.

In S1003, when the first indication information indicates that the terminal is allowed to perform uplink transmission on the uplink resource indicated by the uplink grant, the terminal may perform uplink transmission on the uplink resource indicated by the received uplink grant.

S1004: The terminal sends a third message to the network device on the uplink resource.

The third message is used to request to resume the RRC connection. When the first indication information indicates that the terminal is not allowed to perform uplink transmission on the uplink resource indicated by the uplink grant, the third message sent by the terminal on the uplink resource indicated by the uplink grant is used to only request to resume the RRC connection, and does not include the uplink DRB data. For example, the third message may be the RRC connection resume request.

With reference to the descriptions in S1003 and S1004, correspondingly, after receiving the second message or the third message sent by the terminal, the network device sends contention resolution information to the terminal, that is, performs S1005.

S1005: The network device sends the contention resolution information to the terminal.

For example, the contention resolution information may be an identifier of the terminal, a part of information of the second message, or a part of information of the third message.

After receiving the contention resolution information, if the terminal has not received the RRC connection release message at this moment, the terminal starts or restarts the timer, and receives the grant from the network device during running of the timer. The grant may be the uplink grant or a downlink grant. When receiving the grant, the terminal restarts the timer, to prolong the duration for monitoring the grant by the terminal. For example, if the uplink grant is received from the network device, the terminal starts or restarts the timer, and performs uplink transmission on the uplink resource indicated by the uplink grant; if the downlink grant is received from the network device and the RRC connection release message is not received, it indicates that there is still data needing to be transmitted, and the terminal starts or restarts the timer to wait for the RRC connection release message, so that the terminal completes uplink transmission when the terminal is in the inactive state, and neither needs to perform uplink transmission after the RRC connection is resumed nor needs to enter a connected state to send data. This not only improves sending efficiency of the data, but also reduces overheads required for resuming the RRC connection.

It may be understood that, after the timer is started or restarted, the timer is not always in a running state, but is stopped when a specific condition, for example, the foregoing scenario of stopping the timer, is met. For example, when receiving the radio resource control (RRC) connection release message from the network device, the terminal controls the timer to stop running, that is, stops the timer. When the terminal receives a radio resource control (RRC) connection resume message, a connection setup message, or the like from the network device, the terminal may also stop the timer.

Figure 11:
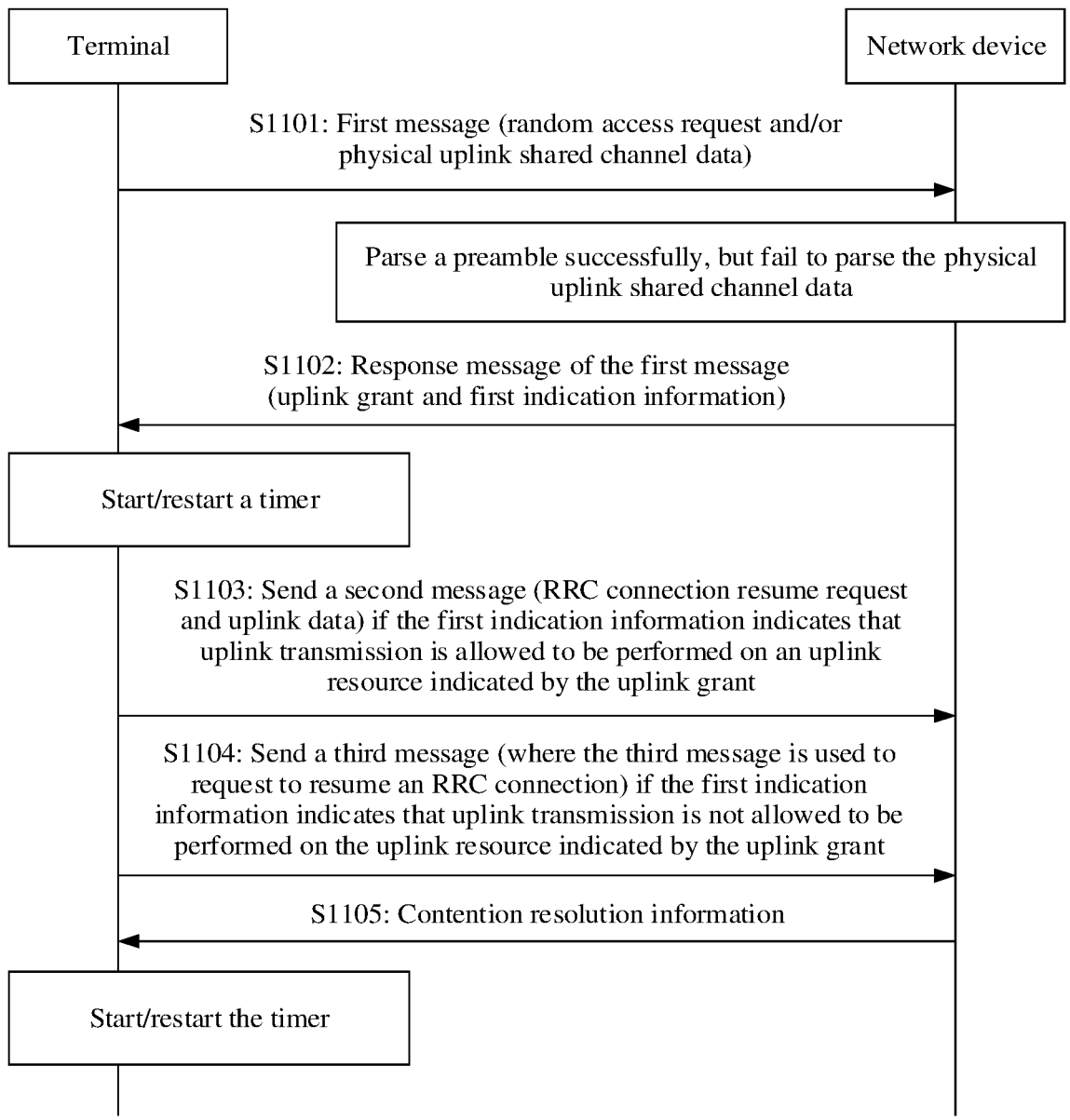
FIG. 11 is a schematic flowchart of still another configuration method according to an embodiment of this application.

It can be learned that, in the embodiment shown in FIG. 10, the first message sent by the terminal to the network device includes the preamble, the RRC connection resume request, and the uplink data. Certainly, the terminal may include one piece of second indication information instead of the uplink data in the first message. The second indication information is used to indicate the comparison result of the volume of to-be-sent data of the terminal and the data volume threshold. In this case, when the network device successfully parses the preamble but fails to parse the uplink data, for example, refer to FIG. 11. FIG. 11 is a schematic flowchart of still another configuration method according to an embodiment of this application. The configuration method may include the following steps.

S1101: A terminal sends a first message to a network device.

The first message includes a random access request and/or physical uplink shared channel data, and the physical uplink shared channel data includes information used to request to resume a radio resource control (RRC) connection, for example, an RRC connection resume request. For example, the random access request may be a preamble, and the physical uplink shared channel data may further include second indication information, where the second indication information is used to indicate a comparison result of a volume of to-be-sent data of the terminal and a data volume threshold. The second indication information is optional.

It may be understood that, when the terminal sends the first message including the second indication information to the network device, and when the first message is the RRC connection resume request in a case, the second indication information may be represented by using a Boolean value in the RRC connection resume request. For example, when the Boolean value is 1, it indicates that the volume of to-be-sent data is greater than the data volume threshold; and when the Boolean value is 0, it indicates that the volume of to-be-sent data is less than the data volume threshold, and vice versa. When the volume of to-be-sent data is equal to the data volume threshold, the Boolean value may be 0 or 1. Alternatively, the second indication information may be represented by using existence of a field in the RRC connection resume request. When the field exists in the RRC connection resume request, for example, the field is TRUE, it indicates that the volume of to-be-sent data is less than the data volume threshold; and when the field does not exist in the RRC connection resume request, for example, when the field is NULL, it indicates that the volume of to-be-sent data is greater than the data volume threshold, and vice versa. When the volume of to-be-sent data is equal to the data volume threshold, the field may or may not exist in the RRC connection resume request. Alternatively, the second indication information may be represented by using an enumeration-type field in the RRC connection resume request. When the field in the RRC connection resume request is TRUE, it indicates that the volume of to-be-sent data is less than the data volume threshold; and when the field in the RRC connection resume request is FALSE, it indicates that the volume of to-be-sent data is greater than the data volume threshold, and vice versa. When the volume of to-be-sent data is equal to the data volume threshold, the field in the RRC connection resume request may be TRUE or FALSE.

Figure 12:
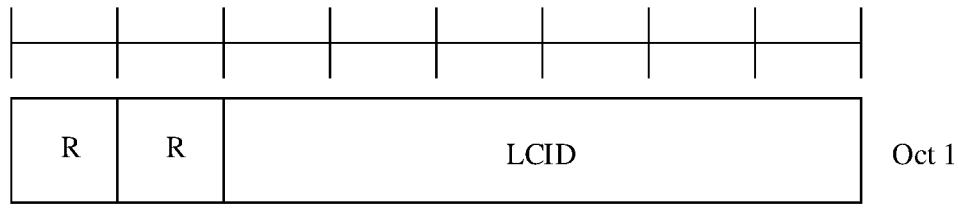
FIG. 12 is a schematic diagram of a structure of a MAC message according to an embodiment of this application.

When the first message is a MAC message in another case, the MAC message is, for example, a MAC sub-PDU, and the MAC sub-PDU may include only a MAC header, or may include a MAC header and a MAC CE. For example, refer to FIG. 12. FIG. 12 is a schematic diagram of a structure of a MAC message according to an embodiment of this application. The MAC message includes only a MAC header, the MAC header includes a logical channel identifier (LCH ID), and the LCH ID is a preset value, indicating that the MAC header carries the second indication information. The second indication information may be implemented by using an indication field in the MAC header, for example, by using a previously reserved bit R. When a value of the bit R is 1, it indicates that the volume of to-be-sent data is greater than the data volume threshold; and when the value of the bit R is 0, it indicates that the volume of to-be-sent data is less than the data volume threshold, or vice versa. When the volume of to-be-sent data is equal to the data volume threshold, the value of the bit R may be 0 or 1.

Figure 13:
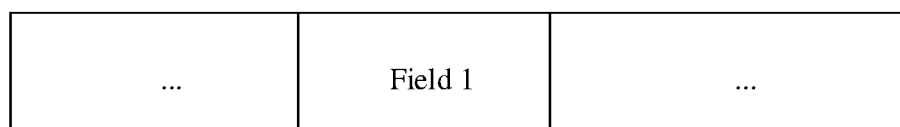
FIG. 13 is a schematic diagram of a structure of another MAC message according to an embodiment of this application.

For example, refer to FIG. 13. FIG. 13 is a schematic diagram of a structure of another MAC message according to an embodiment of this application. The MAC message includes a MAC header and a MAC CE, and a field in the MAC CE carries the second indication information. The MAC header includes an LCH ID, and the LCH ID is a preset value, indicating that the MAC CE carries the second indication information. For example, a 1-bit field 1 in the MAC CE carries the second indication information. When a value of the field 1 is 1, it indicates that the volume of to-be-sent data is greater than the data volume threshold; and when the value of the field 1 is 0, it indicates that the volume of to-be-sent data is less than the data volume threshold, or vice versa. When the volume of to-be-sent data is equal to the data volume threshold, the value of the field 1 may be 0 or 1.

It may be understood that, when the terminal sends the first message including the second indication information to the network device, this embodiment of this application is described by using only an example in which the first message may be the RRC connection resume request message or the MAC message. This may be specifically set based on an actual requirement. This is not further limited in this embodiment of this application.

After the terminal sends the first message including the second indication information to the network device, the network device may parse the preamble and the physical uplink shared channel data that are included in the first message. When the network device successfully parses the preamble but fails to parse the physical uplink shared channel data, the network device sends a response message of the first message to the terminal based on a parsing result, that is, performs S1102.

S1102: The network device sends the response message of the first message to the terminal.

The response message includes an uplink grant and first indication information, and the first indication information is used to indicate whether uplink transmission is allowed to be performed on an uplink resource indicated by the uplink grant. For example, the response message of the first message may be a dedicated RRC signaling message, for example, an RRC connection release message or an RRC reconfiguration message.

The first indication information is the same as the foregoing descriptions, and details are not described herein again.

It should be noted that a method used by the network device to send the response message of the first message to the terminal is similar to the method used by the network device to send the response message of the first message to the terminal in S1002. Refer to the related descriptions in S1002. Herein, details are not described again in this embodiment of this application.

It can be also learned that, different from a conventional technology, in this embodiment of this application, the response message of the first message sent by the network device to the terminal includes not only uplink grant information, but further includes the first indication information. The first indication information indicates different content. Correspondingly, manners of performing uplink transmission by the terminal on the uplink resource indicated by the uplink grant are also different. When the first indication information indicates that the terminal is allowed to perform uplink transmission on the uplink resource indicated by the uplink grant, S1103 may be performed. On the contrary, when the first indication information indicates that the terminal is not allowed to perform uplink DRB data transmission on the uplink resource indicated by the uplink grant, S1104 may be performed.

S1103: The terminal sends a second message to the network device on the uplink resource.

The second message includes the uplink data and the RRC connection resume request.

In S1103, when the first indication information indicates that the terminal is allowed to perform uplink transmission on the uplink resource indicated by the uplink grant, the terminal may perform uplink DRB data transmission on the uplink resource indicated by the received uplink grant.

S1104: The terminal sends a third message to the network device on the uplink resource.

The third message is used to request to resume the RRC connection. When the first indication information indicates that the terminal is not allowed to perform uplink transmission on the uplink resource indicated by the uplink grant, the third message sent by the terminal on the uplink resource indicated by the uplink grant is used to only request to resume the RRC connection, and does not include the uplink data. For example, the third message may be the RRC connection resume request.

With reference to the descriptions in S1103 and S1104, correspondingly, after receiving the second message or the third message sent by the terminal, the network device sends contention resolution information to the terminal, that is, performs S1105:

S1105: The network device sends the contention resolution information to the terminal.

For example, the contention resolution information may be an identifier of the terminal, a part of information of the second message, or a part of information of the third message.

After receiving the contention resolution information, if the terminal has not received the RRC connection release message at this moment, the terminal starts or restarts the timer, and receives the grant from the network device during running of the timer. The grant may be the uplink grant or a downlink grant. When receiving the grant, the terminal restarts the timer, to prolong the duration for monitoring the grant by the terminal. For example, if the uplink grant is received from the network device, the terminal starts or restarts the timer, and performs uplink transmission on the uplink resource indicated by the uplink grant; if the downlink grant is received from the network device and the RRC connection release message is not received, it indicates that there is still data needing to be transmitted, and the terminal starts or restarts the timer to wait for the RRC connection release message, so that the terminal completes uplink transmission when the terminal is in the inactive state, and neither needs to perform uplink transmission after the RRC connection is resumed nor needs to enter a connected state to send data. This not only improves sending efficiency of the data, but also reduces overheads required for resuming the RRC connection.

Figure 14:
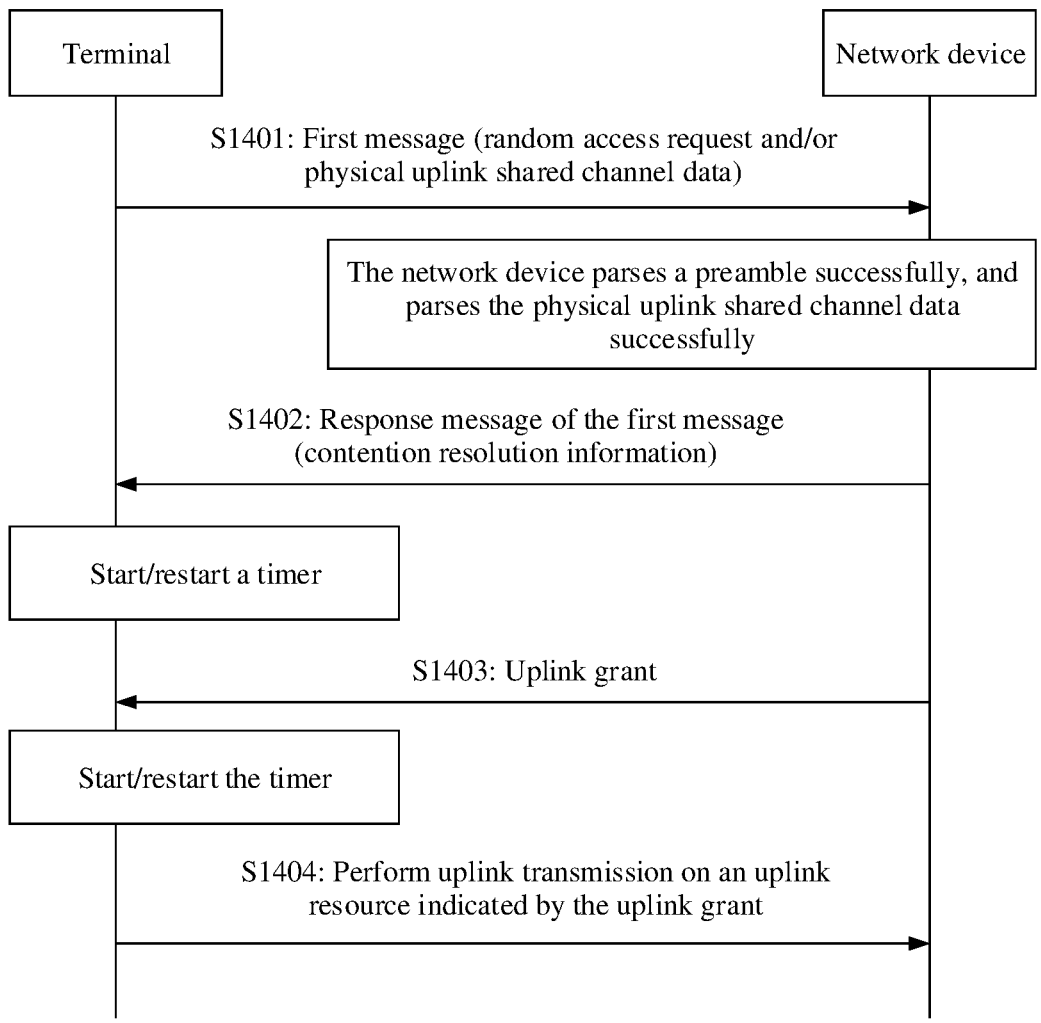
FIG. 14 is a schematic flowchart of yet another configuration method according to an embodiment of this application.

It can be learned that embodiments shown in FIG. 10 and FIG. 11 describe in detail a technical solution in the scenario in which the network device successfully parses the preamble but fails to parse the uplink data. The following describes in detail a technical solution in the other scenario in which the network device successfully parses the preamble and successfully parses the uplink data. For example, refer to FIG. 14. FIG. 14 is a schematic flowchart of still another configuration method according to an embodiment of this application. The configuration method may include the following steps.

S1401: A terminal sends a first message to a network device.

The first message includes a random access request and/or physical uplink shared channel data, and the physical uplink shared channel data includes information used to request to resume an RRC connection.

It should be noted that, a method for sending the first message by the terminal to the network device is similar to the method for sending the first message by the terminal to the network device in S1001 or S1101. Refer to the related descriptions in S1001 or S1101. Herein, details are not described again in this embodiment of this application.

After the terminal sends the first message to the network device, the network device may parse the preamble and the physical uplink shared channel data that are included in the first message. When the network device successfully parses the preamble and successfully parses the physical uplink shared channel data, the network device sends a response message of the first message to the terminal based on a parsing result, that is, performs S1402.

S1402: The network device sends the response message of the first message to the terminal.

The response message includes contention resolution information. Optionally, the response message of the first message may further include a RAP ID, a TA, and a TC-RNTI.

In addition, the response message of the first message may not include an uplink resource and first indication information. Certainly, the response message of the first message may alternatively include the uplink resource and the first indication information.

When the response message is an RRC connection release message, the terminal resumes to an initial state, for example, an inactive state.

When the response message of the first message does not carry the uplink resource and the first indication information, after receiving the response message, the terminal determines that contention resolution succeeds, starts or restarts a timer, and converts the TC-RNTI into a C-RNTI. When the response message of the first message carries the uplink resource and the first indication information, and the first indication information is used to indicate that "uplink transmission is not allowed to be performed on an uplink resource indicated by an uplink grant", correspondingly, after receiving the response message, the terminal determines that the contention resolution succeeds, and starts or restarts the timer. In this case, the terminal may send an acknowledgment response of the response message to the network device on the uplink resource. When the response message of the first message carries the uplink resource and the first indication information, and the first indication information is used to indicate that "uplink transmission is allowed to be performed on an uplink resource indicated by an uplink grant", correspondingly, after receiving the response message, the terminal determines that the contention resolution succeeds, and starts or restarts the timer. In this case, the terminal may send uplink data to the network device on the uplink resource.

It may be understood that after the terminal receives a response message of the contention resolution information from the network device, it indicates that the network device has successfully received the physical uplink shared channel data sent by the terminal. If the terminal still has to-be-transmitted uplink data at this moment, the terminal may further continue to perform S1403 and S1404.

S1403: Receive the uplink grant from the network device.

S1404: Perform uplink transmission on the uplink resource indicated by the uplink grant.

After receiving the contention resolution information, if the terminal has not received the RRC connection release message at this moment, the terminal starts or restarts the timer, and receives a grant from the network device during running of the timer. The grant is used for sending the uplink data or receiving downlink data. Optionally, the grant is used for new transmission and is not used for retransmission. The grant may be the uplink grant or a downlink grant. When receiving the grant, the terminal restarts the timer, to prolong duration for monitoring the grant by the terminal. For example, if the uplink grant is received from the network device, the terminal starts or restarts the timer, and performs uplink transmission on the uplink resource indicated by the uplink grant; if the downlink grant is received from the network device and the RRC connection release message is not received, it indicates that the network device still has data needing to be transmitted, and the terminal starts or restarts the timer. The terminal prolongs time for waiting for the RRC connection release message in the foregoing manner, so that the terminal completes data transmission when the terminal is in the inactive state, and neither needs to perform uplink transmission after an RRC connection is resumed nor needs to enter a connected state to send data. This not only improves sending efficiency of the data, but also reduces overheads required for resuming the RRC connection.

It may be understood that, in embodiments shown in FIG. 10, FIG. 11, and FIG. 14, after the timer is started or restarted, the timer is not always in a running state, but is stopped when a specific condition, for example, the foregoing scenario of stopping the timer, is met. For example, when receiving the radio resource control RRC connection release message from the network device, the terminal controls the timer to stop running, that is, stops the timer. When the terminal receives a radio resource control (RRC) connection resume message, a connection setup message, or the like from the network device, the terminal may also stop the timer.

In embodiments shown in FIG. 10, FIG. 11, and FIG. 14, during running of the timer, the terminal monitors a PDCCH scrambled by a C-RNTI, where the PDCCH indicates a PUSCH resource used to send uplink data or a BSR. Alternatively, during running of the timer, the terminal monitors a PDCCH scrambled by a C-RNTI, where the PDCCH indicates a PDSCH resource used to receive downlink data. Alternatively, during running of the timer, the terminal monitors a PDCCH scrambled by a C-RNTI, and receives a downlink feedback of uplink data.

Each time the terminal receives an uplink grant or a downlink grant of the PDCCH scrambled by the C-RNTI, the terminal starts or restarts the timer, to maintain that the duration for monitoring the PDCCH scrambled by the C-RNTI is synchronous with time for sending a PDCCH scrambled by a C-RNTI of the network device. In addition, when the timer expires, the terminal stops monitoring the PDCCH scrambled by the C-RNTI.

Figure 15:
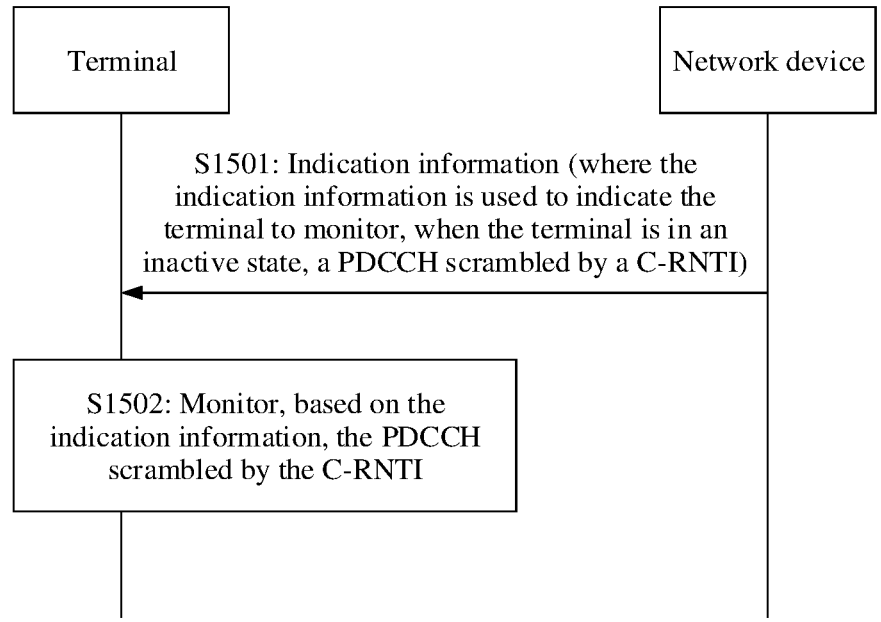
FIG. 15 is a schematic flowchart of a configuration method according to an embodiment of this application.

In addition, in a conventional technology, when a network device needs to send downlink data, the network device first pages a terminal. Correspondingly, after receiving the paging, the terminal initiates a random access process to the network device before receiving the downlink data sent by the network device. For a terminal in a non-connected state, when small and sparse data is sent, because the terminal needs to perform a random access process before sending a small piece of data, overheads of the terminal are large, and a transmission delay is also increased. To reduce the overheads of the terminal and reduce the transmission delay, an embodiment of this application further provides a configuration method. For example, refer to FIG. 15. FIG. 15 is a schematic flowchart of a configuration method according to an embodiment of this application. The configuration method may include the following steps.

S15001: A network device sends indication information to a terminal.

The indication information is used to indicate the terminal to monitor a physical downlink control channel (PDCCH) when the terminal is in an inactive state.

Optionally, the network device may send an RRC connection release message to the terminal, where the RRC connection release message includes the indication information. That is, the network device may include the indication information in the RRC connection release message and send the RRC connection release message to the terminal. Correspondingly, the terminal may obtain the indication information by receiving the RRC connection release message. It may be understood that, after receiving the RRC connection release message, the terminal enters the inactive state from a connected state, and monitors, in the inactive state, the PDCCH based on the indication information. In this way, a function of monitoring the PDCCH by the terminal when the terminal is in the inactive state may be independently configured for the terminal. In addition, this function is configured when the terminal is configured to enter the inactive state, and does not need to be indicated by using additional signaling, to save signaling. The network device may also send the indication information in another manner. For example, the network device includes the indication information in a broadcast message for broadcasting. Correspondingly, the terminal may obtain the indication information by receiving the broadcast message. In this way, each terminal does not need to be independently configured to monitor the PDCCH when the terminal is in the inactive state. Herein, this embodiment of this application is described by using only the two manners as examples, but this does not mean that this embodiment of this application is limited thereto.

For example, the indication information may be implemented by using 1 bit. For example, if a value of the bit is 1, it indicates that a function of monitoring, in the inactive state, the physical downlink control channel (PDCCH) scrambled by the C-RNTI is enabled; the value of the bit is 0, it indicates that the function of monitoring, in the inactive state, the physical downlink control channel (PDCCH) is disabled. Alternatively, the indication information may be implemented by using an enumeration type, for example, {TRUE} or {downlink reception}. The PDCCH is scrambled by the cell radio network temporary identifier (C-RNTI). Therefore, in another implementation, the indication information may be the C-RNTI. For example, when the RRC connection release message carries the C-RNTI, the terminal is indicated to monitor, in the inactive state, the PDCCH scrambled by the C-RNTI; and if the RRC connection release message does not carry the C-RNTI, the terminal is indicated not to monitor the PDCCH in the inactive state.

After receiving the indication information sent by the network device, the terminal may determine the C-RNTI for scrambling the PDCCH, and further monitor, by using the C-RNTI, the PDCCH scrambled by the C-RNTI.

In an implementation, the network device may send the C-RNTI to the terminal in the RRC connection release message. In this case, the RRC connection release message may include the indication information and the C-RNTI, or include the C-RNTI. This is the same as the foregoing descriptions. The C-RNTI is the indication information.

The C-RNTI is valid in an access network notification area (RAN notification area, RNA), an indicated cell, or a currently accessed cell. For example, the network device may indicate an RNA corresponding to the C-RNTI, where the C-RNTI may be corresponding to one or more RNAs. For example, the network device indicates an RNA identifier (ID) or RNA ID list corresponding to the C-RNTI. The RAN ID or the RAN ID list may also be carried in the RRC connection release message, or carried in another message. For another example, the network device may indicate a cell ID or cell ID list corresponding to the C-RNTI, and the cell ID or cell ID list may also be carried in the RRC connection release message or carried in another message. In this way, the terminal may monitor a PDCCH by using the C-RNTI in a RAN area indicated by the RAN ID or in a cell indicated by the cell ID. When the network device does not indicate the RNA or the cell, it may be considered that the C-RNTI is valid in the currently accessed cell, where the currently accessed cell is a cell in which the RRC connection release message is sent. In another implementation, the network device may not send the C-RNTI to the terminal. In this case, the terminal may monitor, by using a C-RNTI obtained in a random access process of accessing the currently accessed cell, a PDCCH scrambled by the C-RNTI. The currently accessed cell is a cell in which the RRC connection release message is sent.

After receiving the indication information and determining the C-RNTI for scrambling the PDCCH, the terminal may monitor, based on the indication information, the PDCCH scrambled by the C-RNTI, that is, perform S1502.

S1502: The terminal monitors, based on the indication information, the PDCCH scrambled by the C-RNTI.

The following describes an occasion for monitoring the PDCCH by the terminal. For example, when the occasion for monitoring the PDCCH is determined, the occasion for monitoring the PDCCH may be determined from two dimensions: a time domain and a frequency domain.

Figure 16:
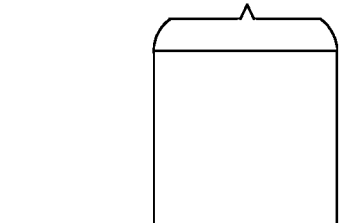
FIG. 16 is a schematic diagram of determining an occasion for monitoring a PDCCH scrambled by a C-RNTI according to an embodiment of this application.
Figure 16:
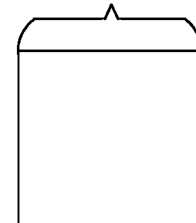

When the occasion for monitoring the PDCCH is determined in time domain, the terminal may use a paging occasion as the occasion for monitoring the PDCCH scrambled by the C-RNTI. Specifically, the terminal receives a discontinuous reception (DRX) configuration parameter, and determines, based on the DRX configuration parameter, the paging occasion, namely, an occasion for monitoring a PDCCH scrambled by a paging radio network temporary identifier (P-RNTI); and uses the paging occasion as the occasion for monitoring the PDCCH scrambled by the C-RNTI. For example, refer to FIG. 16. FIG. 16 is a schematic diagram of determining an occasion for monitoring a PDCCH scrambled by a C-RNTI according to an embodiment of this application. Optionally, a part of time of the paging occasion may be determined as the occasion for monitoring the PDCCH scrambled by the C-RNTI. This may be specifically set based on an actual requirement.

For example, when the paging occasion is determined based on the DRX configuration parameter, a paging radio frame may be determined, that is, a system frame number (SFN) may be determined, where (SFN+PF_offset) mod T=(T div N)*(terminal_ID mod N); and an $i\_s^{th}$ paging occasion in the radio frame is determined, where i_s=floor (terminal_ID/N) mod Ns. T represents a DRX periodicity of the terminal, N represents a quantity of paging frames in the DRX periodicity, Ns represents a quantity of paging occasions in the paging frame, PF_offset represents an offset used to determine the paging radio frame, and terminal_ID is an identifier of the terminal. The identifiers are different in different communication systems. For example, in a 5G system, terminal_ID is 5G-S-TMSI mod 1024. It may be understood that T, N, Ns, and PF_offset may be configured by the network device for the terminal, for example, configured for the terminal by using a broadcast message or configured for the terminal by using a dedicated RRC message.

After the paging occasion for monitoring the P-RNTI PDCCH in the radio frame is determined based on the DRX configuration parameter, the PDCCH scrambled by the C-RNTI may be monitored in all paging occasions or in a part of time of the paging occasions. When the PDCCH scrambled by the C-RNTI is monitored in a part of time of the paging occasions, the PDCCH scrambled by the C-RNTI may be monitored in a part of duration of each paging occasion, or the PDCCH scrambled by the C-RNTI may be monitored in a portion of the paging occasions.

Figure 17:
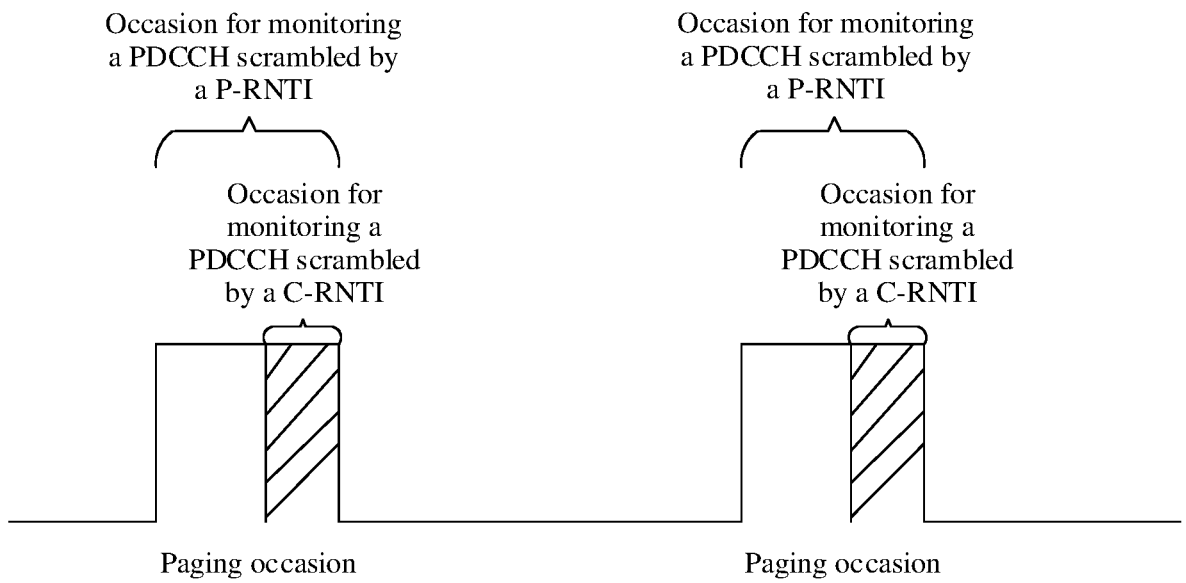
FIG. 17 is another schematic diagram of determining an occasion for monitoring a PDCCH scrambled by a C-RNTI according to an embodiment of this application.

The following describes, with reference to the accompanying drawing, monitoring the PDCCH scrambled by the C-RNTI in a part of duration of each paging occasion. For example, refer to FIG. 17. FIG. 17 is another schematic diagram of determining an occasion for monitoring a PDCCH scrambled by a C-RNTI according to an embodiment of this application. As shown in FIG. 17, a shaded part in FIG. 17 is the occasion for monitoring the PDCCH scrambled by the C-RNTI. The occasion for monitoring the PDCCH scrambled by the C-RNTI may be determined based on a parameter, and the parameter may be configured by the network device for the terminal or preset. For example, each paging occasion includes N slots or symbols, and the parameter is used to indicate that M slots or symbols in the N slots or symbols are used to monitor the PDCCH scrambled by the C-RNTI. In an implementation, the parameter is used to indicate M. By default, the terminal uses first M slots or symbols or last M slots or symbols to monitor the PDCCH scrambled by the C-RNTI. In another implementation, the parameter is used to indicate an $S^{th}$ slot or symbol. In this case, the terminal starts to monitor, from the $S^{th}$ slot or symbol, the PDCCH scrambled by the C-RNTI, or starts to monitor, after the $S^{th}$ slot or symbol, the PDCCH scrambled by the C-RNTI. M, N, and S are positive integers, and M and S are less than N.

When the PDCCH is monitored in a portion of the paging occasions, a manner similar to the foregoing manner of determining the paging occasion may be used to determine the occasion for monitoring the PDCCH scrambled by the C-RNTI. For example, T in the foregoing formula for determining the SFN is modified to T1, where T1 is an integer multiple of T, that is, (SFN+PF_offset) mod T=(T1 div N)*(Terminal_ID mod N). A manner of determining the paging occasion i_s in the radio frame remains unchanged.

Figure 18:
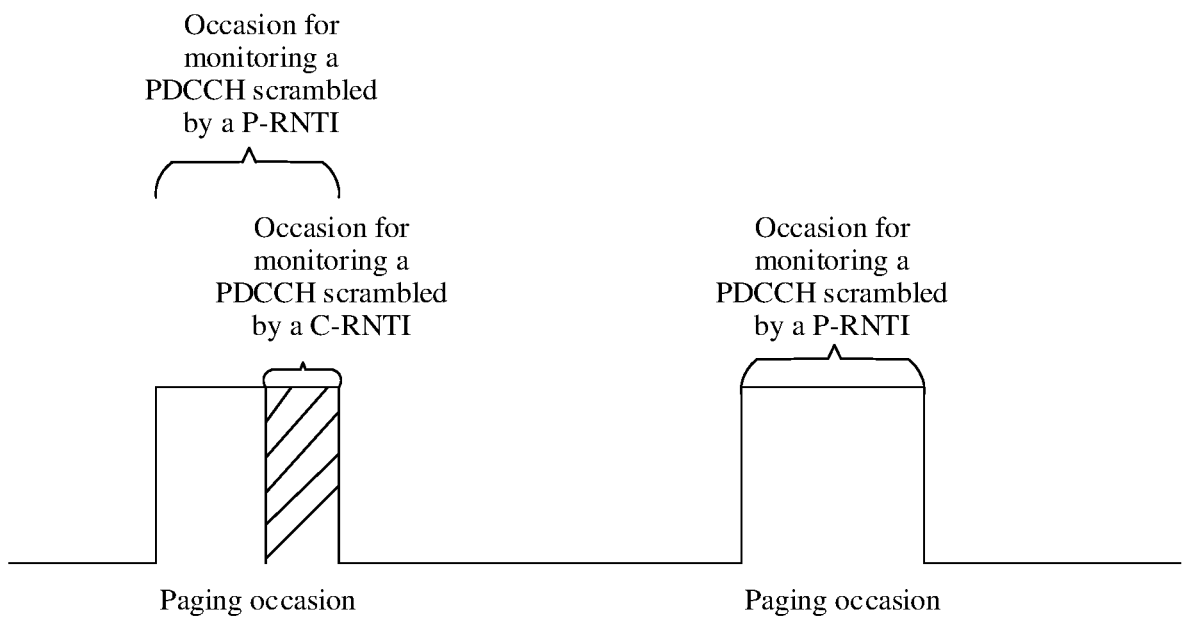
FIG. 18 is still another schematic diagram of determining an occasion for monitoring a PDCCH scrambled by a C-RNTI according to an embodiment of this application.

In addition, the foregoing two manners may also be combined, that is, the PDCCH scrambled by the C-RNTI is monitored in a part of time of a portion of the paging occasions. For example, refer to FIG. 18. FIG. 18 is still another schematic diagram of determining an occasion for monitoring a PDCCH scrambled by a C-RNTI according to an embodiment of this application. As shown in FIG. 18, a shaded part in FIG. 18 is the occasion for monitoring the PDCCH scrambled by the C-RNTI.

Figure 19:
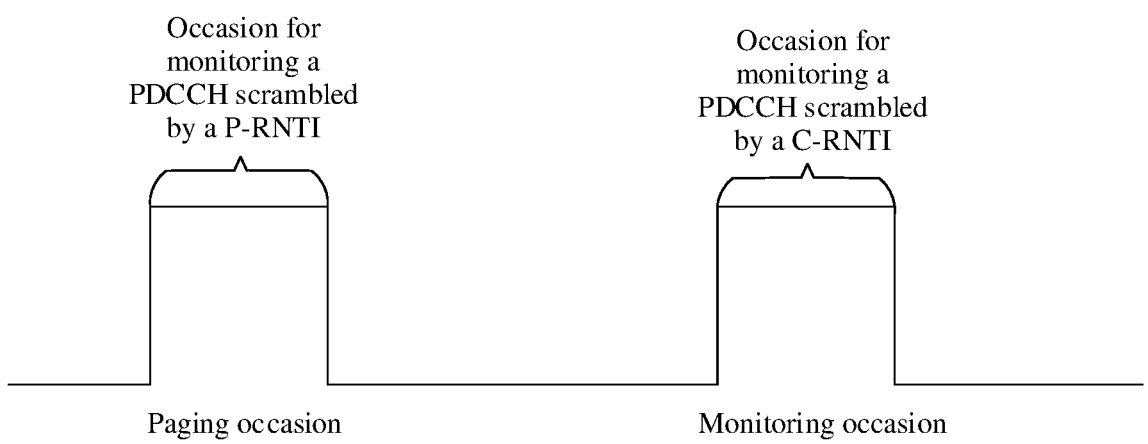
FIG. 19 is yet another schematic diagram of determining an occasion for monitoring a PDCCH scrambled by a C-RNTI according to an embodiment of this application.

Optionally, in another possible implementation, determining the occasion for monitoring the PDCCH scrambled by the C-RNTI is independent of determining a paging occasion. For example, a manner similar to a manner of determining the paging occasion may be used to determine the occasion for monitoring the PDCCH scrambled by the C-RNTI. A difference lies in that used parameters are different, for example, used parameters PF_offset are different. For example, when the occasion for monitoring the PDCCH scrambled by the C-RNTI is determined based on the DRX configuration parameter, the SFN of the radio frame may be determined, where (SFN+PF_offset1) mod T=(T div N)*(terminal_ID mod N), and the $i\_s^{th}$ monitoring occasion in the radio frame is determined, where i_s=floor (terminal_ID/N) mod Ns. T represents a DRX periodicity of the terminal, N represents a quantity of paging frames in the DRX periodicity, Ns represents a quantity of paging occasions in the paging frame, PF_offset1 represents an offset used to determine a radio frame of a C-RNTI PDCCH, and terminal_ID is an identifier of the terminal. The identifiers are different in different communication systems. For example, in a 5G system, terminal_ID is 5G-S-TMSI mod 1024. It may be understood that T, N, Ns, and PF_offset1 may be configured by the network device for the terminal, for example, configured for the terminal by using a broadcast message or configured for the terminal by using a dedicated RRC message. PF_offset1 and the offset value PF_offset used to determine the paging radio frame may be independently configured. Therefore, the occasion for monitoring the PDCCH scrambled by the C-RNTI is independent of a paging occasion for monitoring the PDCCH scrambled by the P-RNTI. For example, refer to FIG. 19. FIG. 19 is yet another schematic diagram of determining an occasion for monitoring a PDCCH scrambled by a C-RNTI according to an embodiment of this application.

In another possible implementation, the terminal may first determine an SFN of a paging radio frame, and determine, based on a parameter, a radio frame for monitoring the PDCCH scrambled by the C-RNTI, where a manner of determining the SFN of the paging radio frame is the same as the foregoing descriptions, that is, (SFN+PF_offset) mod T=(T div N)*(terminal_ID mod N). Then, the terminal determines, based on an offset value, an SFN of the radio frame for monitoring the PDCCH scrambled by the C-RNTI (also referred to as a C-RNTI PDCCH radio frame), where the offset value is identified by PF_offset2. In this case, C-RNTI PDCCH radio frame=paging radio frame+PF_offset2, where PF_offset2 may be configured by the network device for the terminal, or may be a preset value. Then, the terminal may determine, in the foregoing manner of determining the i_s$^{th}$ paging occasion, the occasion for monitoring the PDCCH scrambled by the C-RNTI in the C-RNTI PDCCH radio frame, namely, a monitoring occasion. For example, refer to FIG. 19.

In addition, when moving out of a valid area of the C-RNTI, the terminal may stop monitoring the PDCCH scrambled by the C-RNTI.

It can be learned that, in this embodiment of this application, the network device sends the indication information to the terminal, to indicate, by using the indication information, the terminal to monitor, when the terminal is in the inactive state, the PDCCH scrambled by the C-RNTI. In this way, the terminal may receive downlink data in a process of monitoring the PDCCH scrambled by the C-RNTI. In an entire receiving process, the terminal directly receives the downlink data in the inactive state without needing to receive paging or initiate an RRC connection resume request. This not only improves transmission efficiency, but also reduces overheads of the terminal.

In a wireless communication system, for example, a 5G communication system or an LTE communication system, after a terminal accesses a cell, a network device to which the cell belongs generates a context of the terminal, and the terminal also generates the context of the terminal based on a configuration message sent by the network device. After an RRC status of the terminal changes, the network device processes the context of the terminal. For example, when the terminal changes from an RRC connected state (connected state) to an RRC idle state (idle state), the network device releases the context of the terminal. For another example, when the terminal changes from a connected state to an inactive state, the terminal and the network device store a portion of an access stratum configuration (referred to as a context of the terminal at an access stratum) and a non-access stratum configuration (referred to as a context of the terminal at a non-access stratum). The terminal may periodically initiate a radio access network-based notification area update (RAN-based Notification Area Update, R-NAU) process to the network device, to notify the network device of a radio access network-based notification area (RAN-based Notification Area, RNA) in which the terminal is located. When the terminal in the inactive state reselects a new cell, the terminal initiates an R-NAU process to a network device to which the new cell belongs, and notifies the network device of an RNA in which the terminal is located.

When receiving downlink data of the terminal, the network device pages the terminal in a cell of the RNA in which the terminal is located. After receiving the paging, the terminal initiates a state transition process from the inactive state to the connected state. The network device notifies the terminal to resume a saved access stratum configuration. After the terminal enters the connected state, the network device sends downlink data to the terminal. When the terminal has uplink data to be sent, the terminal initiates a state transition process from the inactive state to the connected state. The network device notifies the terminal to resume the saved access stratum configuration. After entering the connected state, the terminal sends the uplink data.

In the state transition process of the terminal from the inactive state to the connected state, the terminal needs to send an RRC connection resume request message to the network device. To detect whether an RRC connection is successfully resumed, a T319 timer is used. The terminal starts the T319 timer, sends the RRC connection resume request message to the network device, and stops the T319 timer when receiving an RRC response message such as an RRC connection resume message, an RRC connection setup message, or an RRC connection release message sent by the network device. When T319 expires, the terminal releases a connection and enters an idle state due to an RRC connection restoration failure.

When the terminal has a small volume of data to be transmitted, the terminal may perform uplink data transmission in the inactive state. For example, when sending the RRC connection resume request message, the terminal sends uplink data to the network device. In the foregoing embodiments, it has been provided that, the terminal in the inactive state may continue to send data subsequently after sending the "RRC connection resume request" message, and the RRC connection resume request message may not be carried when the data is subsequently sent, to reduce signaling overheads. However, when the terminal subsequently sends the data, if the T319 timer expires, the terminal enters the RRC idle state, and cannot flexibly support sending of the data for a plurality of times.

In embodiments shown in FIG. 10, FIG. 11, and FIG. 14, the terminal may restart the T319 timer when a specific condition is met. In this way, the time for the terminal to wait for the RRC response message of the RRC connection resume request may be prolonged, and sending of the data for a plurality of times is flexibly supported. Certainly, a new timer may alternatively be started. For example, the new timer may be an RRC layer timer or a MAC layer timer other than the T319 timer, so that the terminal starts the new timer when a specific condition is met, and performs data transmission during running of the new timer. Similarly, the time for the terminal to wait for the RRC response message of the RRC connection resume request may be prolonged, and sending of the data for a plurality of times is flexibly supported. For example, refer to the method provided in embodiments of this application. When responding to an RRC connection resume requirement, the terminal starts a first timer, and sends an RRC connection resume request message to the network device. In this way, during running of the first timer, the terminal may restart the first timer based on downlink information received from the network device or based on data transmission with the network device. Alternatively, during running of the first timer, the terminal may start a second timer based on the downlink information received from the network device or based on the data transmission with the network device. It can be learned that, in embodiments of this application, the first timer is restarted or the second timer is started, so that data transmission is performed during running of the first timer or the second timer. This can effectively prolong the time for the terminal to wait for an RRC response message of the RRC connection resume request, to flexibly support sending of data for a plurality of times.

Based on the foregoing descriptions, it is not difficult to learn that the configuration method provided in embodiments of this application may include at least two possible scenarios. In one possible scenario, the terminal starts the first timer when responding to the RRC connection resume requirement, and restarts the first timer when a restart condition is met during running of the first timer, to prolong the time for the terminal to wait for the RRC response message of the RRC connection resume request. It can be learned that, in this possible scenario, the timer restarted when the restart condition is met and the timer started in response to the RRC connection resume requirement are a same timer, and both are the first timer. In the other possible scenario, the terminal starts the first timer when responding to the RRC connection resume requirement, and starts the second timer when a start condition is met during running of the first timer, to prolong the time for the terminal to wait for the RRC response message of the RRC connection resume request. It can be learned that, in this possible scenario, the timer restarted when the restart condition is met is different from the timer started in response to the RRC connection resume requirement, and is a new timer that is additionally set. It may be understood that, in this possible scenario, after the second timer is started, the first timer may be further stopped. Certainly, the first timer may be stopped first and the second timer may be started subsequently, or the first timer may be stopped when the second timer is started. In this way, the second timer is used to replace the first timer, to prolong the time for the terminal to wait for the RRC response message of the RRC connection resume request.

It should be noted that the related descriptions in the foregoing two possible scenarios may be understood as a solution in which a prolonging operation is performed for the first time by using the first timer or the second timer. For the first timer in the first possible implementation, the terminal sends the RRC connection resume request message to the network device, starts the first timer, and restarts the first timer when a restart condition is met, to perform the prolonging operation for the first time. The prolonging operation can be performed for the second time or the third time . . . . When the prolonging operation is subsequently performed for the $M^{th}$ (where M is greater than or equal to 1) time, the terminal may directly send uplink data without sending the RRC connection resume request message to the network device, and restart the first timer when the restart condition is met, to prolong the time for the terminal to wait for the RRC response message of the RRC connection resume request. For the second timer in the second possible implementation, the terminal sends the RRC connection resume request message to the network device, starts the first timer, and starts the second timer when a start condition is met, to perform the prolonging operation for the first time. Then, when the restart condition is met, the prolonging operation can be performed for the second time or the third time . . . . When the prolonging operation is subsequently performed for the $M^{th}$ (where M is greater than or equal to 1) time, the terminal may directly send uplink data without sending the RRC connection resume request message to the network device, and start or restart the second timer when the start condition or the restart condition is met, to prolong the time for the terminal to wait for the RRC response message of the RRC connection resume request.

To facilitate understanding of the configuration method provided in embodiments of this application, the following separately describes the configuration method provided in embodiments of this application in detail in the foregoing two possible scenarios.

First, in the foregoing first possible scenario, the terminal starts the first timer when responding to the RRC connection resume requirement, and restarts the first timer when the restart condition is met during running of the first timer, to prolong the time for the terminal to wait for the RRC response message of the RRC connection resume request. For example, in this possible scenario, when the time for the terminal to wait for the RRC response message of the RRC connection resume request is prolonged by restarting the first timer, at least three possible implementations may be included. In a possible implementation, the first timer may be a T319 timer currently configured by a network. To be specific, when responding to the RRC connection restoration requirement, the terminal first starts the T319 timer, and sends the RRC connection resume request message to the network device. In this way, during running of the T319 timer, the terminal may restart the T319 timer based on the downlink information received from the network device or based on the data transmission with the network device. In another possible implementation, the first timer may be a new timer T1 that is additionally set at an RRC layer and that is other than the T319 timer. To be specific, the terminal first starts the new timer T1 when responding to the RRC connection resume requirement, and sends the RRC connection resume request message to the network device. In this way, during running of the new timer T1, the terminal may restart the new timer T1 based on the downlink information received from the network device or based on the data transmission with the network device. In the other possible implementation, the first timer may be a new timer T2 that is additionally set and that is other than the T319 timer. Different from the timer T1 in the second possible implementation, the new timer T2 is a timer set at a MAC layer. To be specific, when responding to the RRC connection resume requirement, the terminal first starts the new timer T2, and sends the RRC connection resume request message to the network device. In this way, during running of the new timer T2, the terminal may restart the new timer T2 based on the downlink information received from the network device or based on the data transmission with the network device. For the foregoing three possible implementations, the following describes in detail how to control the first timer to restart, to prolong the time for the terminal to wait for the RRC response message of the RRC connection resume request, so as to flexibly support sending of data for a plurality of times.

Figure 20:
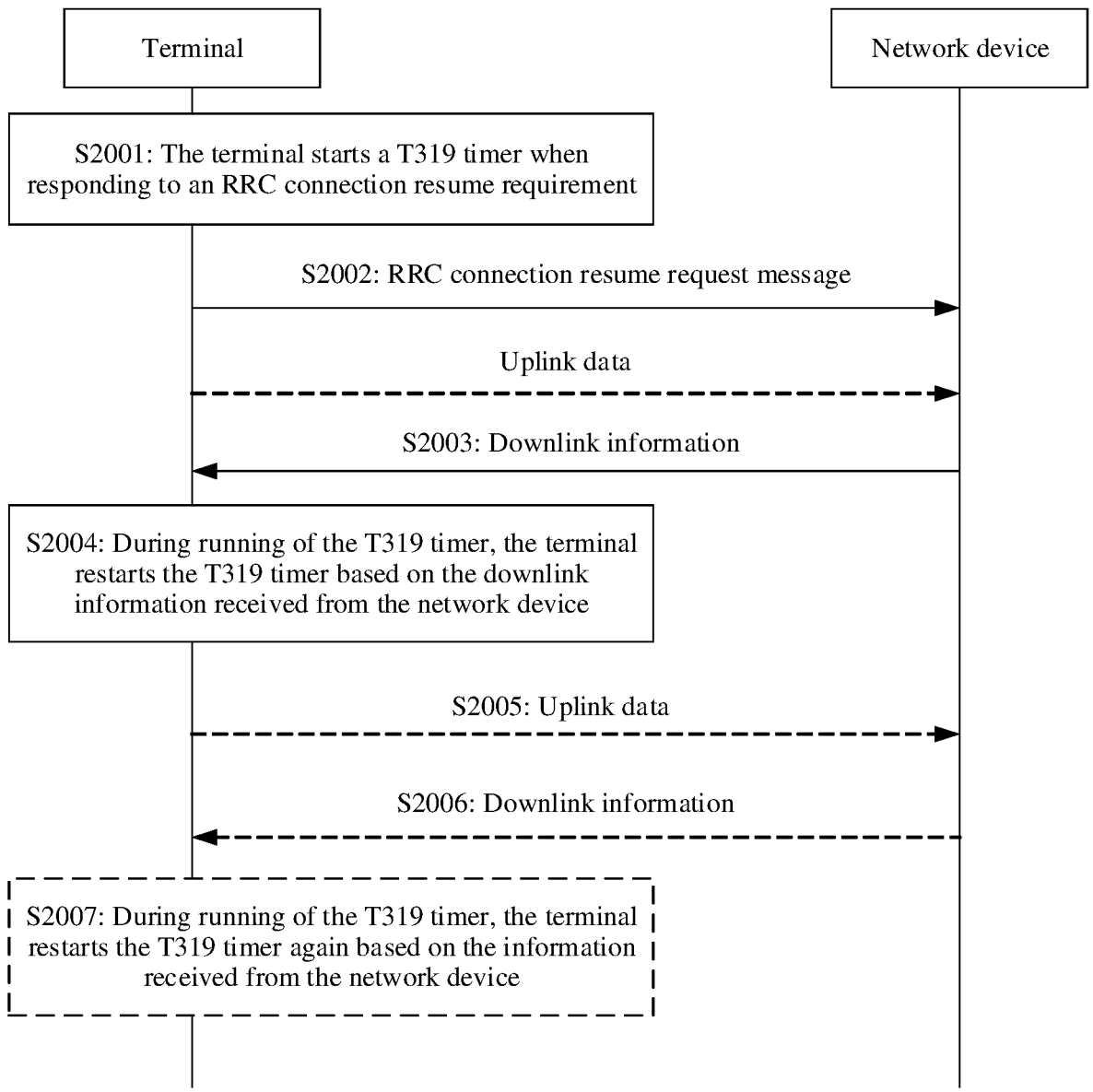
FIG. 20 is a schematic flowchart of a configuration method according to an embodiment of this application.

In the foregoing first possible implementation, the first timer may be a T319 timer currently configured by a network. To be specific, when responding to the RRC connection restoration requirement, the terminal first starts the T319 timer, and sends the RRC connection resume request message to the network device. In this way, during running of the T319 timer, the terminal may restart the T319 timer based on the downlink information received from the network device or based on the data transmission with the network device. It should be noted that, in this possible implementation, an example in which the terminal may restart, during running of the T319 timer, the T319 timer based on the downlink information received from the network device is used for description. Certainly, during running of the T319 timer, the T319 timer may alternatively be restarted based on the data transmission with the network device. For example, refer to FIG. 20. FIG. 20 is a schematic flowchart of a configuration method according to an embodiment of this application. The configuration method may include the following steps.

S2001: A terminal starts a T319 timer when responding to an RRC connection resume requirement.

Before starting the T319 timer, the terminal first configures duration of the T319 timer, so that the T319 timer can run based on the configured duration. For example, when configuring the duration of the T319 timer, the terminal may receive a broadcast message or an RRC message from a network device, and configure the duration of the T319 timer based on information that is included in the broadcast message or the RRC message and that indicates the duration of the T319 timer. The duration of the T319 timer may be first duration of the T319 timer that is currently configured by a network. For example, the first duration may be a value in {100 ms, 200 ms, 300 ms, 400 ms, 600 ms, 1000 ms, 1500 ms, 2000 ms}, or may be greater than second duration of the T319 timer that is currently configured by the network. The second duration may be configured by using the broadcast message or the RRC message. For example, the second duration is a value in {100 ms, 200 ms, 300 ms, 400 ms, 600 ms, 1000 ms, 1500 ms, 2000 ms, 2500 ms}. For example, the second duration may be 2500 ms. The T319 timer is restarted when a restart condition is met. Therefore, for both the two types of different duration, time for the terminal to wait for an RRC response message of an RRC connection resume request can be effectively prolonged. It may be understood that, when the configured duration of the T319 timer becomes longer, time for performing data transmission between the terminal and the network device becomes longer, so that the terminal and the network device perform data transmission for a plurality of times.

When the T319 timer is configured with the foregoing two types of different duration, duration used by the T319 timer, namely, the first duration or the second duration, is first determined before the timer is started. When the duration used by the T319 timer is determined, it is determined that the duration of the T319 timer is the second duration if the terminal meets one of the following conditions. Condition 1: The terminal expects continuous uplink data transmission in an inactive state. Condition 2: The terminal cannot send all uplink data at a time in the inactive state. Condition 3: A volume of data to be sent by the terminal is greater than a pre-configured threshold. Condition 4: The terminal supports uplink data transmission in the inactive state. Condition 5: The terminal is configured with the T319 timer having the second duration. In this case, after the terminal determines that the duration of the T319 timer is the second duration, optionally, the terminal may further send indication information to the network device, where the indication information is used to indicate to the network device that the duration of the T319 timer started by the terminal is the second duration, so that information about the started T319 timer is synchronized to the network device. It may be understood that, an operation of synchronizing, by using the indication information, the information about the T319 timer already started by the terminal to the network device may be performed only when a start operation is performed for the first time, and in a subsequent restart operation, the terminal may no longer need to send the indication information to the network device.

S2002: The terminal sends an RRC connection resume request message to the network device.

For example, the RRC connection resume request message may include at least one of an I-RNTI, identity authentication information of the terminal, and a cause value for initiating the RRC connection resume request by the UE. The I-RNTI is used to represent a unique identifier of the terminal in an RNA range. The identity verification information of the terminal is identity verification information generated based on a C-RNTI and an RRC integrity key that are stored in the terminal.

When sending the RRC connection resume request message to the network device, the terminal may send the RRC connection resume request message to the network device by using an uplink resource indicated by configured grant information. For example, the configured grant information may be obtained from a broadcast message of the network device, or may be obtained from a dedicated message sent by the network device to the terminal. For example, in addition to sending the RRC connection resume request message to the network device, the terminal may further send, to the network device, at least one of uplink data, auxiliary information, and indication information indicating that the terminal expects to remain in the inactive state and continue to send data. The auxiliary information is used to indicate a volume of data in a buffer of the terminal, so that the network device determines, based on the volume of data in the buffer of the terminal, that the terminal enters the connected state or continues to be in the inactive state. When the terminal sends the uplink data to the network device, the uplink data and the RRC connection resume request message are sent jointly or independently. Joint sending or independent sending in this application means whether the uplink data and the RRC connection resume request message are sent by using a same message, for example, a MAC PDU message. If the uplink data and the RRC connection resume request message are sent by using a same message, it may be understood that the uplink data and the RRC connection resume request message are sent jointly. On the contrary, if the uplink data and the RRC connection resume request message are not sent by using a same message, it may be understood that the uplink data and the RRC connection resume request message are sent independently. In addition, if the uplink data and the RRC connection resume request message are sent independently, the uplink data may be sent during running of the first timer after the RRC connection resume request message is sent.

After the terminal sends the RRC connection resume request message to the network device, correspondingly, the network device may send corresponding downlink information to the terminal based on the RRC connection resume request message, that is, perform S2003.

S2003: The network device sends the downlink information to the terminal based on the RRC connection resume request message.

If the terminal sends only the RRC connection resume request message to the network device, the downlink information sent by the network device to the terminal includes feedback information of the RRC connection resume request message. If the terminal sends the RRC connection resume request message and the uplink data to the network device, the downlink information sent by the network device to the terminal includes feedback information of the RRC connection resume request message and uplink data.

For example, if the terminal sends only the RRC connection resume request message to the network device, the downlink information may include at least one of the following: the feedback information of the RRC connection resume request message, a timing adjustment command, a power control command, contention resolution information, uplink grant information, downlink resource allocation information, and indication information of a new field. The indication information is used to indicate the terminal to restart the T319 timer. Certainly, the downlink information may also include other information. Herein, this embodiment of this application is described by using only an example in which the downlink information includes at least one of the feedback information of the RRC connection resume request message, the timing adjustment command, the power control command, the contention resolution information, the uplink grant information, the downlink resource allocation information, and the indication information of the new field. However, this does not mean that this embodiment of this application is limited thereto. If the terminal sends the RRC connection resume request message and the uplink data to the network device, the downlink information may include at least one of the following: the feedback information of the RRC connection resume request message, the feedback information of the uplink data, a timing adjustment command, a power control command, contention resolution information, uplink grant information, downlink resource allocation information, and indication information of a new field. Certainly, the downlink information may also include other information. Herein, this embodiment of this application is described by using only an example in which the downlink information includes at least one of the feedback information of the RRC connection resume request message, the feedback information of the uplink data, the timing adjustment command, the power control command, the contention resolution information, the uplink grant information, the downlink resource allocation information, and the indication information of the new field. However, this does not mean that this embodiment of this application is limited thereto.

After receiving the RRC connection resume request message sent by the terminal, or the RRC connection resume request message and the uplink data that are sent by the terminal, the network device may generate corresponding downlink information based on the received RRC connection resume request message or the RRC connection resume request message and the uplink data, and sends the generated downlink information to the terminal. For example, when sending the generated information to the terminal, the network device may include the generated information in downlink control information of a PDCCH, a MAC message, or an RRC message, and send the downlink control information, the MAC message, or the RRC message to the terminal.

S2004: During running of the T319 timer, the terminal restarts the T319 timer based on the downlink information received from the network device.

With reference to the related descriptions in S2003, when the terminal sends only the RRC connection resume request message to the network device, the downlink information received by the terminal from the network device includes the feedback information of the RRC connection resume request message. The feedback information of the RRC connection resume request message indicates whether the RRC connection resume request message is successfully transmitted, and the feedback information is an ACK or a NACK. If the feedback information is the ACK, it indicates that the RRC connection resume request message is successfully sent, and the terminal may continue to send new uplink data on the configured grant. If the feedback information is the NACK, it indicates that the RRC connection resume request message fails to be sent, and the terminal may continue to retransmit the RRC connection resume request message on the configured grant. In this case, the downlink information received by the terminal from the network device may further include the contention resolution information, and the contention resolution information may be the contention resolution information in S1105 in the embodiment shown in FIG. 10, or may be the contention resolution information in S1105 in the embodiment shown in FIG. 11. If the contention resolution information is contention resolution success, it indicates that the RRC connection resume request message is successfully sent, and the terminal may continue to send the new uplink data on a pre-configured grant. If the contention resolution information is a contention resolution failure, it indicates that the RRC connection resume request message fails to be sent, and the terminal may continue to retransmit the RRC connection resume request message on the pre-configured grant.

If the downlink information received by the terminal from the network device includes the feedback information of the RRC connection resume request message, the terminal restarts the T319 timer, and performs data transmission during running of the T319 timer. This can effectively prolong the time for the terminal to wait for the RRC response message of the RRC connection resume request, and flexibly support sending of data for a plurality of times.

When the terminal sends the RRC connection resume request message and the uplink data to the network device, the downlink information received by the terminal from the network device includes the feedback information of the RRC connection resume request message and uplink data. The feedback information of the RRC connection resume request message and uplink data indicates whether the RRC connection resume request message and the uplink data are successfully transmitted, and the feedback information is an ACK or a NACK. If the feedback information is the ACK, it indicates that the RRC connection resume request message and the uplink data are successfully sent, and the terminal may continue to send new uplink data on the configured grant. If the feedback information is the NACK, it indicates that the RRC connection resume request message and/or the uplink data fail/fails to be sent, and the terminal may continue to retransmit the RRC connection resume request message and/or a part or all of the original uplink data on the configured grant. Similarly, in this case, the downlink information received by the terminal from the network device may further include the contention resolution information, and the contention resolution information may alternatively be the contention resolution information in S1005 in the embodiment shown in FIG. 10, or may be the contention resolution information in S1005 in the embodiment shown in FIG. 11. If the contention resolution information is contention resolution success, it indicates that the RRC connection resume request message and the uplink data successfully sent, and the terminal may continue to send the new uplink data on a pre-configured grant. If the contention resolution information is a contention resolution failure, it indicates that the RRC connection resume request message and/or the uplink data fail/fails to be sent, and the terminal may continue to retransmit the RRC connection resume request message and/or a part of the original uplink data on the pre-configured grant.

If the downlink information received by the terminal from the network device includes the feedback information of the RRC connection resume request message and uplink data, the terminal restarts the T319 timer, and performs data transmission during running of the T319 timer. This can effectively prolong the time for the terminal to wait for the RRC response message of the RRC connection resume request, and flexibly support sending of data for a plurality of times.

For the foregoing two cases, in addition to the feedback information and/or the contention resolution information, the downlink information received by the terminal may further include the uplink grant information, and an uplink resource indicated by the uplink grant information may be used for retransmission of the original uplink data, or may be used for initial transmission of new uplink data, to implement data transmission for a plurality of times. Generally, if the original uplink data needs to be retransmitted and the new uplink data needs to be initially transmitted, first, the new uplink data may be initially transmitted by using the uplink resource indicated by the uplink grant information, that is, a transmission priority of the initial data transmission is higher than a transmission priority of the data retransmission. For example, the downlink information received by the terminal may further include the downlink resource allocation information, and a downlink resource indicated by the downlink resource allocation information may be used for retransmission of original downlink data, or may be used for initial transmission of new downlink data, to implement early transmission of downlink data. It should be noted that, in this embodiment of this application, the uplink grant information and the downlink resource allocation information may exist independently, that is, the downlink information received by the terminal may include the uplink grant information or the downlink resource allocation information. The uplink grant information and the downlink resource allocation information may coexist, that is, the downlink information received by the terminal may include both the uplink grant information and the downlink resource allocation information. If the downlink information received by the terminal from the network device includes the uplink grant information and/or the downlink resource allocation information, the terminal restarts the T319 timer, and performs data transmission during running of the T319 timer. This can effectively prolong the time for the terminal to wait for the RRC response message of the RRC connection resume request, and flexibly support sending of data for a plurality of times. Preferably, if the downlink information received by the terminal from the network device includes uplink grant information used for initial transmission and/or downlink resource allocation information used for initial downlink transmission, the terminal restarts the T319 timer.

In addition, the terminal restarts the T319 timer based on the downlink information received from the network device. For example, the downlink information received by the terminal may include one piece of indication information, the indication information may be carried in physical layer control signaling, a MAC layer message, or an RRC layer message, and the indication information is used to indicate the terminal to restart the T319 timer. Correspondingly, after receiving the information including the indication information, the terminal may restart the T319 timer, so that data transmission is performed during running of the T319 timer. This can effectively prolong the time for the terminal to wait for the RRC response message of the RRC connection resume request, and flexibly support sending of data for a plurality of times.

In conclusion, when the terminal restarts the T319 timer based on the downlink information received from the network device during running of the T319 timer, and if the downlink information received by the terminal includes any one or more of the feedback information, the uplink grant information, the downlink resource allocation information, and the indication information of the new field, the terminal restarts the T319 timer, so that data transmission is performed during running of the T319 timer. This can effectively prolong the time for the terminal to wait for the RRC response of the RRC connection resume request message, and flexibly support sending of data for a plurality of times. For example, the downlink information received by the terminal further includes the timing adjustment command and/or the power control command. When the timing adjustment command is received, the timing adjustment command is used to perform uplink transmission timing adjustment. When the power control command is received, the power control command is used to perform power control.

After the terminal restarts the T319 timer based on the received downlink information, if the current T319 timer is started for the first time, the terminal may further send one piece of indication information to the network device, where the indication information is used to indicate the T319 timer restarted by the network device, so that information about the restarted T319 timer is synchronized to the network device. In addition, after the T319 timer is restarted, the T319 timer is not always in a running state, but is stopped when the terminal receives an RRC connection resume message, an RRC connection setup message, or an RRC connection release message from the network device.

S2001 to S2004 are performed. To be specific, when responding to the RRC connection resume requirement, the terminal starts the T319 timer, and sends the RRC connection resume request message to the network device. In this way, during running of the T319 timer, the terminal may restart the T319 timer based on the downlink information received from the network device, and perform data transmission during running of the T319 timer. This can effectively prolong the time for the terminal to wait for the RRC response of the RRC connection resume request message, and flexibly support sending of data for a plurality of times. The foregoing entire process may be understood as that the terminal performs the prolonging operation for the first time. After completing the prolonging operation for the first time, the terminal may further control, based on the downlink information received from the network device, to restart the T319 timer during restart and running of the T319 timer, to prolong the time for the terminal to wait for the RRC response of the RRC connection resume request message again. This process may be understood as that the terminal performs the prolonging operation for the second time. It may be understood that, a method used by the terminal to perform the prolonging operation for the third time or the $N^{th}$ (where N is greater than 3) time is similar to the method used by the terminal to perform the prolonging operation for the first time. This embodiment of this application is described by using an example in which after the prolonging operation is performed for the first time, during restart and running of the T319 timer, the T319 timer may be controlled to be restarted again based on the downlink information received from the network device. For example, after the T319 timer is restarted based on the downlink information received from the network device in S2004, S2005 to S2007 may be further performed.

S2005: The terminal sends the uplink data to the network device during running of the T319 timer.

When sending the uplink data to the network device, the terminal may send the uplink data to the network device by using the uplink resource indicated by the configured grant information. For example, the configured grant information may be obtained from a broadcast message of the network device, or may be obtained from a dedicated message (for example, an RRC message) sent by the network device to the terminal.

It can be learned that, when the prolonging operation is subsequently performed for the $M^{th}$ (where M is greater than or equal to 1) time, the terminal may directly send the uplink data without sending the RRC connection resume request message to the network device, and restart the T319 timer when the restart condition is met, to prolong the time for the terminal to wait for the RRC response message of the RRC connection resume request.

S2006: The network device sends the downlink information to the terminal based on the uplink data.

For example, the downlink information may include the feedback information of the uplink data, the timing adjustment command, the power control command, the contention resolution information, the uplink grant information, the downlink resource allocation information, and the indication information of the new field. Certainly, the downlink information may also include other information. Herein, this embodiment of this application is described by using only an example in which the downlink information includes at least one of the feedback information of the uplink data, the timing adjustment command, the power control command, the contention resolution information, the uplink grant information, the downlink resource allocation information, and the indication information of the new field. However, this does not mean that this embodiment of this application is limited thereto.

After receiving the uplink data sent by the terminal, the network device may generate corresponding downlink information based on the received uplink data, and sends the generated downlink information to the terminal. For example, when sending the generated information to the terminal, the network device may include the generated information in downlink control information of a PDCCH, a MAC message, or an RRC message, and send the downlink control information, the MAC message, or the RRC message to the terminal.

S2007: During running of the T319 timer, the terminal restarts the T319 timer again based on the downlink information received from the network device.

When the terminal restarts the T319 timer for the second time based on the downlink information received from the network device, if the downlink information received by the terminal includes any one or more of the feedback information, the uplink grant information, the downlink resource allocation information, and the indication information of the new field, the terminal restarts the T319 timer, that is, performs the prolonging operation for the second time, so that data transmission is performed during running of the T319 timer. This can effectively prolong the time for the terminal to wait for the RRC response of the RRC connection resume request message, and flexibly support sending of data for a plurality of times. For details, refer to the related descriptions in S2004. Herein, details are not described again in this embodiment of this application. It may be understood that, after the T319 timer is restarted for the second time, the T319 timer is also not always in a running state, but is stopped when the terminal receives an RRC connection resume message, an RRC connection setup message, or an RRC connection release message from the network device.

In this possible implementation, when the T319 timer is restarted, an example in which the terminal may restart the T319 timer based on the downlink information received from the network device during running of the T319 timer is used for description. Certainly, during running of the T319 timer, the T319 timer may alternatively be restarted based on the data transmission with the network device. For example, during running of the T319 timer, if the terminal sends uplink data, for example, data of a dedicated traffic channel (dedicated traffic channel, DTCH), the T319 timer is restarted. Alternatively, if downlink data, for example, data of the DTCH, is received, the T319 timer is restarted.

In the embodiment shown in FIG. 20, the technical solution is described in detail. In this solution, in the first possible implementation, when the first timer is the T319 timer that is currently configured by the network, the terminal first starts the T319 timer when responding to the RRC connection resume requirement, and sends the RRC connection resume request message to the network device; and during running of the T319 timer, the terminal may restart the T319 timer based on the downlink information received from the network device. The following describes a technical solution. In this solution, in the foregoing second possible implementation, when the first timer may be a new timer T1 that is additionally set at an RRC layer and that is other than the T319 timer, the terminal first starts the new timer T1 when responding to the RRC connection resume requirement, and sends the RRC connection resume request message to the network device; and during running of the new timer T1, the terminal may restart the new timer T1 based on the downlink information received from the network device or based on the data transmission with the network device.

In the second possible implementation, different from the embodiment shown in FIG. 20, the first timer in this possible implementation is no longer a T319 timer, but a new timer T1 that is other than the T319 timer and is additionally set at an RRC layer. To be specific, the terminal starts the new timer T1 when responding to the RRC connection resume requirement, and restarts the new timer T1 based on the downlink information received from the network device or based on the data transmission with the network device during running of the new timer T1, to prolong the time for the terminal to wait for the RRC response message of the RRC connection resume request, so as to flexibly support sending of data for a plurality of times. In this possible implementation, the T319 timer may not be started.

Before starting the new timer T1, the terminal first configures duration of the new timer T1, so that the new timer T1 can run based on the configured duration. A method for configuring the duration of the new timer T1 is similar to the method for configuring the duration of the T319 timer in the embodiment shown in FIG. 20. Herein, details are not described again in this embodiment of this application. How to send the RRC connection resume request message to the network device after the new timer T1 is started and how to restart the new timer T1 based on the downlink information received from the network device or based on the data transmission with the network device during running of the new timer T1 are similar to the method in the embodiment shown in FIG. 20, where the method is used to send the RRC connection resume request message to the network device after the T319 timer is started and to restart the T319 timer based on the downlink information received from the network device or based on the data transmission with the network device during running of the T319 timer. For details, refer to the foregoing related descriptions. Herein, for how to send the RRC connection resume request message to the network device after the new timer T1 is started, and how to restart the new timer T1 based on the downlink information received from the network device or based on the data transmission with the network device during running of the new timer T1, details are not described in this embodiment of this application.

In this possible implementation, different from the embodiment shown in FIG. 20, the first timer in this possible implementation is not the T319 timer, but the new timer T1 that is other than the T319 timer and is additionally set at the RRC layer. To reduce power consumption of the terminal caused by running of the T319 timer, in this possible implementation, the T319 timer may not be started. After the new timer T1 is restarted, the new timer T1 is not always in a running state, but is stopped when the terminal receives an RRC connection resume message, an RRC connection setup message, or an RRC connection release message from the network device.

In the foregoing third possible implementation, when the first timer is a new timer T2 that is set at a MAC layer, the terminal first starts the new timer T2 when responding to the RRC connection resume requirement, and sends the RRC connection resume request message to the network device; and during running of the new timer T2, the terminal may restart the new timer T2 based on the downlink information received from the network device or based on the data transmission with the network device.

In the third possible implementation, different from the embodiment shown in FIG. 20, the first timer in this possible implementation is no longer a T319 timer, but the new timer T2 that is set at the MAC layer. To be specific, the terminal starts the new timer T2 when responding to the RRC connection resume requirement, and restarts the new timer T2 based on the downlink information received from the network device or based on the data transmission with the network device during running of the new timer T2, to prolong the time for the terminal to wait for the RRC response message of the RRC connection resume request, so as to flexibly support sending of data for a plurality of times. In this possible implementation, the T319 timer may not be started.

Before starting the new timer T2, the terminal first configures duration of the new timer T2, so that the new timer T2 can run based on the configured duration. A method for configuring the duration of the new timer T2 is similar to the method for configuring the duration of the T319 timer in the embodiment shown in FIG. 20. Herein, details are not described again in this embodiment of this application. How to send the RRC connection resume request message to the network device after the new timer T2 is started and how to restart the new timer T2 based on the downlink information received from the network device or based on the data transmission with the network device during running of the new timer T2 are similar to the method in the embodiment shown in FIG. 20, where the method is used to send the RRC connection resume request message to the network device after the T319 timer is started and to restart the T319 timer based on the downlink information received from the network device or based on the data transmission with the network device during running of the T319 timer. For details, refer to the foregoing related descriptions. Herein, for how to send the RRC connection resume request message to the network device after the new timer T2 is started, and how to restart the new timer T2 based on the downlink information received from the network device or based on the data transmission with the network device during running of the new timer T2, details are not described in this embodiment of this application.

In this possible implementation, different from the embodiment shown in FIG. 20, the first timer in this possible implementation is not the T319 timer, but the new timer T2 that is set at the MAC layer. To reduce power consumption of the terminal caused by running of the T319 timer, in this possible implementation, the T319 timer may not be started either. After the new timer T2 is restarted, the new timer T2 is not always in a running state, but is stopped when the terminal receives an RRC connection resume message, an RRC connection setup message, or an RRC connection release message from the network device. After the new timer T2 is restarted, if the timer T2 expires, the MAC layer of the terminal notifies an RRC layer that the timer T2 expires, and the MAC layer of the terminal enters an idle state based on timeout information of the timer T2.

A technical solution in the first possible scenario is described in detail. When the restart condition is met, the restarted timer and the timer started in response to the RRC connection resume requirement are a same timer, and both are the first timer, to prolong the time for the terminal to wait for the RRC response message of the RRC connection resume request, so as to flexibly support sending of data for a plurality of times. The following describes a technical solution in another possible scenario in detail. A timer that is restarted when a restart condition is met is different from a timer started in response to an RRC connection resume requirement, but is a new timer that is additionally set. To be specific, a terminal starts a first timer when responding to the RRC connection resume requirement, and starts a second timer when a start condition is met during running of the first timer, to prolong time for the terminal to wait for an RRC response message of the RRC connection resume request. It may be understood that, in this possible scenario, after the second timer is started, the first timer may be further stopped. Certainly, the first timer may be stopped first and the second timer may be started subsequently.

For example, in this possible scenario, when the time for the terminal to wait for the RRC response message of the RRC connection resume request is prolonged by starting the second timer, at least two possible implementations may be included. In one possible implementation, the first timer may be a T319 timer that is currently configured by a network, and the second timer may be a new timer that is additionally set at an RRC layer other than the T319 timer. To distinguish from the new timer T1 in the foregoing embodiment, the new timer in this application may be denoted as a new timer T3. The new timer T3 may be the new timer T1 in the foregoing embodiment, or may be a new timer that is additionally set. To be specific, when responding to the RRC connection restoration requirement, the terminal first starts the T319 timer, and sends the RRC connection resume request message to the network device. In this way, during running of the T319 timer, the terminal may start the new timer T3 based on the downlink information received from the network device or based on the data transmission with the network device. In the other possible implementation, the first timer may be a T319 timer that is currently configured by a network, and the second timer may be a new timer that is additionally set at a MAC layer. To distinguish from the new timer T2 in the foregoing embodiment, the new timer in this application may be denoted as a new timer T4. The new timer T4 may be the new timer T2 in the foregoing embodiment, or may be a new timer that is additionally set. To be specific, when responding to the RRC connection restoration requirement, the terminal first starts the T319 timer, and sends the RRC connection resume request message to the network device. In this way, during running of the T319 timer, the terminal may start the new timer T4 based on the downlink information received from the network device or based on the data transmission with the network device. It may be understood that, in this possible scenario, after the second timer is started, the first timer may be further stopped. For the two possible implementations, the following describes in detail how to control the second timer to restart in this possible scenario, to prolong the time for the terminal to wait for the RRC response message of the RRC connection resume request, so as to flexibly support sending of data for a plurality of times.

Figure 21:
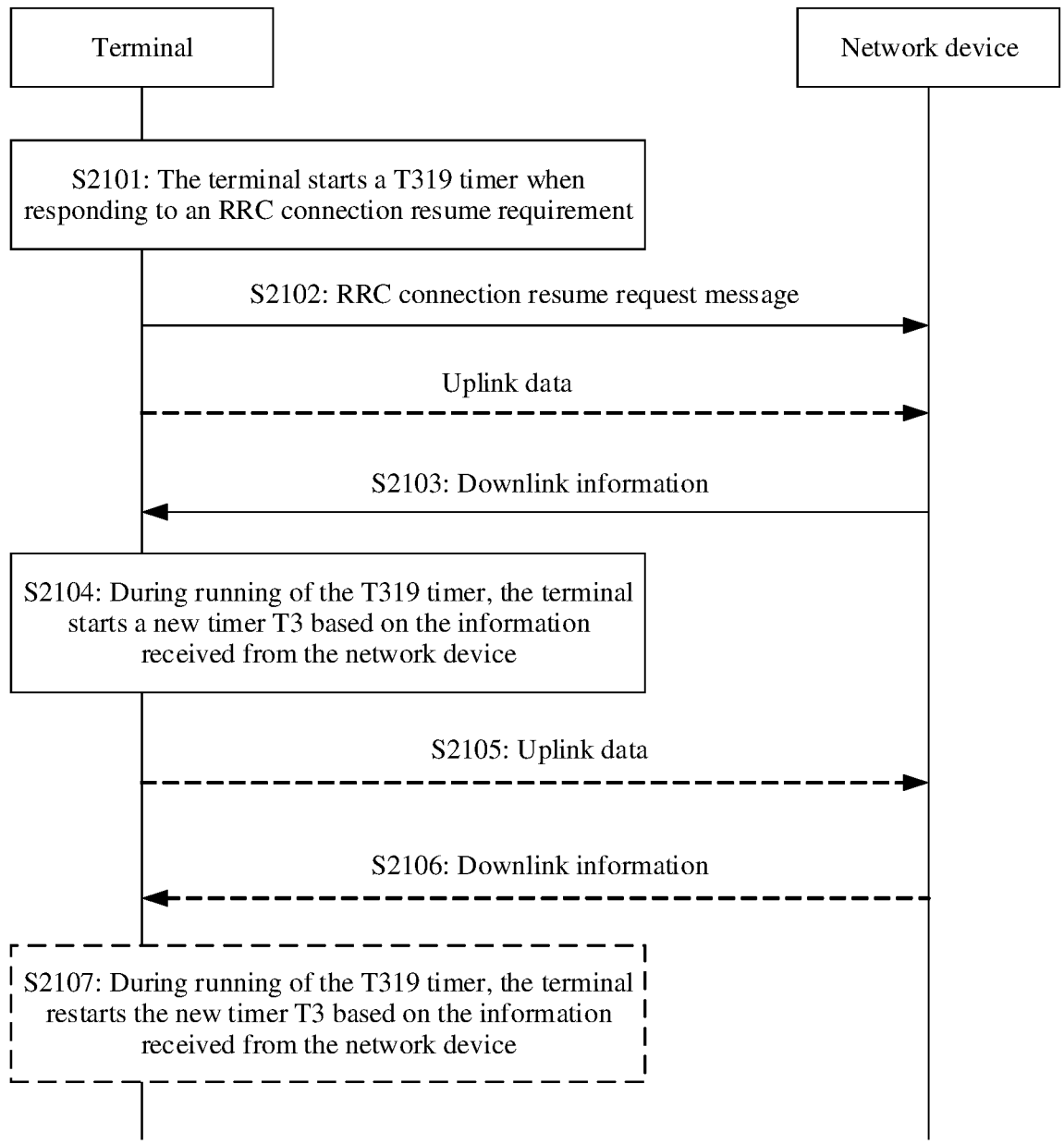
FIG. 21 is a schematic flowchart of another configuration method according to an embodiment of this application.

In the foregoing first possible implementation, the first timer may be the T319 timer that is currently configured by the network, and the second timer may be the new timer T3 that is additionally set at the RRC layer other than the T319 timer. To be specific, when responding to the RRC connection restoration requirement, the terminal first starts the T319 timer, and sends the RRC connection resume request message to the network device. In this way, during running of the T319 timer, the terminal may start the new timer T3 based on the downlink information received from the network device or based on the data transmission with the network device. In this possible implementation, an example in which the terminal may start or restart, during running of the T319 timer, the new timer T3 based on the downlink information received from the network device is used for description. Certainly, during running of the T319 timer, the new timer T3 may alternatively be started or restarted based on the data transmission with the network device. For example, refer to FIG. 21. FIG. 21 is a schematic flowchart of another configuration method according to an embodiment of this application. The configuration method may include the following steps.

S2101: A terminal starts a T319 timer when responding to an RRC connection resume requirement.

Before starting the T319 timer, the terminal first configures duration of the T319 timer, so that the T319 timer can run based on the configured duration. In S2101, a method for configuring the duration of the T319 timer is similar to the method for configuring the duration of the T319 timer in S2001 in the foregoing embodiment. For details, refer to the related descriptions of configuring the duration of the T319 timer. Herein, details are not described again in this embodiment of this application.

After the T319 timer is started, an RRC connection resume request message may be sent to a network device, that is, S2102 is performed.

S2102: The terminal sends the RRC connection resume request message to the network device.

For example, the RRC connection resume request message may include at least one of an I-RNTI, identity authentication information of the terminal, and a cause value for initiating the RRC connection resume request by the UE. The I-RNTI is used to represent a unique identifier of the terminal in an RNA range. The identity verification information of the terminal is identity verification information generated based on a C-RNTI and an RRC integrity key that are stored in the terminal.

In S2102, a method for sending the RRC connection resume request message by the terminal to the network device is similar to the method for sending the RRC connection resume request message by the terminal to the network device in S2002. For details, refer to the related descriptions of sending the RRC connection resume request message by the terminal to the network device in S2002. Herein, the method for sending the RRC connection resume request message by the terminal to the network device is not described again in this embodiment of this application.

In S2102, in addition to sending the RRC connection resume request message to the network device, the terminal may also send, to the network device, at least one of uplink data, auxiliary information, and indication information indicating that the terminal expects to remain in an inactive state and continue to send data. A manner of sending the information is similar to a manner of sending, to the network device, the at least one of the uplink data, the auxiliary information, and the indication information indicating that the terminal expects to remain in the inactive state and continue to send data in S2002. Refer to the related descriptions of sending, to the network device, the at least one of the uplink data, the auxiliary information, and the indication information indicating that the terminal expects to remain in the inactive state and continue to send data in S2002. Herein, details are not described again in this embodiment of this application. Different from S2002, in this embodiment of this application, in addition to the T319 timer, there is a new timer T3 that is additionally set at an RRC layer. Therefore, the terminal may further send one piece of start indication information to the network device, where the start indication information is used to indicate to start the new timer T3 subsequently if a start condition is met during running of the T319 timer, to synchronize the new timer T3 started by the terminal with a new timer T3 started by the network device.

After the terminal sends the RRC connection resume request message to the network device, correspondingly, the network device may send corresponding downlink information to the terminal based on the RRC connection resume request message, that is, perform S2103.

S2103: The network device sends the downlink information to the terminal based on the RRC connection resume request message.

In S2103, a method for sending the downlink information by the network device to the terminal based on the RRC connection resume request message is similar to the method for sending the downlink information by the network device to the terminal based on the RRC connection resume request message in S2003 in the embodiment shown in FIG. 20. Refer to the related descriptions in S2003. Herein, details are not described again in this embodiment of this application.

S2104: During running of the T319 timer, the terminal starts the new timer T3 based on the downlink information received from the network device.

Before starting the new timer T3, the terminal first configures duration of the started new timer T3, so that the started new timer T3 can run based on the configured duration. For example, when configuring the duration of the new timer T3, the terminal may receive a broadcast message or an RRC message from the network device, and configure the duration of the new timer T3 based on information that is included in the broadcast message or the RRC message and that indicates the duration of the new timer T3. For a manner of obtaining the information indicating the duration of the new timer T3, the information indicating the duration of the new timer T3 and the information indicating the duration of the T319 timer may be obtained through a same broadcast message or RRC message, or may be obtained through different broadcast messages or RRC messages. This may be specifically set based on an actual requirement. For time for obtaining the information indicating the duration of the new timer T3, the information indicating the duration of the new timer T3 and the information indicating the duration of the T319 timer may be obtained at the same time, or may be obtained at different time. For example, the information indicating the duration of the new timer T3 is obtained when it is determined to start the new timer T3. This may be specifically set based on an actual requirement.

The duration of the new timer T3 may be first duration of the T319 timer that is currently configured by a network. For example, the first duration may be a value in {100 ms, 200 ms, 300 ms, 400 ms, 600 ms, 1000 ms, 1500 ms, 2000 ms}, or may be greater than second duration of the T319 timer that is currently configured by the network. The second duration may be configured by using the broadcast message or the RRC message. For example, the second duration is a value in {100 ms, 200 ms, 300 ms, 400 ms, 600 ms, 1000 ms, 1500 ms, 2000 ms, 2500 ms}. For example, the second duration may be 2500 ms. The new timer T3 is started when a start condition is met. Therefore, for both the two types of different duration, time for the terminal to wait for an RRC response message of an RRC connection resume request can be effectively prolonged. It may be understood that, when the configured duration of the new timer T3 becomes longer, time for performing data transmission between the terminal and the network device becomes longer, so that the terminal and the network device perform data transmission for a plurality of times.

After the duration of the new timer T3 is configured, S2104 may be performed: The terminal starts the new timer T3 based on the downlink information received from the network device during running of the T319 timer. A method for starting the new timer T3 by the terminal based on the downlink information received from the network device during running of the T319 timer in S2104 is similar to the method for restarting the T319 timer by the terminal based on the downlink information received from the network device during running of the T319 timer in S2004. Refer to the related descriptions in S2004. Herein, how the terminal starts the new timer T3 based on the downlink information received from the network device during running of the T319 timer is not described in detail in this embodiment of this application.

In conclusion, when the terminal starts the new timer T3 based on the downlink information received from the network device during running of the T319 timer, and if the downlink information received by the terminal includes any one or more of feedback information of the uplink data, uplink grant information, downlink resource allocation information, and indication information of a new field, the terminal starts the new timer T3, so that data transmission is performed during running of the new timer T3. This can effectively prolong the time for the terminal to wait for the RRC response message of the RRC connection resume request, and flexibly support sending of data for a plurality of times. If the T319 timer is still in a running state, the T319 timer may be stopped. For example, the new timer T3 is started first, and the T319 timer is stopped after the new timer T3 is started; or the T319 timer may be stopped when the new timer T3 is started. For example, the downlink information received by the terminal further includes a timing adjustment command and/or a power control command. When the timing adjustment command is received, the timing adjustment command is used to perform uplink transmission timing adjustment. When the power control command is received, the power control command is used to perform power control.

After the terminal starts the new timer T3 based on the received downlink information, because the new timer T3 is started for the first time, the terminal may further send one piece of indication information to the network device, where the indication information is used to indicate the new timer T3 started by the network device, so that information about the started new timer T3 is synchronized to the network device. In addition, after the new timer T3 is started, the new timer T3 is not always in a running state, but is stopped when the terminal receives an RRC connection resume message, an RRC connection setup message, or an RRC connection release message from the network device.

S2101 to S2104 are performed. To be specific, when responding to the RRC connection resume requirement, the terminal starts the T319 timer, and sends the RRC connection resume request message to the network device. In this way, during running of the T319 timer, the terminal may start the new timer T3 based on the downlink information received from the network device, and perform data transmission during running of the new timer T3. This can effectively prolong the time for the terminal to wait for the RRC response of the RRC connection resume request message, and flexibly support sending of data for a plurality of times. The foregoing entire process may be understood as that the terminal performs a prolonging operation for the first time. After completing the prolonging operation for the first time, the terminal may further control, based on the downlink information received from the network device, to restart the new timer T3 during start and running of the new timer T3, to prolong the time for the terminal to wait for the RRC response of the RRC connection resume request message again. This process may be understood as that the terminal performs the prolonging operation for the second time. It may be understood that, a method used by the terminal to perform the prolonging operation for the third time or the $N^{th}$ (where N is greater than 3) time is similar to the method used by the terminal to perform the prolonging operation for the first time. This embodiment of this application is described by using an example in which after the prolonging operation is performed for the first time, during start and running of the new timer T3, the new timer T3 may be controlled to be restarted again based on the downlink information received from the network device. For example, after the new timer T3 is started based on the downlink information received from the network device in S2104, S2105 to S2107 may be further performed.

S2105: The terminal sends the uplink data to the network device during running of the new timer T3.

S2106: The network device sends the downlink information to the terminal based on the uplink data.

S2107: During running of the new timer T3, the terminal restarts the new timer T3 based on the downlink information received from the network device.

In S2105 to S2107, a method in which the terminal sends the uplink data to the network device during running of the new timer T3, the network device sends the downlink information to the terminal based on the uplink data, and correspondingly, the terminal restarts the new timer T3 based on the downlink information received from the network device during running of the new timer T3 is similar to the method in S2005 to S2007 in the embodiment shown in FIG. 20: The terminal sends the uplink data to the network device during running of the T319 timer, the network device sends the downlink information to the terminal based on the uplink data, and correspondingly, the terminal restarts the T319 timer based on the downlink information received from the network device during running of the T319 timer. Refer to the related descriptions in S2005 to S2007. Herein, details are not described again in this embodiment of this application.

When the prolonging operation is performed for the first time by performing S2001 to S2004, the time for the terminal to wait for the RRC response of the RRC connection resume request message is prolonged by restarting the T319 timer. Therefore, when the prolonging operation is performed for the second time in S2007, the T319 timer is restarted for the second time to prolong the time for the terminal to wait for the RRC response of the RRC connection resume request message. However, in this embodiment of this application, different from S2007, when the prolonging operation is performed for the first time by performing S2101 to S2104, the time for the terminal to wait for the RRC response of the RRC connection resume request message is prolonged by starting the new timer T3 for the first time. Therefore, when the prolonging operation is performed for the second time in S2107, the new timer T3 is restarted for the first time to prolong the time for the terminal to wait for the RRC response of the RRC connection resume request message.

When the terminal restarts the new timer T3 for the first time based on the downlink information received from the network device, if the downlink information received by the terminal includes any one or more of the feedback information, the uplink grant information, the downlink resource allocation information, and the indication information of the new field, the terminal restarts the new timer T3, that is, performs the prolonging operation for the second time, so that data transmission is performed during running of the new timer T3. This can effectively prolong the time for the terminal to wait for the RRC response of the RRC connection resume request message, and flexibly support sending of data for a plurality of times. For details, refer to the related descriptions in S2004. Herein, details are not described again in this embodiment of this application. It may be understood that, after the new timer T3 is restarted for the first time, the new timer T3 is also not always in a running state, but is stopped when the terminal receives an RRC connection resume message, an RRC connection setup message, or an RRC connection release message from the network device.

It may be understood that, in this possible implementation, when the new timer T3 is started, an example in which the terminal may start the new timer T3 based on the downlink information received from the network device during running of the T319 timer is used for description. Certainly, during running of the T319 timer, the new timer T3 may alternatively be started based on the data transmission with the network device. For example, during running of the T319 timer, if the terminal sends uplink data, the new timer T3 is started. Alternatively, if downlink data is received, the new timer T3 is started.

Figure 22:
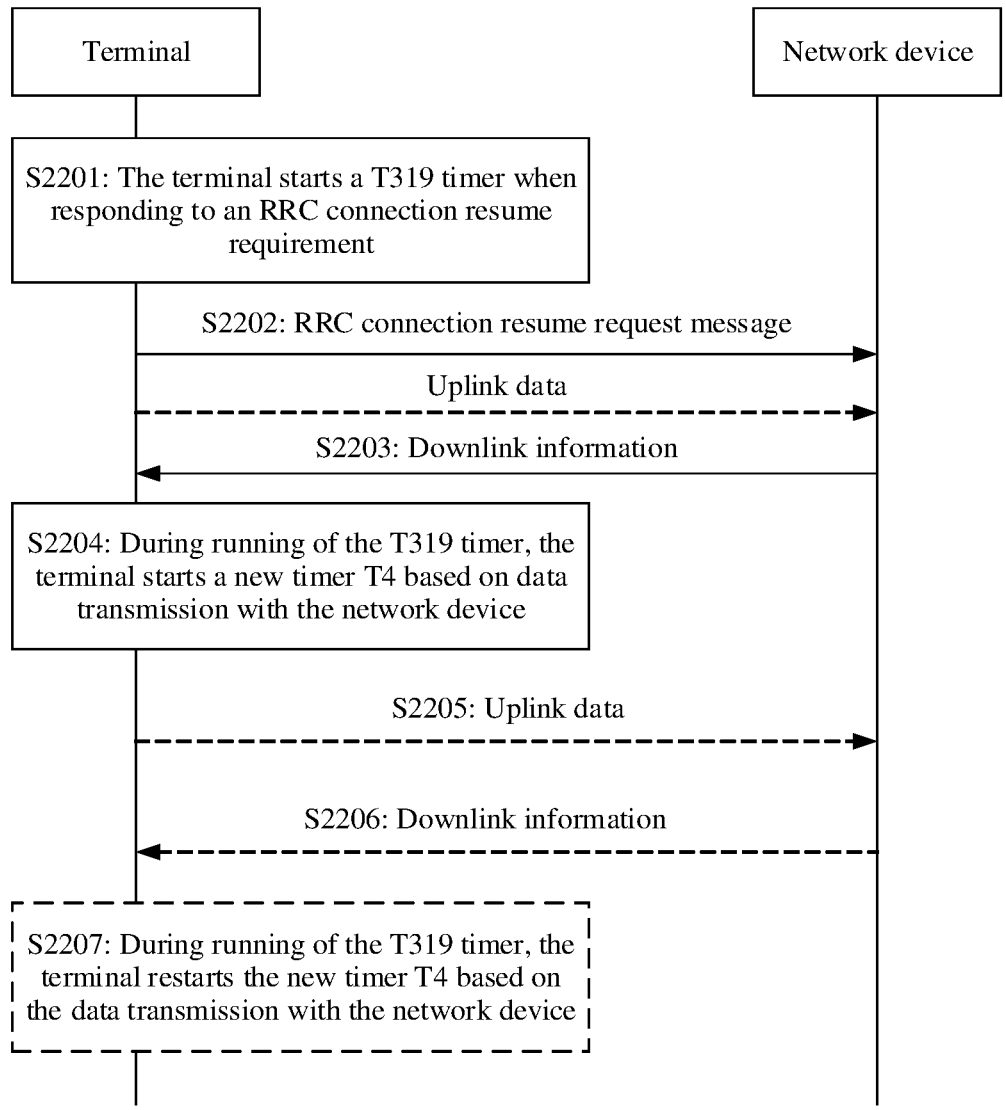
FIG. 22 is a schematic flowchart of still another configuration method according to an embodiment of this application.

In the foregoing second possible implementation, the first timer may be the T319 timer that is currently configured by the network, and the second timer may be the new timer T4 that is set at the MAC layer. To be specific, when responding to the RRC connection restoration requirement, the terminal first starts the T319 timer, and sends the RRC connection resume request message to the network device. In this way, during running of the T319 timer, the terminal may start the new timer T4 based on the downlink information received from the network device or based on the data transmission with the network device. It should be noted that, in this possible implementation, an example in which the terminal may start or restart, during running of the T319 timer, the new timer T4 based on the data transmission with the network device is used for description. Certainly, during running of the T319 timer, the new timer T4 may alternatively be started or restarted based on the downlink information received from the network device. For example, refer to FIG. 22. FIG. 22 is a schematic flowchart of still another configuration method according to an embodiment of this application. The configuration method may include the following steps.

S2201: A terminal starts a T319 timer when responding to an RRC connection resume requirement.

Before starting the T319 timer, the terminal first configures duration of the T319 timer, so that the T319 timer can run based on the configured duration. In S2201, a method for configuring the duration of the T319 timer is similar to the method for configuring the duration of the T319 timer in S2001 in the foregoing embodiment. For details, refer to the related descriptions of configuring the duration of the T319 timer. Herein, details are not described again in this embodiment of this application.

After the T319 timer is started, an RRC connection resume request message may be sent to a network device, that is, S2202 is performed.

S2202: The terminal sends the RRC connection resume request message to the network device.

For example, the RRC connection resume request message may include at least one of an I-RNTI, identity authentication information of the terminal, and a cause value for initiating the RRC connection resume request by the UE. The I-RNTI is used to represent a unique identifier of the terminal in an RNA range. The identity verification information of the terminal is identity verification information generated based on a C-RNTI and an RRC integrity key that are stored in the terminal.

In S2202, a method for sending the RRC connection resume request message by the terminal to the network device is similar to the method for sending the RRC connection resume request message by the terminal to the network device in S2002. For details, refer to the related descriptions of sending the RRC connection resume request message by the terminal to the network device in S2002. Herein, the method for sending the RRC connection resume request message by the terminal to the network device is not described again in this embodiment of this application.

In S2202, in addition to sending the RRC connection resume request message to the network device, the terminal may also send, to the network device, at least one of uplink data, auxiliary information, and indication information indicating that the terminal expects to remain in an inactive state and continue to send data. A manner of sending the information is similar to a manner of sending, to the network device, the at least one of the uplink data, the auxiliary information, and the indication information indicating that the terminal expects to remain in the inactive state and continue to send data in S2002. Refer to the related descriptions of sending, to the network device, the at least one of the uplink data, the auxiliary information, and the indication information indicating that the terminal expects to remain in the inactive state and continue to send data in S2002. Herein, details are not described again in this embodiment of this application. Different from S2002, in this embodiment of this application, in addition to the T319 timer, there is a new timer T4 that is set at a MAC layer. Therefore, the terminal may further send one piece of start indication information to the network device, where the start indication information is used to indicate to start the new timer T3 subsequently if a start condition is met during running of the T319 timer, to synchronize the new timer T4 started by the terminal with a new timer T4 started by the network device.

After the terminal sends the RRC connection resume request message to the network device, correspondingly, the network device may send corresponding downlink information to the terminal based on the RRC connection resume request message, that is, perform S2203.

S2203: The network device sends the downlink information to the terminal based on the RRC connection resume request message.

In S2203, a method for sending the downlink information by the network device to the terminal based on the RRC connection resume request message is similar to the method for sending the downlink information by the network device to the terminal based on the RRC connection resume request message in S2103. Refer to the related descriptions in S2103. Herein, details are not described again in this embodiment of this application. In addition, for content included in the downlink information, refer to the related descriptions in S2104. Herein, details are not described again in this embodiment of this application.

S2204: During running of the T319 timer, the terminal starts the new timer T4 based on data transmission with the network device.

Before starting the new timer T4, the terminal first configures duration of the started new timer T4, so that the started new timer T4 can run based on the configured duration. For example, when configuring the duration of the new timer T4, the terminal may receive a broadcast message or an RRC message from the network device, and configure the duration of the new timer T4 based on information that is included in the broadcast message or the RRC message and that indicates the duration of the new timer T4. It may be understood that, for a manner of obtaining the information indicating the duration of the new timer T4, the information indicating the duration of the new timer T4 and the information indicating the duration of the T319 timer may be obtained through a same broadcast message or RRC message, or may be obtained through different broadcast messages or RRC messages. This may be specifically set based on an actual requirement. For time for obtaining the information indicating the duration of the new timer T4, the information indicating the duration of the new timer T4 and the information indicating the duration of the T319 timer may be obtained at the same time, or may be obtained at different time. For example, the information indicating the duration of the new timer T4 is obtained when it is determined to start the new timer T4. This may be specifically set based on an actual requirement.

The duration of the new timer T4 may be first duration of the T319 timer that is currently configured by a network. For example, the first duration may be a value in {100 ms, 200 ms, 300 ms, 400 ms, 600 ms, 1000 ms, 1500 ms, 2000 ms}, or may be greater than second duration of the T319 timer that is currently configured by the network. The second duration may be configured by using the broadcast message or the RRC message. For example, the second duration is a value in {100 ms, 200 ms, 300 ms, 400 ms, 600 ms, 1000 ms, 1500 ms, 2000 ms, 2500 ms}. For example, the second duration may be 2500 ms. The new timer T4 is started when a start condition is met. Therefore, for both the two types of different duration, time for the terminal to wait for an RRC response message of an RRC connection resume request can be effectively prolonged. It may be understood that, when the configured duration of the new timer T4 becomes longer, time for performing data transmission between the terminal and the network device becomes longer, so that the terminal and the network device perform data transmission for a plurality of times.

Different from the first possible implementation, in this embodiment of this application, during running of the T319 timer, the new timer T4 is started based on the data transmission with the network device. Therefore, the new timer T4 is not started even if the downlink information received by the terminal includes any one or more of feedback information, uplink grant information, downlink resource allocation information, and indication information of a new field, but is started based on the data transmission with the network device. For example, during running of the timer T319, if the terminal sends uplink data, for example, data of a DTCH, the new timer T4 is started; and if downlink data, for example, data of the DTCH, is received, the new timer T4 is started, so that data transmission is performed during running of the new timer T4. This can effectively prolong the time for the terminal to wait for the RRC response message of the RRC connection resume request, and flexibly support sending of data for a plurality of times. After the timer T4 is started, if the T319 timer is still in a running state, the T319 timer may be stopped. After the terminal starts the new timer T4 based on the data transmission with the network device, because the new timer T4 is started for the first time, the terminal may further send one piece of indication information to the network device, where the indication information is used to indicate the new timer T4 started by the network device, so that information about the started new timer T4 is synchronized to the network device. In addition, after the new timer T4 is started, the new timer T4 is not always in a running state, but is stopped when the terminal receives an RRC connection resume message, an RRC connection setup message, or an RRC connection release message from the network device. After the new timer T4 is started, if the timer T4 expires, the MAC layer of the terminal notifies an RRC layer that the timer T4 expires, and the MAC layer of the terminal enters an idle state based on timeout information of the timer T4.

S2201 to S2204 are performed. To be specific, when responding to the RRC connection resume requirement, the terminal starts the T319 timer, and sends the RRC connection resume request message to the network device. In this way, during running of the T319 timer, the terminal may start the new timer T4 based on the data transmission with the network device, and perform data transmission during running of the new timer T4. This can effectively prolong the time for the terminal to wait for the RRC response of the RRC connection resume request message, and flexibly support sending of data for a plurality of times. The foregoing entire process may be understood as that the terminal performs a prolonging operation for the first time. After completing the prolonging operation for the first time, the terminal may further control, based on the data transmission with the network device, to restart the new timer T4 during running of the new timer T4, to prolong the time for the terminal to wait for the RRC response of the RRC connection resume request message again. This process may be understood as that the terminal performs the prolonging operation for the second time. A method used by the terminal to perform the prolonging operation for the third time or the $N^{th}$ (where N is greater than 3) time is similar to the method used by the terminal to perform the prolonging operation for the first time. This embodiment of this application is described by using an example in which after the prolonging operation is performed for the first time, during start and running of the new timer T4, the new timer T4 may be controlled to be restarted again based on the data transmission with the network device. For example, after the new timer T4 is started based on the data transmission with the network device in S2204, S2205 to S2207 may be further performed.

S2205: The terminal sends the uplink data to the network device during running of the new timer T4.

S2206: The network device sends the downlink information to the terminal based on the uplink data.

In S2205 and S2206, a method in which the terminal sends the uplink data to the network device during running of the new timer T4, and the network device sends the downlink information to the terminal based on the uplink data is similar to the method in S2005 and S2006 in the embodiment shown in FIG. 20: The terminal sends the uplink data to the network device during running of the T319 timer, and the network device sends the downlink information to the terminal based on the uplink data. Refer to the related descriptions in S2005 and S2006. Herein, details are not described again in this embodiment of this application.

S2207: During running of the new timer T4, the terminal restarts the new timer T4 based on the data transmission with the network device.

A method for restarting the new timer T4 by the terminal based on the data transmission with the network device during running of the new timer T4 in S2207 is similar to the method for starting the new timer T4 by the terminal based on the data transmission with the network device during running of the new timer T4 in S2204. Herein, details are not described again in this embodiment of this application.

In this embodiment of this application, when the prolonging operation is performed for the first time by performing S2201 to S2204, the time for the terminal to wait for the RRC response of the RRC connection resume request message is prolonged by starting the new timer T4 for the first time. Therefore, when the prolonging operation is performed for the second time in S2207, the new timer T4 is restarted for the first time to prolong the time for the terminal to wait for the RRC response of the RRC connection resume request message. It may be understood that, after the new timer T4 is restarted for the first time, the new timer T4 is also not always in a running state, but is stopped when the terminal receives an RRC connection resume message, an RRC connection setup message, or an RRC connection release message from the network device.

In this possible implementation, when the new timer T4 is started, the new timer T4 is started based on only the data transmission with the network device. For example, during running of the timer T319, if the terminal sends uplink data, the new timer T4 is started. Alternatively, if downlink data is received, the new timer T4 is started. Certainly, during running of the T319 timer, the terminal may also start the new timer T4 based on the downlink information received from the network device. For details, refer to the related descriptions of starting the new timer T3 based on the downlink information received from the network device in the first possible implementation. Herein, how the terminal starts the new timer T4 based on the downlink information received from the network device is not described in detail in this embodiment of this application.

In conclusion, it can be learned that when the technical solutions provided in embodiments of this application are described by using the foregoing two possible scenarios, to prolong the time for the terminal to wait for the RRC response message of the RRC connection resume request and flexibly support sending of data for a plurality of times, the terminal may first start the first timer in response to the radio resource control RRC connection resume requirement, and send the RRC connection resume request message to the network device by using the uplink resource indicated by the configured grant information. In addition, during running of the first timer, the terminal restarts the first timer or starts the second timer based on the downlink information received by the network device or based on the data transmission with the network device. This effectively prolongs time for the terminal to wait for RRC connection resume, to flexibly support sending of data for a plurality of times. In embodiments of this application, the RRC connection resume request message may be sent to the network device by using the uplink resource indicated by the configuration grant information, or the RRC connection resume request message may be sent to the network device by using an uplink resource in a random access process. For example, the uplink resource may be a PUSCH resource pre-configured for a message A (MsgA) in a two-step RACH, or may be an uplink resource indicated in a random access response received by the terminal in a four-step RACH. This may be specifically set based on an actual requirement. It may be understood that when the RRC connection resume request message is sent to the network device by using the uplink resource in the random access process, and a restart condition is met during running of the first timer, a technical solution of restarting the first timer is also applicable to the foregoing two possible scenarios. To be specific, in a possible scenario, the timer restarted when the restart condition is met is the same as the timer started when the RRC connection resume requirement is met, and both are the first timer. In another possible scenario, the terminal starts the first timer when responding to the RRC connection resume requirement, and starts the second timer when a start condition is met during running of the first timer, to prolong the time for the terminal to wait for the RRC response message of the RRC connection resume request. It may be understood that, in this possible scenario, when the second timer is started, the first timer may be further stopped.

Figure 23:
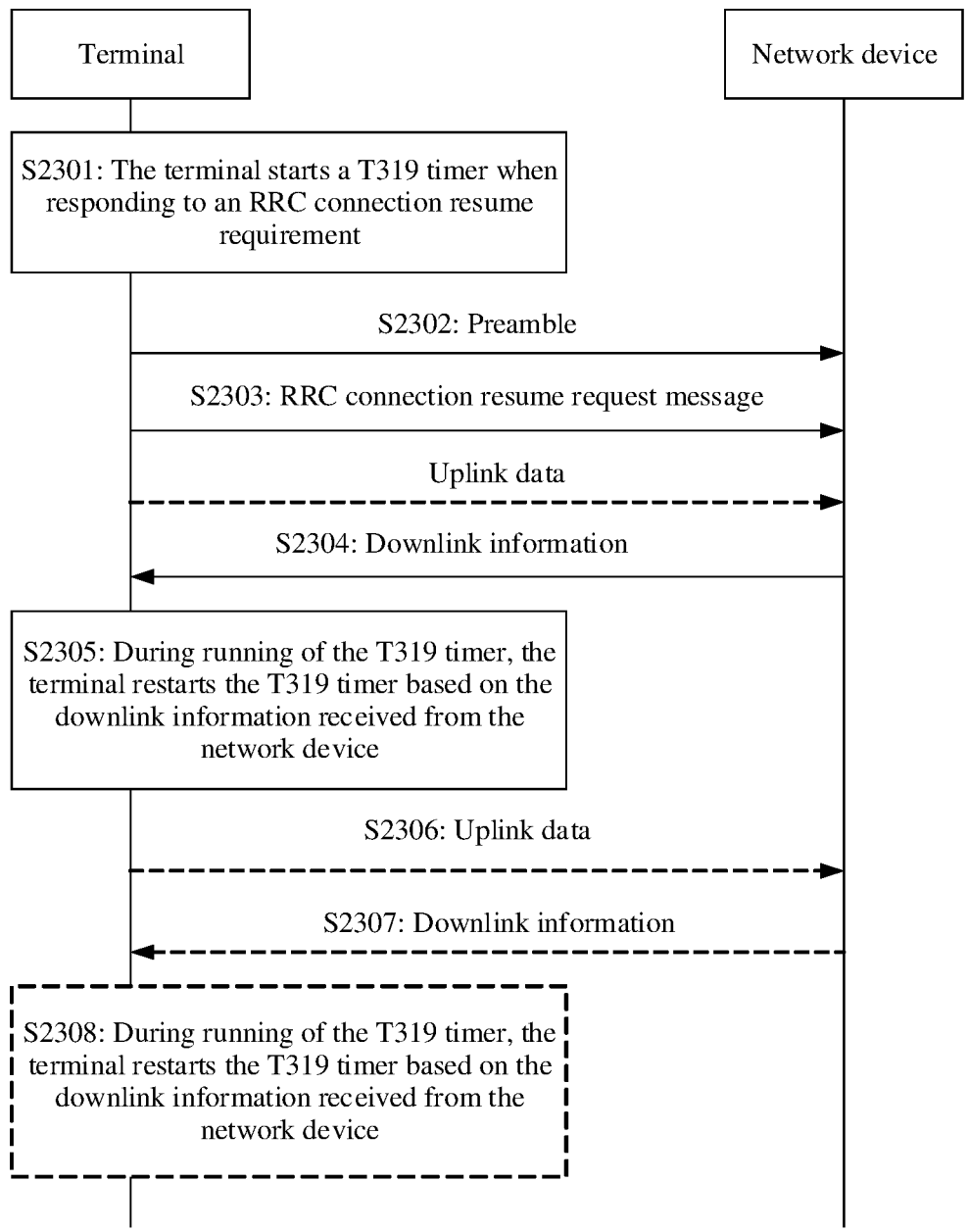
FIG. 23 is a schematic flowchart of yet another configuration method according to an embodiment of this application.

The following describes a first possible implementation in the first scenario. To be specific, the first timer is a T319 timer that is currently configured by a network, the terminal sends the RRC connection resume request to the network device by using the uplink resource in the message A (MsgA) in the two-step RACH, and during running of the T319 timer, the terminal may restart the T319 timer based on downlink information received from the network device or based on data transmission with the network device. In this possible implementation, an example in which the terminal may restart, during running of the T319 timer, the T319 timer based on the downlink information received from the network device is used for description. Certainly, during running of the T319 timer, the T319 timer may alternatively be restarted based on the data transmission with the network device. For example, refer to FIG. 23. FIG. 23 is a schematic flowchart of yet another configuration method according to an embodiment of this application. The configuration method may include the following steps.

S2301: A terminal starts a T319 timer when responding to an RRC connection resume requirement.

Before starting the T319 timer, the terminal needs to first configure duration of the T319 timer, so that the T319 timer can run based on the configured duration. In S2301, a configuration method of the T319 timer is similar to the configuration method of the T319 timer in S2001 in the foregoing embodiment. For details, refer to the related descriptions of configuring the duration of the T319 timer. Herein, details are not described again in this embodiment of this application.

S2302: The terminal sends a preamble to a network device.

For example, the terminal may send the preamble to the network device by using a message A (MsgA) of a two-step RACH, and a resource for sending the preamble may be a PRACH resource pre-configured by the network device. The PRACH resource may be configured by using a broadcast message or a dedicated message (for example, an RRC connection release message).

S2303: The terminal sends an RRC connection resume request message to the network device.

For example, the RRC connection resume request message may include at least one of an I-RNTI, identity authentication information of the terminal, and a cause value for initiating the RRC connection resume request by the UE. The I-RNTI is used to represent a unique identifier of the terminal in an RNA range. The identity verification information of the terminal is identity verification information generated based on a C-RNTI and an RRC integrity key that are stored in the terminal.

When the terminal sends the RRC connection resume request message to the network device, a difference from S2002 is that in this embodiment of this application, the terminal may send the RRC connection resume request message to the network device by using the message A (MsgA) of the two-step RACH, and the resource for sending the RRC connection resume request message may be the PUSCH resource pre-configured by the network device. The PUSCH resource may be configured by using the broadcast message or the dedicated message (for example, the RRC connection release message).

For example, in addition to sending the RRC connection resume request message to the network device, the terminal may also send, to the network device, at least one of uplink data, auxiliary information, and indication information indicating that the terminal expects to remain in an inactive state and continue to send data. A manner of sending the information is similar to a manner of sending, to the network device, the at least one of the uplink data, the auxiliary information, and the indication information indicating that the terminal expects to remain in the inactive state and continue to send data in S2002. Refer to the related descriptions of sending, to the network device, the at least one of the uplink data, the auxiliary information, and the indication information indicating that the terminal expects to remain in the inactive state and continue to send data in S2002. Herein, details are not described again in this embodiment of this application. In this embodiment of this application, an example in which the terminal further sends the uplink data to the network device in addition to sending the RRC connection resume request message to the network device is used to continue to describe the technical solution provided in this embodiment of this application. Correspondingly, after receiving the RRC connection resume request message and the uplink data that are sent by the terminal, the network device performs S2304.

S2304: The network device sends downlink information to the terminal based on the RRC connection resume request message.

It should be noted that, in S2304, a method for sending the downlink information by the network device to the terminal based on the RRC connection resume request message is similar to the method for sending the downlink information by the network device to the terminal based on the RRC connection resume request message in S2003 in the embodiment shown in FIG. 20. Refer to the related descriptions in S2003. Herein, details are not described again in this embodiment of this application.

S2305: During running of the T319 timer, the terminal restarts the T319 timer based on the downlink information received from the network device.

A method for restarting the T319 timer by the terminal based on the downlink information received from the network device during running of the T319 timer in S2305 is similar to the method for restarting the T319 timer by the terminal based on the downlink information received from the network device during running of the T319 timer in S2005 in the embodiment shown in FIG. 20. Refer to the related descriptions in S2005. Herein, how the terminal restarts the T319 timer based on the downlink information received from the network device during running of the T319 timer in S2305 is not described in detail in this embodiment of this application. In S2305, different from S2005, the downlink information does not include feedback information, but may include a TC-RNTI.

In conclusion, when the terminal restarts the T319 timer based on the downlink information received from the network device during running of the T319 timer, if the downlink information received by the terminal includes any one or more of uplink grant information, downlink resource allocation information, and indication information of a new field, the terminal restarts the T319 timer, so that data transmission is performed during running of the T319 timer. This can effectively prolong time for the terminal to wait for an RRC response message of the RRC connection resume request, and flexibly support sending of data for a plurality of times. For example, the downlink information received by the terminal further includes a timing adjustment command and/or a power control command.

S2301 to S2305 are performed. To be specific, when responding to the RRC connection resume requirement, the terminal starts the T319 timer, and sends the RRC connection resume request message to the network device. In this way, during running of the T319 timer, the terminal may restart the T319 timer based on the downlink information received from the network device, and perform data transmission during running of the T319 timer. This can effectively prolong the time for the terminal to wait for the RRC response of the RRC connection resume request message, and flexibly support sending of data for a plurality of times. The foregoing entire process may be understood as that the terminal performs the prolonging operation for the first time. After completing the prolonging operation for the first time, the terminal may further control, based on the downlink information received from the network device, to restart the T319 timer during restart and running of the T319 timer, to prolong the time for the terminal to wait for the RRC response of the RRC connection resume request message again. This process may be understood as that the terminal performs the prolonging operation for the second time. It may be understood that, a method used by the terminal to perform the prolonging operation for the third time or the $N^{th}$ (where N is greater than 3) time is similar to the method used by the terminal to perform the prolonging operation for the first time. This embodiment of this application is described by using an example in which after the prolonging operation is performed for the first time, during restart and running of the T319 timer, the T319 timer may be controlled to be restarted again based on the downlink information received from the network device. For example, after the T319 timer is restarted based on the downlink information received from the network device in S2305, S2306 to S2308 may be further performed.

S2306: The terminal sends the uplink data to the network device during running of the T319 timer.

S2307: The network device sends the downlink information to the terminal based on the uplink data.

S2308: During running of the T319 timer, the terminal restarts the T319 timer based on the downlink information received from the network device.

In S2306 to S2308, a method in which the terminal sends the uplink data to the network device during running of the T319 timer, the network device sends the downlink information to the terminal based on the uplink data, and correspondingly, the terminal restarts the T319 timer based on the downlink information received from the network device during running of the T319 timer is similar to the method in S2005 to S2007 in the embodiment shown in FIG. 20: The terminal sends the uplink data to the network device during running of the T319 timer, the network device sends the downlink information to the terminal based on the uplink data, and correspondingly, the terminal restarts the T319 timer based on the downlink information received from the network device during running of the T319 timer. Refer to the related descriptions in S2005 to S2007. Herein, details are not described again in this embodiment of this application.

In this possible implementation, when the T319 timer is restarted, an example in which the terminal may restart the T319 timer based on the downlink information received from the network device during running of the T319 timer is used for description. Certainly, during running of the T319 timer, the T319 timer may alternatively be restarted based on the data transmission with the network device. For example, during running of the T319 timer, if the terminal sends uplink data, for example, data of a DTCH, the T319 timer is restarted. Alternatively, if downlink data, for example, data of the DTCH, is received, the T319 timer is restarted.

The embodiment shown in FIG. 23 describes in detail the technical solution in which the terminal sends the RRC connection resume request to the network device by using the message A (MsgA) of the two-step RACH, and during running of the T319 timer, the terminal may restart the T319 timer based on the downlink information received from the network device or based on the data transmission with the network device. Certainly, the terminal may send the RRC connection resume request to the network device by using the uplink resource indicated in the random access response received through the four-step RACH. During running of the T319 timer, the terminal may restart the T319 timer based on the downlink information received from the network device or based on the data transmission with the network device.

In this technical solution, the RRC connection resume request is sent to the network device by using the uplink resource indicated in the random access response received through the four-step RACH, and the T319 is restarted timer during running of the T319 timer. In the technical solution shown in FIG. 23, the RRC connection resume request is sent to the network device by using the message A (MsgA) of the two-step RACH, and the T319 timer is restarted during running of the T319 timer. A difference between the technical solutions lies in that: Before the terminal sends the RRC connection resume request message to the network device in S2303, the terminal first receives a random access response sent by the network device. The random access response may include the TC-RNTI, the uplink grant, and the timing advance command, so that the terminal can send the RRC connection resume request message to the network device by using the uplink grant in the random access response. For example, in addition to sending the RRC connection resume request message to the network device, the terminal may also send, to the network device, at least one of the uplink data, the auxiliary information, and the indication information indicating that the terminal expects to keep in the inactive state and continue to send the data. For details, refer to the related descriptions in S2303. Different from S2304, the downlink information sent by the network device to the terminal based on the RRC connection resume request message no longer includes at least one of a TC-RNTI, a timing adjustment command, a power control command, contention resolution information, uplink grant information, downlink resource allocation information, and indication information of a new field, but includes at least one of feedback information, a timing adjustment command, a power control command, contention resolution information, uplink grant information, downlink resource allocation information, and indication information of a new field. In this way, during running of the T319 timer, when the terminal restarts the T319 timer based on the downlink information received from the network device, if the downlink information received by the terminal includes any one or more of the feedback information, the uplink grant information, the downlink resource allocation information, and the indication information of the new field, the terminal restarts the T319 timer. For a specific process, refer to the related descriptions in S2003 and S2004 in the embodiment shown in FIG. 20. Herein, details are not described again in this embodiment of this application. In this way, after the T319 timer is restarted, data transmission may be performed during running of the T319 timer. This effectively prolongs time for the terminal to wait for RRC connection resume, to flexibly support sending of data for a plurality of times. For example, the downlink information received by the terminal further includes the timing adjustment command and/or the power control command. When the timing adjustment command is received, the timing adjustment command is used to perform uplink transmission timing adjustment. When the power control command is received, the power control command is used to perform power control.

After restarting the T319 timer based on the received downlink information, the terminal may further send one piece of indication information to the network device, where the indication information is used to indicate the T319 timer restarted by the terminal, so that information about the restarted T319 timer is synchronized to the network device. In addition, after the T319 timer is restarted, the T319 timer is not always in a running state, but is stopped when the terminal receives an RRC connection resume message, an RRC connection setup message, or an RRC connection release message from the network device.

It may be understood that, in this possible implementation, when the T319 timer is restarted, only an example in which the terminal may restart the T319 timer based on the downlink information, for example, one or more of the uplink grant information, the downlink resource allocation information, and the indication information of the new field, received from the network device during running of the T319 timer is used for description. Certainly, during running of the T319 timer, the T319 timer may alternatively be restarted based on the data transmission with the network device. For example, during running of the T319 timer, if the terminal sends uplink data, for example, data of a DTCH, the T319 timer is restarted. Alternatively, if downlink data, for example, data of the DTCH, is received, the T319 timer is restarted.

It can be learned that the foregoing descriptions are mainly for the first possible implementation in the first scenario. To be specific, when the first timer is the T319 timer that is currently configured by the network, the RRC connection resume request is sent to the network device by using the message A (MsgA) of the two-step RACH, and during running of the T319 timer, the terminal may restart the T319 timer based on the downlink information received from the network device or based on the data transmission with the network device. In addition, the RRC connection resume request is sent to the network device by using the uplink resource indicated in the random access response received through the four-step RACH, and during running of the T319 timer, the terminal may restart the T319 timer based on the downlink information received from the network device or based on the data transmission with the network device. Certainly, the first timer may alternatively be a new timer that is additionally set at an RRC layer or a new timer at a MAC layer. When the first timer may alternatively be the new timer that is additionally set at the RRC layer or the new timer at the MAC layer, a specific implementation of controlling restart of the first timer is similar to the specific implementation of controlling restart of the first timer when the first timer is the T319 timer. Refer to the foregoing related descriptions of controlling restart of the first timer when the first timer is the T319 timer. Herein, details are not described again in this embodiment of this application.

An embodiment of this application further provides an apparatus for implementing any one of the foregoing methods. For example, the apparatus includes units (or means) configured to implement steps performed by the terminal in any one of the foregoing methods. For another example, another apparatus is further provided. The apparatus includes units (or means) configured to implement steps performed by the network device in any one of the foregoing methods.

It should be understood that division into the units in the foregoing apparatuses is merely logical function division. During actual implementation, all or some of the units may be integrated into a physical entity, or may be physically separate. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps or the foregoing units in the foregoing methods may be implemented by using a hardware integrated logic circuit in the processing element, or may be implemented in a form of software invoked by the processing element.

For example, a unit in any one of the foregoing apparatuses may be one or more integrated circuits configured to implement the foregoing method, for example, one or more application-specific integrated circuits (Application Specific Integrated Circuits, ASICs), one or more microprocessors (digital signal processors, DSPs), one or more field programmable gate arrays (FPGAs), or a combination of at least two of the integrated circuits. For another example, when a unit in the apparatus is implemented in a form of a program invoked by the processing element, the processing element may be a general-purpose processor, for example, a central processing unit (CPU), or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 24:
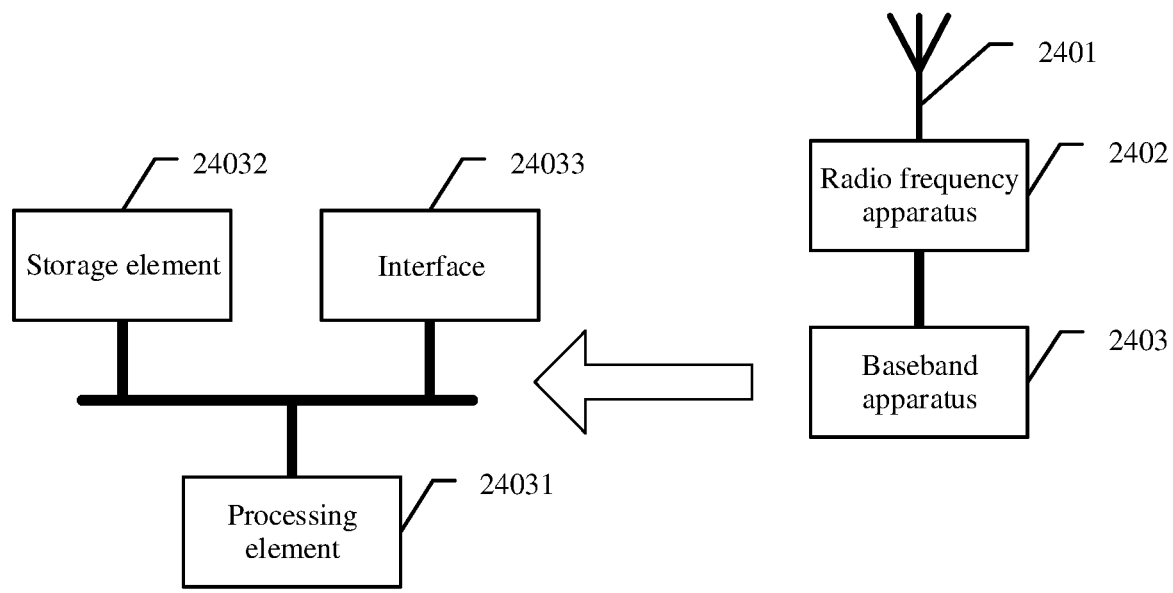
FIG. 24 is a schematic diagram of a structure of a network device according to an embodiment of this application.

FIG. 24 is a schematic diagram of a structure of a network device according to an embodiment of this application. The network device may be the network device in the foregoing embodiments, and is configured to implement operations of the network device in the foregoing embodiments. As shown in FIG. 24, the network device includes an antenna 2401, a radio frequency apparatus 2402, and a baseband apparatus 2403. The antenna 2401 is connected to the radio frequency apparatus 2402. In an uplink direction, the radio frequency apparatus 2402 receives, by using the antenna 2401, information sent by a terminal, and sends, to the baseband apparatus 2403 for processing, the information sent by the terminal. In a downlink direction, the baseband apparatus 2403 processes information about the terminal, and sends the information to the radio frequency apparatus 2402. The radio frequency apparatus 2402 processes the information about the terminal, and then sends the processed information to the terminal by using the antenna 2401.

The baseband apparatus 2403 may include one or more processing elements 24031, for example, include one main control CPU and another integrated circuit. In addition, the baseband apparatus 2403 may further include a storage element 24032 and an interface 24033. The storage element 24032 is configured to store a program and data. The interface 24033 is configured to exchange information with the radio frequency apparatus 2402. The interface is, for example, a common public radio interface (CPRI). The foregoing apparatus used in the network device may be located in the baseband apparatus 2403. For example, the foregoing apparatus used in the network device may be a chip on the baseband apparatus 2403. The chip includes at least one processing element and an interface circuit. The processing element is configured to perform steps of any one of the methods performed by the network device. The interface circuit is configured to communicate with another apparatus. In an implementation, units of the network device that implement the steps in the foregoing method may be implemented by scheduling a program by a processing element. For example, the apparatus used in the network device includes a processing element and a storage element. The processing element invokes a program stored in the storage element, to perform the method performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units of the network device that implement the steps in the foregoing method may be configured as one or more processing elements. These processing elements are disposed on the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing method may be integrated together, and implemented in a form of a system-on-a-chip (SOC). For example, the baseband apparatus includes the SOC chip, configured to implement the foregoing method. At least one processing element and storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device in a first manner, that is, by invoking the program stored in the storage element; or may perform some or all steps performed by the network device, in a second manner, that is, by using a hardware integrated logic circuit in the processor element in combination with instructions; or may certainly perform, by combining the first manner and the second manner, some or all steps performed by the network device.

As described above, the processing element herein may be a general-purpose processor, for example, a CPU, or may be one or more integrated circuits configured to implement the foregoing method, for example, one or more ASICs, one or more microprocessors DSPs, one or more FPGAs, or a combination of at least two of the integrated circuits.

The storage element may be one memory, or may be a general term of a plurality of storage elements.

Figure 25:
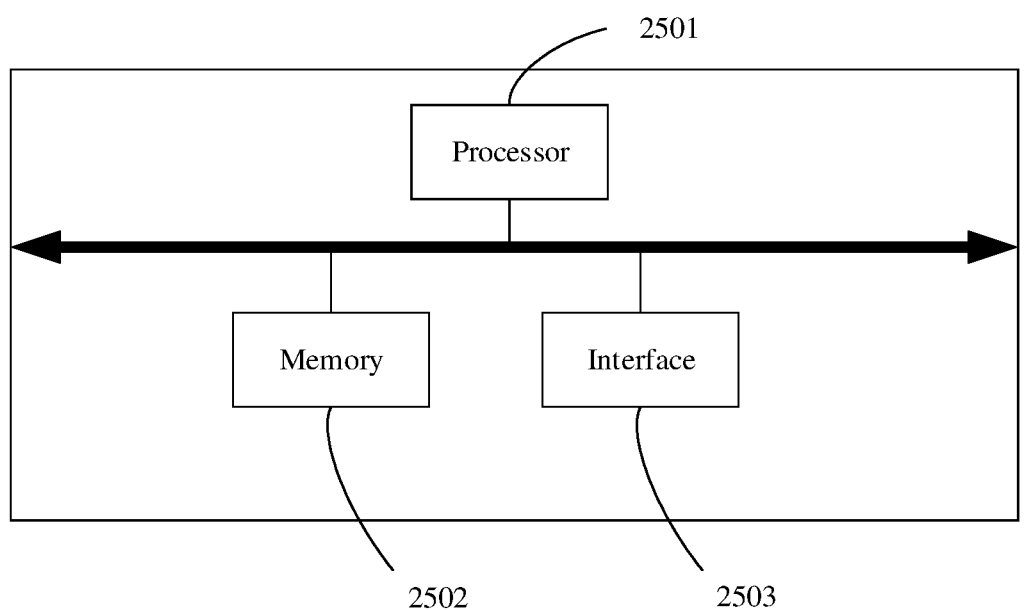
FIG. 25 is a schematic diagram of a structure of another network device according to an embodiment of this application.

FIG. 25 is a schematic diagram of a structure of another network device according to an embodiment of this application. The network device may be the network device in the foregoing embodiments, and is configured to implement operations of the network device in the foregoing embodiments. As shown in FIG. 25, the network device includes a processor 2501, a memory 2502, and an interface 2503. The processor 2501, the memory 2502, and the interface 2503 are signal-connected.

The foregoing configuration apparatus is located in the network device, and functions of the units may be implemented by the processor 2501 by invoking a program stored in the memory 2502. That is, the foregoing configuration apparatus includes the memory and the processor. The memory is configured to store the program, and the program is invoked by the processor to perform the method in the foregoing method embodiments. The processor herein may be an integrated circuit having a signal processing capability, for example, a CPU.

Alternatively, functions of the foregoing units may be implemented by one or more integrated circuits configured to implement the foregoing method, for example, one or more ASICs, one or more microprocessors DSPs, one or more more FPGAs, or a combination of at least two of the integrated circuits. Alternatively, the foregoing implementations may be combined.

Figure 26:
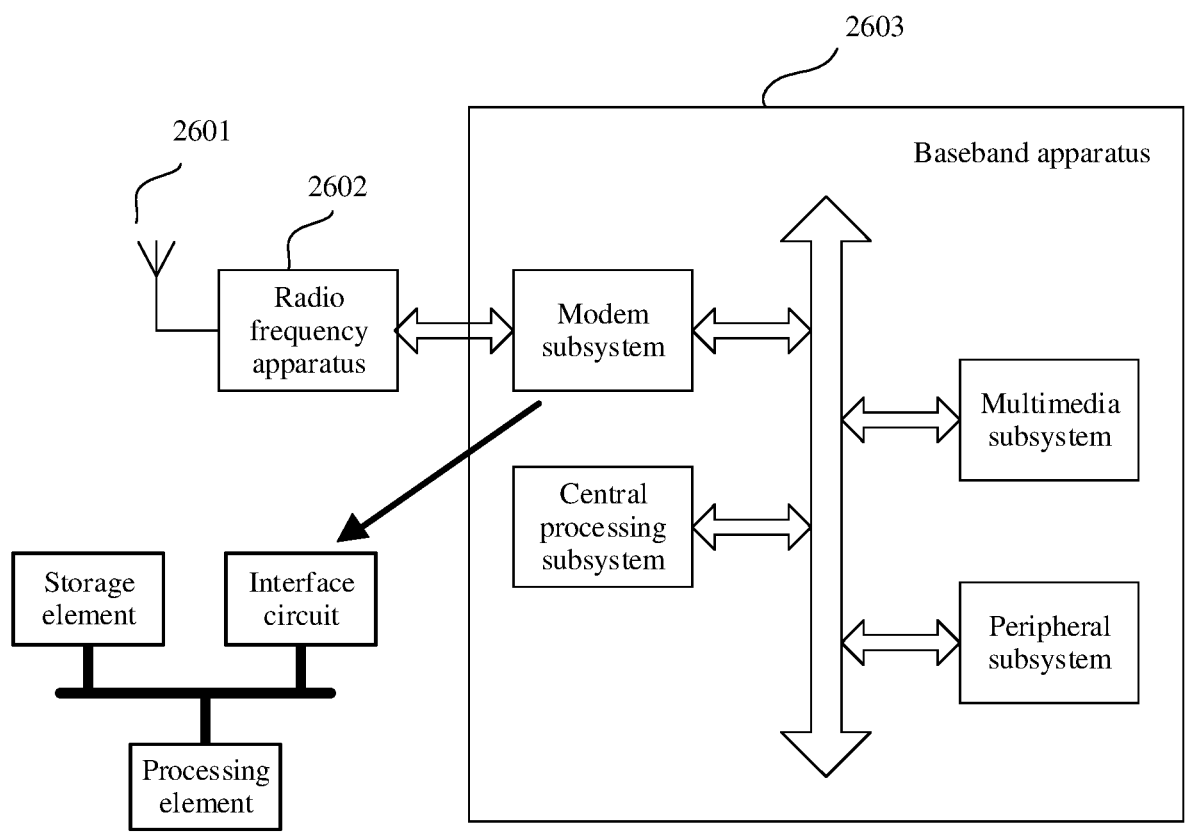
FIG. 26 is a schematic diagram of a structure of a terminal according to an embodiment of this application.

FIG. 26 is a schematic diagram of a structure of a terminal according to an embodiment of this application. The terminal may be the terminal in the foregoing embodiments, and is configured to implement operations of the terminal in the foregoing embodiments. As shown in FIG. 26, the terminal includes an antenna 2601, a radio frequency part 2602, and a signal processing part 2603. The antenna 2601 is connected to the radio frequency part 2602. In a downlink direction, the radio frequency part 2602 receives, by using the antenna 2601, information sent by a network device; and sends, to the signal processing part 2603 for processing, the information sent by the network device. In an uplink direction, the signal processing part 2603 processes information about the terminal, and sends the information to the radio frequency part 2602. The radio frequency part 2602 processes the information about the terminal, and then sends the processed information to the network device by using the antenna 2601.

The signal processing part 2603 may include a modem subsystem, configured to process data at each communication protocol layer. The signal processing part 2603 may further include a central processing subsystem, configured to process an operating system and an application layer of the terminal. In addition, the signal processing part 2603 may further include another subsystem, for example, a multimedia subsystem or a peripheral subsystem. The multimedia subsystem is configured to control a camera, a screen display, and the like of the terminal. The peripheral subsystem is configured to implement a connection to another device. The modem subsystem may be a separately disposed chip. Optionally, the foregoing apparatus used in the terminal may be located in the modem subsystem.

The modem subsystem may include one or more processing elements, for example, a main control and another integrated circuit. In addition, the modem subsystem may further include a storage element and an interface circuit. The storage element is configured to store data and a program. However, a program used to perform the method performed by the terminal in the foregoing methods may not be stored in the storage element, but is stored in a memory outside the modem subsystem, and is loaded and used by the modem subsystem when to be used. The interface circuit is configured to communicate with another subsystem. The foregoing apparatus used for the terminal may be located in the modem subsystem. The modem subsystem may be implemented by using a chip. The chip includes at least one processing element and an interface circuit. A processing element is configured to perform steps of any method performed by the terminal. The interface circuit is configured to communicate with another apparatus. In an implementation, units of the terminal that implement the steps in the foregoing method may be implemented by scheduling a program by a processing element. For example, the apparatus used in the terminal includes a processing element and a storage element. The processing element invokes a program stored in the storage element, to perform the method performed by the terminal in the foregoing method embodiments. The storage element may be a storage element located on a same chip as the processing element, that is, an on-chip storage element.

In another implementation, the program used to perform the method performed by the terminal in the foregoing methods may be in a storage element located on a different chip from the processing element, namely, an off-chip storage element. In this case, the processing element invokes or loads the program from the off-chip storage element to the on-chip storage element, to invoke and perform the method performed by the terminal in the foregoing method embodiments.

In still another implementation, units of the terminal that implement the steps in the foregoing method may be configured as one or more processing elements. These processing elements are disposed on the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal that implement the steps in the foregoing method may be integrated together, and implemented in a form of a system-on-a-chip (SOC). The SOC chip is configured to implement the foregoing method. At least one processing element and storage element may be integrated into the chip, and the processing element invokes a program stored in the storage element to implement the foregoing method performed by the terminal. Alternatively, at least one integrated circuit may be integrated into the chip, to implement the foregoing method performed by the terminal. Alternatively, with reference to the foregoing implementations, functions of some units may be implemented by invoking a program by the processing element, and functions of some units may be implemented by the integrated circuit.

It can be learned that the foregoing apparatus used for the terminal may include at least one processing element and interface circuit. The at least one processing element is configured to perform any one of the methods that are provided in the foregoing method embodiments and performed by the terminal. The processing element may perform some or all steps performed by the terminal in a first manner, that is, by invoking the program stored in the storage element; or may perform some or all steps performed by the terminal, in a second manner, that is, by using a hardware integrated logic circuit in the processor element in combination with instructions; or may certainly perform, by combining the first manner and the second manner, some or all steps performed by the terminal.

As described above, the processing element herein may be a general-purpose processor, for example, a CPU, or may be one or more integrated circuits configured to implement the foregoing method, for example, one or more ASICs, one or more microprocessors DSPs, one or more FPGAs, or a combination of at least two of the integrated circuits.

The storage element may be one memory, or may be a general term of a plurality of storage elements.

What is claimed is:

1. A method comprising:
receiving, by a terminal device, a radio resource control (RRC) connection release message, wherein the RRC connection release message comprises first information, and the first information indicates a target configuration parameter;
entering, by the terminal device, an inactive state based on the RRC connection release message, and determining, by the terminal device, a context parameter of the inactive state based on the first information, wherein the context parameter of the inactive state is the target configuration parameter, or the context parameter of the inactive state is a parameter in a context parameter of the terminal device and different than the target configuration parameter;
retaining or releasing, by the terminal device in the inactive state, the determined context parameter; and
before receiving the RRC connection release message, reporting, by the terminal device, capability information, wherein the capability information indicates support for data transmission in the inactive state.

2. The method according to claim 1, wherein
the target configuration parameter comprises a radio bearer configuration parameter or a cell group configuration parameter.

3. The method according to claim 1, wherein
the first information comprises an identifier corresponding to the target configuration parameter.

4. The method according to claim 3, wherein the terminal device stores a mapping relationship between the target configuration parameter and the identifier, and the determining the context parameter of the inactive state based on the first information comprises:
determining, by the terminal device based on the identifier corresponding to the target configuration parameter and the mapping relationship, that the context parameter of the inactive state is the target configuration parameter corresponding to the identifier.

5. The method according to claim 1, wherein the first information comprises the target configuration parameter.

6. A method comprising:
receiving capability information reported by a terminal device, wherein the capability information indicates support for data transmission in an inactive state;
determining a target configuration parameter; and
sending a radio resource control (RRC) connection release message, wherein the RRC connection release message indicates the terminal device to enter the inactive state based on the RRC connection release message, the RRC connection release message comprises first information indicating the target configuration parameter, and the first information indicates the terminal device to determine a context parameter of the inactive state and to retain or release the context parameter in the inactive state, wherein the context parameter of the inactive state is the target configuration parameter, or the context parameter of the inactive state is a parameter in a context parameter of the terminal device and different than the target configuration parameter.

7. The method according to claim 6, wherein
the target configuration parameter comprises a radio bearer configuration parameter or a cell group configuration parameter.

8. The method according to claim 6, wherein
the first information comprises an identifier corresponding to the target configuration parameter.

9. The method according to claim 8, wherein the method further comprises:
sending, to the terminal device, a mapping relationship between the target configuration parameter and the identifier corresponding to the target configuration parameter.

10. The method according to claim 6, wherein
the first information comprises the target configuration parameter.

11. An apparatus comprising:
one or more processors;
a non-transitory memory coupled to the one or more processors, wherein the non-transitory memory stores a program executable by the one or more processors, the program including instructions for:

receiving a radio resource control (RRC) connection release message, wherein the RRC connection release message comprises first information, and the first information indicates a target configuration parameter;

entering an inactive state based on the RRC connection release message, and determining a context parameter of the inactive state based on the first information, wherein the context parameter of the inactive state is the target configuration parameter, or the context parameter of the inactive state is a parameter in a context parameter of the apparatus and different than the target configuration parameter;

retaining or releasing, in the inactive state, the determined context parameter; and before receiving the RRC connection release message, reporting capability information, wherein the capability information indicates support for data transmission in the inactive state.

12. The apparatus according to claim 11, wherein the target configuration parameter comprises a radio bearer configuration parameter or a cell group configuration parameter.

13. The apparatus according to claim 11, wherein the first information comprises an identifier corresponding to the target configuration parameter.

14. The apparatus according to claim 13, wherein the apparatus stores a mapping relationship between the target configuration parameter and the identifier, and the determining the context parameter of the inactive state based on the first information comprises:

determining, based on the identifier corresponding to the target configuration parameter and the mapping relationship, that the context parameter of the inactive state is the target configuration parameter corresponding to the identifier.

15. The apparatus according to claim 11, wherein the first information comprises the target configuration parameter.

16. An apparatus comprising:
one or more processors;
a non-transitory memory coupled to the one or more processors, wherein the non-transitory memory stores a program to be executed by the one or more processors, the program including instructions for:
receiving capability information reported by a terminal device, wherein the capability information indicates support for data transmission in an inactive state;
determining a target configuration parameter; and
sending a radio resource control (RRC) connection release message, wherein the RRC connection release message indicates the terminal device to enter the inactive state based on the RRC connection release message, the RRC connection release message comprises first information indicating the target configuration parameter, and the first information indicates the terminal device to determine a context parameter of the inactive state and to retain or release the context parameter in the inactive state, wherein the context parameter of the inactive state is the target configuration parameter, or the context parameter of the inactive state is a parameter in a context parameter of the terminal device and different than the target configuration parameter.

17. The apparatus according to claim 16, wherein the target configuration parameter comprises a radio bearer configuration parameter or a cell group configuration parameter.

18. The apparatus according to claim 16, wherein the first information comprises an identifier corresponding to the target configuration parameter.

19. The apparatus according to claim 18, wherein the program further comprises instructions for:
sending a mapping relationship between the target configuration parameter and the identifier corresponding to the target configuration parameter.

20. The apparatus according to claim 16, wherein the first information comprises the target configuration parameter.

* * * * *